United States Patent
Carter

(10) Patent No.: US 11,403,901 B2
(45) Date of Patent: Aug. 2, 2022

(54) ENTRY MANAGEMENT SYSTEM

(71) Applicant: 1AHEAD Technologies, Charlotte, NC (US)

(72) Inventor: Ronald Carter, Matthews, NC (US)

(73) Assignee: 1AHEAD Technologies, Charlotte, NC (US)

( * ) Notice: Subject to any disclaimer, the term of this patent is extended or adjusted under 35 U.S.C. 154(b) by 0 days.

(21) Appl. No.: 17/556,483

(22) Filed: Dec. 20, 2021

(65) Prior Publication Data

US 2022/0114851 A1 Apr. 14, 2022

Related U.S. Application Data

(63) Continuation-in-part of application No. 17/488,278, filed on Sep. 28, 2021, now Pat. No. 11,303,856, which is a continuation-in-part of application No. 17/469,863, filed on Sep. 8, 2021, and a continuation-in-part of application No. PCT/US2021/039812, filed on Jun. 30, 2021, which is a continuation-in-part of application No. 17/070,739, filed on Oct. 14, 2020, now Pat. No. 11,128,840, and a continuation of application No.
(Continued)

(51) Int. Cl.
*G07C 9/00* (2020.01)
*G06N 20/00* (2019.01)

(52) U.S. Cl.
CPC ......... *G07C 9/00896* (2013.01); *G06N 20/00* (2019.01)

(58) Field of Classification Search
CPC ..... G07C 9/00896; G06N 20/00; H04N 7/186
See application file for complete search history.

(56) References Cited

U.S. PATENT DOCUMENTS 8,667,297 B2 3/2014 Salter et al.
8,689,249 B2 4/2014 Pino et al.
(Continued)

FOREIGN PATENT DOCUMENTS

WO 2013174983 A1 11/2013

OTHER PUBLICATIONS

Joshi et al. "GSM Based Security Automation System for Building Entry Management." (2019). 1-52 Jun. 30, 2019 (Jun. 30, 2019) Retrieved on Sep. 3, 2021 (Sep. 3, 2021) from https://ijsret.com/wp-contenUuploads/2019/05/IJSRET _ V5_issue3_297.pdf entire document.

*Primary Examiner* — Jared Walker
(74) *Attorney, Agent, or Firm* — Neo IP

(57) ABSTRACT

An artificial intelligence entry management device for an entry and delivery system includes a camera, a microphone, a motion detector, a speaker, and a housing. The housing has an oval shape with a substantially open middle. The substantially open middle has a housing protrusion portion configured to house the camera, the microphone, the motion detector, and the speaker. The entry and delivery system may also include one or more robots that interface with the entry management device to monitor an area around an access point and to alert the user of activity. A robot may be an aerial robot that has a camera, a robot light, a speaker, a microphone and an actuator to enable picking and moving a package. Aerial robots may be configured around a perimeter of a building to monitor the building and may turn on a robot light when motion is detected.

24 Claims, 17 Drawing Sheets

Related U.S. Application Data

17/363,262, filed on Jun. 30, 2021, now Pat. No. 11,151,825, which is a continuation-in-part of application No. 17/070,739, filed on Oct. 14, 2020, now Pat. No. 11,128,840, said application No. 17/488,278 is a continuation-in-part of application No. 17/363,262, filed on Jun. 30, 2021, now Pat. No. 11,151,825, which is a continuation-in-part of application No. 17/070,739, filed on Oct. 14, 2020, now Pat. No. 11,128,840.

(60) Provisional application No. 63/228,433, filed on Aug. 2, 2021, provisional application No. 63/239,934, filed on Sep. 1, 2021.

(56) References Cited

U.S. PATENT DOCUMENTS

| | | |
|---|---|---|
| 9,365,188 B1 | 6/2016 | Penilla et al. |
| 9,499,128 B2 | 11/2016 | Reh et al. |
| 9,508,207 B2 | 11/2016 | Kalb et al. |
| 9,608,970 B1 | 3/2017 | Gehret et al. |
| 9,640,040 B2 | 5/2017 | Irudayam et al. |
| 9,646,165 B1 | 5/2017 | Saylor |
| 9,805,534 B2 | 10/2017 | Ho et al. |
| 9,842,447 B2 | 12/2017 | Badger |
| 9,870,698 B2 | 1/2018 | Rabb et al. |
| 9,911,290 B1 | 3/2018 | Zalewski et al. |
| 9,922,513 B1 | 3/2018 | Hall et al. |
| 9,923,879 B1 | 3/2018 | Ziraknejad et al. |
| 9,978,238 B2 | 5/2018 | Fadell et al. |
| 10,043,332 B2 | 8/2018 | Scalisi et al. |
| 10,147,249 B1 | 12/2018 | Brady et al. |
| 10,475,259 B2 | 11/2019 | Carter |
| 10,657,383 B1 | 5/2020 | Solh et al. |
| 10,896,562 B2 | 1/2021 | Carter |
| 11,132,877 B2 | 9/2021 | Scalisi et al. |
| 11,170,593 B1 | 11/2021 | Schneider et al. |
| 2005/0007451 A1* | 1/2005 | Chiang ............ G08B 13/19658 348/143 |
| 2006/0091206 A1 | 5/2006 | Olsen et al. |
| 2007/0103548 A1* | 5/2007 | Carter ................ H04N 7/186 348/E7.079 |
| 2008/0036862 A1* | 2/2008 | Lang .................. H04N 7/186 348/E7.086 |
| 2008/0239072 A1* | 10/2008 | Cheng ................ H04N 7/186 348/143 |
| 2011/0248818 A1 | 10/2011 | Hashim-Waris |
| 2013/0017812 A1 | 1/2013 | Foster |
| 2013/0169802 A1* | 7/2013 | Chen .................. H04N 5/2254 348/143 |
| 2014/0035721 A1 | 2/2014 | Heppe et al. |
| 2014/0267716 A1* | 9/2014 | Child .................. H04N 7/186 348/143 |
| 2014/0274013 A1 | 9/2014 | Santavicca |
| 2014/0373111 A1 | 12/2014 | Moss et al. |
| 2015/0022620 A1* | 1/2015 | Siminoff ............ H04M 1/0291 348/14.02 |
| 2015/0156031 A1* | 6/2015 | Fadell ................ G08B 29/185 700/90 |
| 2016/0219254 A1* | 7/2016 | Hu ...................... H04N 7/186 |
| 2017/0019700 A1* | 1/2017 | Tseng ............... H04N 21/2187 |
| 2017/0249794 A1 | 8/2017 | Davis |
| 2018/0191930 A1* | 7/2018 | Jeong ................ H04N 5/2252 |
| 2019/0016511 A1* | 1/2019 | Yang .................... E05B 37/02 |
| 2019/0156406 A1 | 5/2019 | Landau et al. |
| 2019/0354220 A1 | 11/2019 | Ribbich et al. |
| 2020/0035050 A1 | 1/2020 | Carter |
| 2021/0142603 A1 | 5/2021 | Carter |
| 2021/0160461 A1 | 5/2021 | Martin et al. |

* cited by examiner

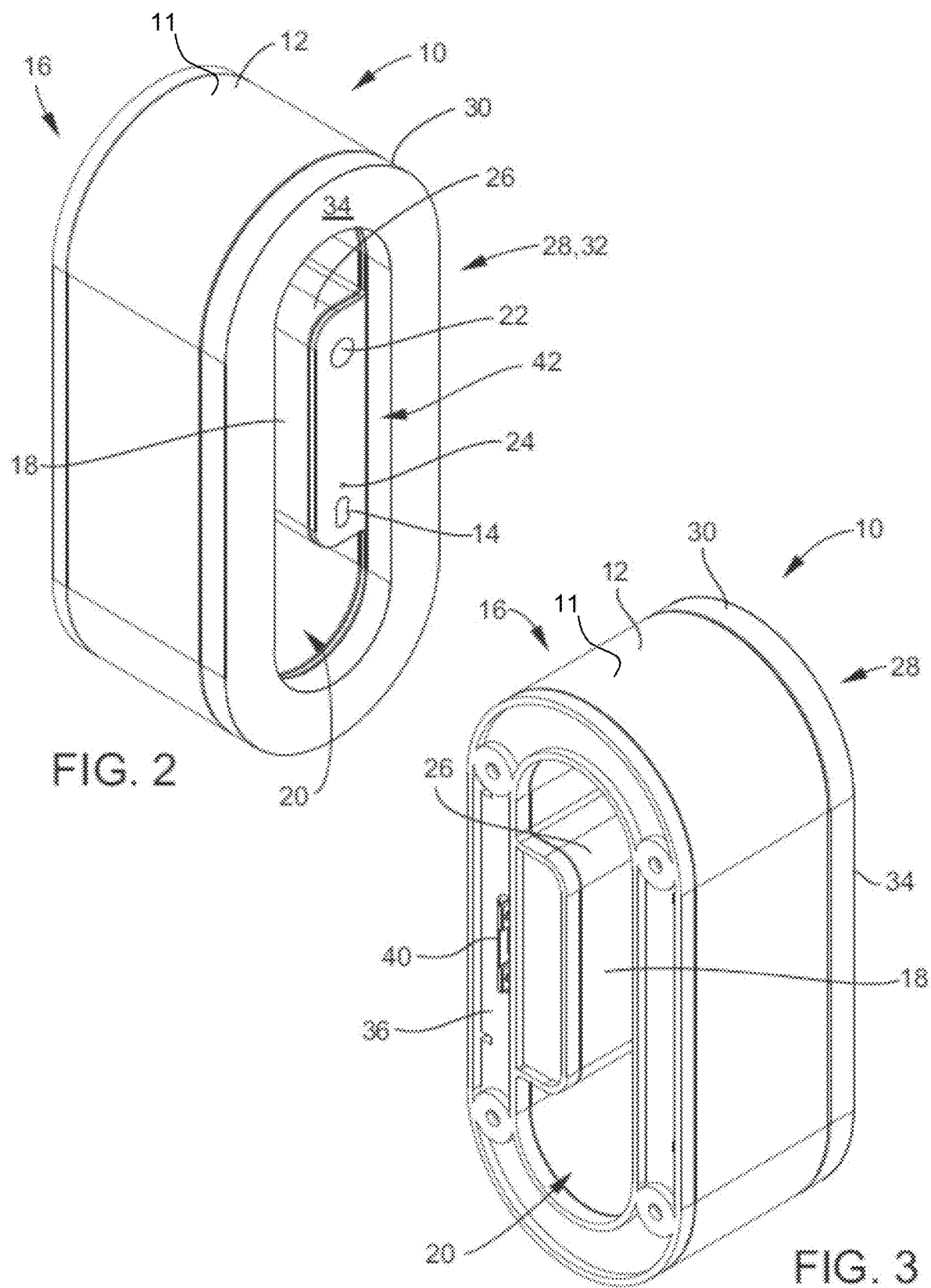

ENTRY MANAGEMENT SYSTEM

CROSS REFERENCES TO RELATED APPLICATIONS

This application is a continuation-in-part of U.S. Application No. 17/488,278, filed on Sep. 28, 2021, which is a continuation-in-part of U.S. Application No. 17/469,863, filed on Sep. 8, 2021, which is a continuation-in-part of PCT Application No. US2021/039812, filed on Jun. 30, 2021, which is a continuation-in-part of U.S. application Ser. No. 17/070,739, filed on Oct. 14, 2020, now issued as U.S. Pat. No. 11,128,840, and is a continuation of U.S. Application No. 17,363,262 filed on Jun. 30, 2021, which is a continuation-in-part of U.S. application Ser. No. 17/070,739, filed on Oct. 14, 2020, now issued as U.S. Pat. No. 11,128,840. U.S. Application No. 17/488,278 is also a continuation-in-part of U.S. Application No. 17/363,262, filed on Jun. 30, 2021, which is a continuation-in-part of U.S. application Ser. No. 17/070,739, filed on Oct. 14, 2020, now issued as U.S. Pat. No. 11,128,840. U.S. Application No. 17/488,278 also claims the benefit of priority to U.S. Provisional Patent Application No. 63/228,433, filed on Aug. 2, 2021, and the benefit of priority to U.S. Provisional Patent Application No. 63/239,934, filed on Sep. 1, 2021. Each of the above referenced applications is hereby incorporated by reference herein in its entirety.

BACKGROUND OF THE INVENTION

1. Field of the Invention

The present disclosure relates to security systems and delivery methods. More specifically, the present disclosure relates to an artificial intelligence ("AI") entry management device, system, and method of using the same.

DESCRIPTION OF THE PRIOR ART

It is generally known in the prior art to provide doorbells with cameras. It is further known to provide network devices or Internet of Things (IoT) devices.

Prior art documents include the following:

U.S. Pat. No. 8,689,249 for In-home system monitoring method and system having a video camera connected to a set-top box by inventors, Pino, et al., filed Oct. 23, 2012 and issued Apr. 1, 2014, is directed to a method of receiving digital television programming content from a television service provider, receiving a first user input of a selected digital television programming content, receiving a message from a system, in response to receiving the message, causing a notification to be displayed on the television as an overlay over the displayed television programming content, receiving a first user command, determining a first control message to transmit to the system in response to receiving the first user command, transmitting the first control message. Also provided is a system including a video camera, an entry way security system, an HVAC system, a lighting system, an alarm system, or other system. User inputs may be received via a remote control to a set top box or from a computing device at a remote computer system through the internet and/or a mobile telephone network.

U.S. Pat. No. 11,170,593 for Multifunction smart door device by inventors, Schneider, et al., filed May 5, 2020 and issued Nov. 9, 2021, is directed to multifunction smart door devices part of a system of multifunction smart door devices installed within or near stateroom doors of a cruise ship. Each smart door device can control access to a stateroom based on facial recognition or a wireless credential and can perform other functions such as controlling stateroom personalization features, providing an electronic peephole function, allowing controlled access for authorized crew members, accommodating remote unlocking, and providing notifications. Data obtained by the smart door devices can be provided to the cruise operator for service, safety, or security purposes, such as for anonymized foot traffic analysis, hazard detection, and stateroom access auditing. Smart door device functionality may be implemented in part by customers' mobile devices.

US Patent Publication No. 2021/0160461 for Smart home and security system by inventors Martin, et al., filed Nov. 25, 2020 and published May 27, 2021, is directed to a security and smart home system, components thereof, and associated methods. The system can include a host-carried monitor configured to monitor data associated with the host, such as motion data, position data, temperature data, or humidity data. The system can include one or more security devices located at a premises to monitor security data at the premises, with the one or more security devices in communication with a remote server programmed to process security event signals from the one or more security devices and transmit action instructions to the one or more security devices. Security devices can include an electrical power switch, an electrical power plug, and a camera.

US Patent Publication No. 2019/0354220 for Transparent display control device by inventors Ribbich, et al., filed May 15, 2019 and published Nov. 21, 2019, is directed to a control device for a building management system (BMS) including a touch screen display configured to mount to a mounting surface, a communications interface configured to communicate with the BMS, a near field communication (NFC) sensor configured to receive information from a NFC device, a microphone configured to detect vocal input, and a processing circuit coupled to the touch screen display. The processing circuit including a processor and memory coupled to the processor, the memory storing instructions thereon that, when executed by the processor, cause the control device to receive user input from at least one of the touch screen display, the NFC sensor, or the microphone, validate an identity of a user based on the user input, and cause the BMS to control an environmental variable of a space based on the validation.

U.S. Pat. No. 10,657,383 for Computer vision to enable services by inventors Solh, et al., filed Sep. 23, 2016 and issued May 19, 2020, is directed to computer vision for manual services. In some instances, a remote system may determine that a current time is within a threshold period of time of a scheduled service and, based on the determination, send a first message requesting image data to a camera apparatus located within an environment. After sending the first message, the remote system may receive image data associated with the environment from the camera apparatus and use the image to detect an object within the environment. The remote system can then send a second message to a device of a guest and a third message to a device of a user, where each of the second message and the third message indicates that the object is within the environment. In some instances, the object can include an animal while in some instances, the object can include a person.

U.S. Pat. No. 11,132,877 for Doorbell communities by inventors Scalisi, et al., filed Apr. 30, 2020 and issued Sep. 28, 2021, is directed to doorbells that can send data to each other to enable a first doorbell user to warn a second doorbell user regarding a suspicious visitor. A first user can indicate a first trait of a visitor via a first remote computing device. The first user can create a user group to enable the members of the user group to use their doorbells to take pictures of suspicious visitors and to send the pictures of the suspicious visitors to other members of the user group.

US Patent Publication No. 2019/0156406 for Method and system for apartment rental inspections without presence of brokers or rental agents, filed Nov. 22, 2017 and published May 23, 2019, is directed to a system for facilitating real estate (RE) unit rentals by intermediating landlords and potential tenants (PT) and enabling RE unit inspections and viewing without requiring on-site landlord representatives. The system includes a master-server facility including software modules and databases for executing system algorithms that enable and control communications between landlord communication devices, PT devices and apartment devices including a remote door lock, cameras and movement sensors. The door lock is remotely-operable and wirelessly controlled. The apartment devices include communication and monitoring devices temporarily installed in the RE units to enable RE unit inspections and viewing. The software modules including at least: a) a unit listing software; b) a tenant liaison module; c) an inspection scheduling module; d) a door opening module that sends to the PT devices at least one activation code for the door lock; and e) a tenant present module that verifies that the potential tenant is located in proximity to the entry door.

US Patent Publication No. 2021/0142603 for Secured delivery system and method of using same by inventor Carter, filed Jan. 15, 2021 and published May 13, 2021, is directed to a secured delivery system including a doorbell device comprising a scanner, and a locking mechanism operatively connected to the scanner a computer processor or a cloud server and a structure, such as a residence or lockbox. A key, which can be in the for of a bar code, can be generated and sent to delivery or service personnel needing access to the structure. The delivery or service personnel present the bar code to the scanner. Upon reading the bar code, the locking mechanism is unlocked thereby allowing access to the structure.

U.S. Pat. No. 10,896,562 for Secured delivery system and method of using same by inventor Carter, filed Oct. 4, 2019 and issued Oct. 19, 2021, is directed to a secured delivery system including a doorbell device comprising a scanner, and a locking mechanism operatively connected to the scanner, a computer processor or a cloud server and a structure, such as a residence or lockbox. A key, which can be in the form of a bar code, can be generated and sent to delivery or service personnel needing access to the structure. The delivery or service personnel present the bar code to the scanner. Upon reading the bar code, the locking mechanism is unlocked thereby allowing access to the structure.

U.S. Pat. No. 10,475,259 for Security system and method of using same by inventor Carter, filed Mar. 28, 2018 and issued Nov. 12, 2019, is directed to a security system including a doorbell device comprising a scanner, and a locking mechanism operatively connected to the scanner and a structure, such as a home or lockbox. A key, which can be in the form of a bar code, can be generated and sent to delivery or service personnel needing access to the structure. The delivery or service personnel present the bar code to the scanner. Upon reading the bar code, the locking mechanism is unlocked thereby allowing access to the structure.

SUMMARY OF THE INVENTION

The present invention relates to an entry management system operable to communicate with a plurality of other network devices.

Many consumers today purchase goods on the Internet from online retailers, and this form of shopping is expected to increase in the years to come. This form of shopping, which has become commonplace, requires the purchased goods to be shipped to the purchaser. Often, the goods are packaged and delivered to the residence of the purchaser while the purchaser is not home, and the packaged goods are merely left unsecured by the door of the purchaser's residence. Of course, such packages are prone to being stolen, resulting in significant financial loss to someone in the online retailer chain.

Therefore, a need exists for improved entry management systems and methods of use thereof.

One object of the present disclosure may be to provide an artificial intelligence entry management device for an entry management system. The artificial intelligence entry management device may include a camera, a microphone, a motion detector, a speaker, and a housing. The housing may have an oval shape with a substantially open middle or be solid within the oval shape. The substantially open middle may have a housing protrusion portion configured to house the camera, the microphone, the motion detector, and the speaker. An artificial intelligence entry management device or artificial intelligence entry management system, as described herein, may be part of a smart-home device that may have other functions, such as opening other entry points to a property or building, turning on lights, setting temperature for a heating or air conditioning system and the like.

In one embodiment, the present invention includes an entry management system including an entry management device including a housing comprising a camera, a microphone, and a speaker; an access point comprising an electronic lock that is operable to lock and unlock the access point; and a software platform; wherein the electronic lock is in direct wireless communication with the entry management device or wherein the electronic lock is in wireless communication with the entry management device via the software platform, and wherein the electronic lock is operable to receive commands from the entry management device to lock and unlock the access point; wherein the entry management device is in wireless communication with at least one network device through the software platform; wherein the entry management device is operable to process visual data produced by the camera and/or audio data produced by the microphone to determine if an image and/or a sound displayed to the entry management device corresponds with at least one authorized image and/or at least one authorized sound for the access point; wherein the entry management device is operable to send a command to the electronic lock to unlock the access point if the image and/or the sound displayed to the entry management device matches the at least one authorized image and/or the at least one authorized sound; and wherein the entry management device is operable to cause the at least one network device to perform an action based upon detection of a trigger event. In one embodiment, the at least one network device includes at least one secondary camera, wherein the trigger event includes a detection of a person, an object, movement, or audio by the entry management device, and wherein the action includes the at least one secondary camera photographing an area associated with the trigger event, recording video of the area associated with the trigger event, repositioning to view the area associated with the trigger event, and/or zooming in on the area associated with the trigger event. In one embodiment, the at least one network device includes at least one drone, wherein the at least one drone is operable to follow at least one object or person of interest, take photographs of the at least one object or person of interest, record video of the at least one object or person of interest, and/or follow a surveillance route. In one embodiment, the trigger event includes the entry management device receiving the image and/or the sound, and wherein the at least one network device includes at least one media device, at least one thermostat, at least one lighting device, at least one smart window device, and/or at least one smart socket, and wherein the action includes turning on, turning off, and/or adjusting a setting on the at least one media device, the at least one thermostat, the at least one lighting device, the at least one smart window device, and/or the at least one smart socket. The entry management device is further operable to receive a second image and/or a second sound, wherein the entry management device is operable to cause the at least one network device to perform a second action based upon receipt of the second image and/or the second sound, wherein the second action includes an action different than the action. In another embodiment, the entry management device or at least one secondary camera in wireless communication with the entry management device is operable to detect movement near at least one delivered package, and wherein the entry management device is operable to transmit an alert in response to the movement near the at least one delivered package or send a command to at least one tertiary camera to capture at least one image or at least one video of an area where the movement was detected near the at least one delivered package. In yet another embodiment, the at least one authorized image and/or the at least one authorized sound is associated with a user profile, and wherein the user profile includes at least one setting or at least one activation status for the at least one network device, wherein trigger event includes unlocking the access point and the action includes implementing the at least one setting or the at least one activation status for the at least one network device. In another embodiment, the at least one authorized image and/or the at least one authorized sound is associated with a user profile, and wherein the entry management device is operable to retrieve information from the software platform based on the user profile and play an audio message based on the information from the software platform. In another embodiment, the at least one authorized image includes a face of a user, and wherein the entry management device and/or the software platform is operable to perform facial recognition to match the image to the face of the user. In yet another embodiment, the entry management device is operable to perform image or video analysis on an image or video obtained from the entry management device or the at least one network device, wherein the image or video analysis includes recognition of at least one person, at least one weapon, at least one action, or at least one sound.

In another embodiment, the present invention includes an entry management system including an entry management device including a housing comprising a camera, a microphone, and a speaker; an access point comprising an electronic lock that is operable to lock and unlock the access point; and a software platform; wherein the electronic lock is in direct wireless communication with the entry management device or wherein the electronic lock is in wireless communication with the entry management device via the software platform, and wherein the electronic lock is operable to receive commands from the entry management device to lock and unlock the access point; wherein the entry management device is in wireless communication with at least one network device through the software platform; wherein the entry management device is operable to process visual data produced by the camera and/or audio data produced by the microphone to determine if an image and/or a sound displayed to the entry management device corresponds with at least one authorized image and/or at least one authorized sound for the access point; wherein the entry management device is operable to send a command to the electronic lock to unlock the access point if the image and/or the sound displayed to the entry management device matches the at least one authorized image and/or the at least one authorized sound; and wherein the entry management device is operable to perform an action based upon detection of a trigger event by the at least one network device. In one embodiment, the trigger event includes the at least one network device detecting a presence of a person or an object. In another embodiment, the action includes the entry management device instructed a second network device to record video or take photos of the person or the object or follow the person or the object. In yet another embodiment, the entry management device and/or the at least one secondary camera are operable to detect a delivery of a package, and wherein the entry management device is operable to transmit a package delivery alert to at least one user device associated with the entry management device. In another embodiment, the entry management device includes a facial recognition module operable to identify individuals approaching the access point as individuals authorized to enter the access point or perform an action near the access point or individuals not authorized to enter the access point or perform an action near the access point. The entry management device is operable to automatically transmit a lock command to the electronic lock when an unrecognized individual approaches the access point. In a further embodiment, the entry management device is in wireless communication with at least one robot, wherein the entry management device is operable to activate and/or deactivate the at least one robot, and wherein activation of the at least one robot causes the at least one robot to track and follow at least one individual proximate to the access point.

In yet another embodiment, the present invention includes an entry management system including an entry management device including a housing comprising a camera, a microphone, and a speaker; an access point comprising an electronic lock that is operable to lock and unlock the access point; wherein the electronic lock is in wireless communication with the entry management device, and wherein the electronic lock is operable to receive commands from the entry management device to lock and unlock the access point; wherein the electronic lock and/or the entry management device is in wireless communication with at least one network device; wherein the entry management device is operable to process visual data produced by the camera and/or audio data produced by the microphone to determine if an image and/or a sound displayed to the entry management device corresponds with at least one authorized image and/or at least one authorized sound for the access point; wherein the entry management device is operable to send a command to the electronic lock to unlock the access point if the image and/or the sound displayed to the entry management device correctly corresponds with the at least one authorized image and/or the at least one authorized sound; and wherein the entry management device automatically activates and/or deactivates one or more of the at least one network device when the entry management device sends a command for the electronic lock to unlock. In a further embodiment, the at least one network device includes at least one secondary camera, and wherein activation of the at least one secondary camera causes the at least one secondary camera to turn on, move position, and/or capture an image or a video. In another embodiment, when the electronic lock locks, the entry management device automatically sends at least one message to deactivate or activate one or more of the at least one network device, wherein the one or more of the at least one network device includes at least one smart light, at least one thermostat, and/or at least one robot.

These and other aspects of the present invention will become apparent to those skilled in the art after a reading of the following description of the preferred embodiment when considered with the drawings, as they support the claimed invention.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout.

FIG. 2 shows a front left perspective view of an artificial intelligence entry management device according to select embodiment of the disclosure;

FIG. 3 shows a back left perspective view of the artificial intelligence entry management device according to FIG. 2;

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

Figure 18:
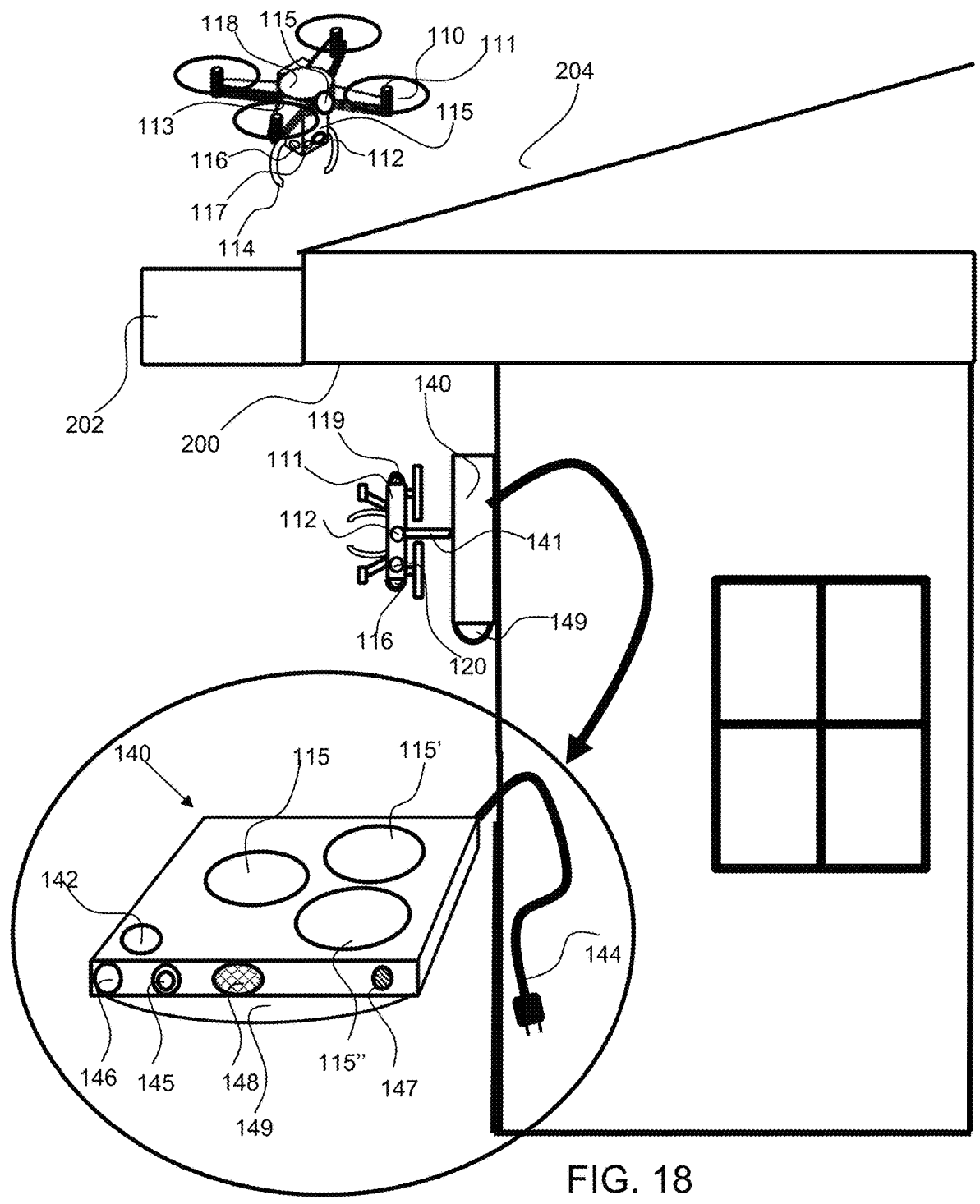

FIG. 18 shows an exemplary docking station configured under the eave of a home.

Figure 19:
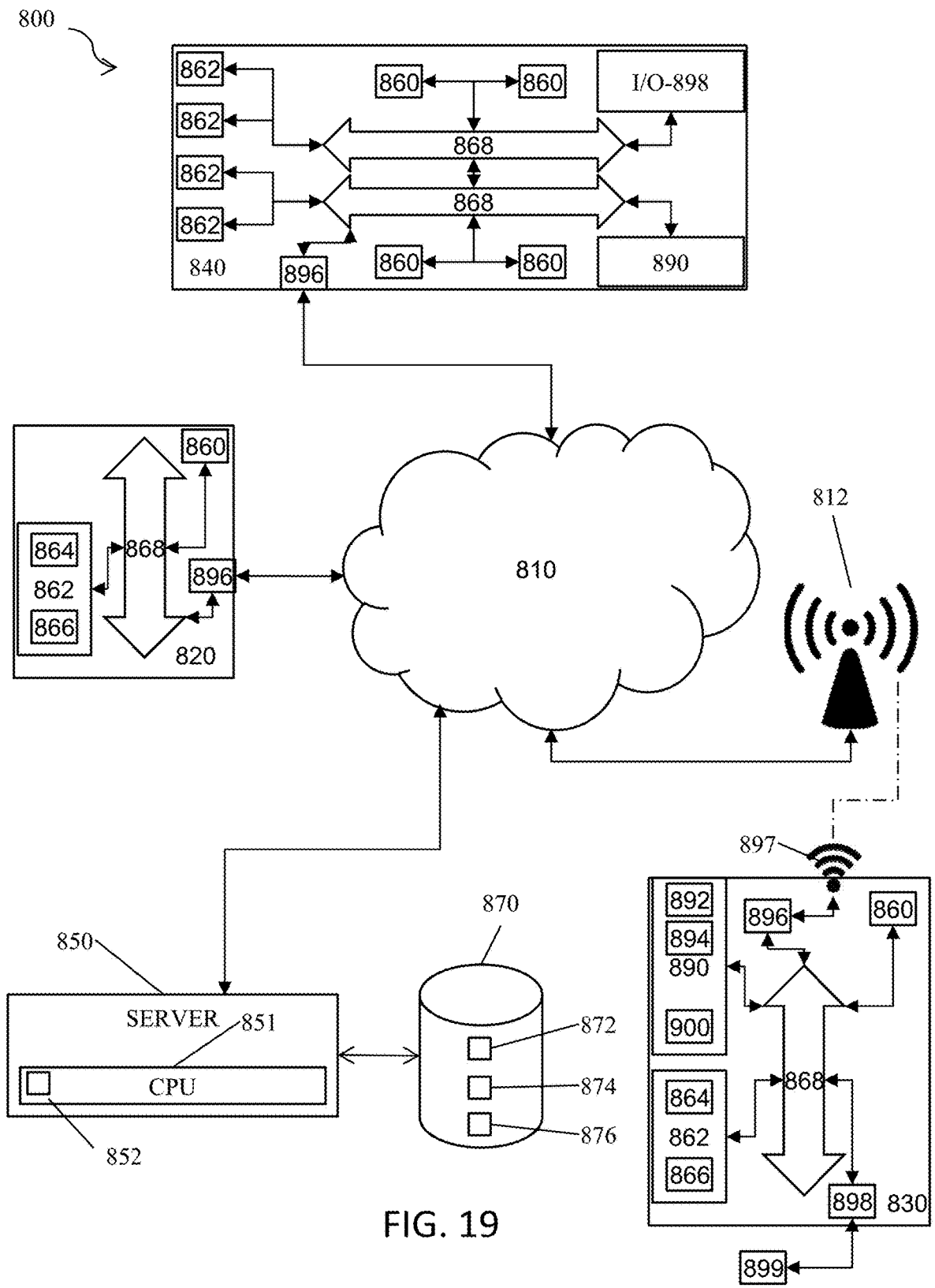

FIG. 19 is a schematic diagram of a system of the present invention.

DETAILED DESCRIPTION

The present invention is generally directed to entry management systems.

In one embodiment, the present invention includes an entry management system including an entry management device including a housing comprising a camera, a microphone, and a speaker; an access point comprising an electronic lock that is operable to lock and unlock the access point; and a software platform; wherein the electronic lock is in direct wireless communication with the entry management device or wherein the electronic lock is in wireless communication with the entry management device via the software platform, and wherein the electronic lock is operable to receive commands from the entry management device to lock and unlock the access point; wherein the entry management device is in wireless communication with at least one network device through the software platform; wherein the entry management device is operable to process visual data produced by the camera and/or audio data produced by the microphone to determine if an image and/or a sound displayed to the entry management device corresponds with at least one authorized image and/or at least one authorized sound for the access point; wherein the entry management device is operable to send a command to the electronic lock to unlock the access point if the image and/or the sound displayed to the entry management device matches the at least one authorized image and/or the at least one authorized sound; and wherein the entry management device is operable to cause the at least one network device to perform an action based upon detection of a trigger event. In one embodiment, the at least one network device includes at least one secondary camera, wherein the trigger event includes a detection of a person, an object, movement, or audio by the entry management device, and wherein the action includes the at least one secondary camera photographing an area associated with the trigger event, recording video of the area associated with the trigger event, repositioning to view the area associated with the trigger event, and/or zooming in on the area associated with the trigger event. In one embodiment, the at least one network device includes at least one drone, wherein the at least one drone is operable to follow at least one object or person of interest, take photographs of the at least one object or person of interest, record video of the at least one object or person of interest, and/or follow a surveillance route. In one embodiment, the trigger event includes the entry management device receiving the image and/or the sound, and wherein the at least one network device includes at least one media device, at least one thermostat, at least one lighting device, at least one smart window device, and/or at least one smart socket, and wherein the action includes turning on, turning off, and/or adjusting a setting on the at least one media device, the at least one thermostat, the at least one lighting device, the at least one smart window device, and/or the at least one smart socket. The entry management device is further operable to receive a second image and/or a second sound, wherein the entry management device is operable to cause the at least one network device to perform a second action based upon receipt of the second image and/or the second sound, wherein the second action includes an action different than the action. In another embodiment, the entry management device or at least one secondary camera in wireless communication with the entry management device is operable to detect movement near at least one delivered package, and wherein the entry management device is operable to transmit an alert in response to the movement near the at least one delivered package or send a command to at least one tertiary camera to capture at least one image or at least one video of an area where the movement was detected near the at least one delivered package. In yet another embodiment, the at least one authorized image and/or the at least one authorized sound is associated with a user profile, and wherein the user profile includes at least one setting or at least one activation status for the at least one network device, wherein trigger event includes unlocking the access point and the action includes implementing the at least one setting or the at least one activation status for the at least one network device. In another embodiment, the at least one authorized image and/or the at least one authorized sound is associated with a user profile, and wherein the entry management device is operable to retrieve information from the software platform based on the user profile and play an audio message based on the information from the software platform. In another embodiment, the at least one authorized image includes a face of a user, and wherein the entry management device and/or the software platform is operable to perform facial recognition to match the image to the face of the user. In yet another embodiment, the entry management device is operable to perform image or video analysis on an image or video obtained from the entry management device or the at least one network device, wherein the image or video analysis includes recognition of at least one person, at least one weapon, at least one action, or at least one sound.

In another embodiment, the present invention includes an entry management system including an entry management device including a housing comprising a camera, a microphone, and a speaker; an access point comprising an electronic lock that is operable to lock and unlock the access point; and a software platform; wherein the electronic lock is in direct wireless communication with the entry management device or wherein the electronic lock is in wireless communication with the entry management device via the software platform, and wherein the electronic lock is operable to receive commands from the entry management device to lock and unlock the access point; wherein the entry management device is in wireless communication with at least one network device through the software platform; wherein the entry management device is operable to process visual data produced by the camera and/or audio data produced by the microphone to determine if an image and/or a sound displayed to the entry management device corresponds with at least one authorized image and/or at least one authorized sound for the access point; wherein the entry management device is operable to send a command to the electronic lock to unlock the access point if the image and/or the sound displayed to the entry management device matches the at least one authorized image and/or the at least one authorized sound; and wherein the entry management device is operable to perform an action based upon detection of a trigger event by the at least one network device. In one embodiment, the trigger event includes the at least one network device detecting a presence of a person or an object. In another embodiment, the action includes the entry management device instructed a second network device to record video or take photos of the person or the object or follow the person or the object. In yet another embodiment, the entry management device and/or the at least one secondary camera are operable to detect a delivery of a package, and wherein the entry management device is operable to transmit a package delivery alert to at least one user device associated with the entry management device. In another embodiment, the entry management device includes a facial recognition module operable to identify individuals approaching the access point as individuals authorized to enter the access point or perform an action near the access point or individuals not authorized to enter the access point or perform an action near the access point. The entry management device is operable to automatically transmit a lock command to the electronic lock when an unrecognized individual approaches the access point. In a further embodiment, the entry management device is in wireless communication with at least one robot, wherein the entry management device is operable to activate and/or deactivate the at least one robot, and wherein activation of the at least one robot causes the at least one robot to track and follow at least one individual proximate to the access point.

In yet another embodiment, the present invention includes an entry management system including an entry management device including a housing comprising a camera, a microphone, and a speaker; an access point comprising an electronic lock that is operable to lock and unlock the access point; wherein the electronic lock is in wireless communication with the entry management device, and wherein the electronic lock is operable to receive commands from the entry management device to lock and unlock the access point; wherein the electronic lock and/or the entry management device is in wireless communication with at least one network device; wherein the entry management device is operable to process visual data produced by the camera and/or audio data produced by the microphone to determine if an image and/or a sound displayed to the entry management device corresponds with at least one authorized image and/or at least one authorized sound for the access point; wherein the entry management device is operable to send a command to the electronic lock to unlock the access point if the image and/or the sound displayed to the entry management device correctly corresponds with the at least one authorized image and/or the at least one authorized sound; and wherein the entry management device automatically activates and/or deactivates one or more of the at least one network device when the entry management device sends a command for the electronic lock to unlock. In a further embodiment, the at least one network device includes at least one secondary camera, and wherein activation of the at least one secondary camera causes the at least one secondary camera to turn on, move position, and/or capture an image or a video. In another embodiment, when the electronic lock locks, the entry management device automatically sends at least one message to deactivate or activate one or more of the at least one network device, wherein the one or more of the at least one network device includes at least one smart light, at least one thermostat, and/or at least one robot.

None of the prior art discloses an entry management device operable to command and control other network devices as described herein.

In select embodiments of the disclosed artificial intelligence entry management device, a plurality of lights may be included. The plurality of lights may be positioned around a periphery of the oval shape of the housing. In select embodiments, each of the plurality of lights may be a light emitting diode. One feature may be that each of the light emitting diodes of the plurality of lights may be configured to light up based on sounds emitted from the speaker, whereby the plurality of lights may be configured to mimic the artificial intelligence entry management device as if it were talking. Another feature may be that the plurality of lights can be configured to indicate an alarm has been triggered by flashing. Another feature may be that the plurality of lights can be configured to indicate a status of the artificial intelligence entry management device.

In select embodiments of the disclosed artificial intelligence entry management device, an LED lens may be included. The LED lens may be configured to cover and protect the plurality of lights. The LED lens may have the oval shape of the housing.

In select embodiments of the disclosed artificial intelligence entry management device, a mounting bracket may be included. The mounting bracket may be configured for mounting the housing of the artificial intelligence entry management device to a surface. The mounting bracket may have the oval shape of the housing.

In select embodiments of the disclosed artificial intelligence entry management device, a power source may be included. The power source may be a hardwired power source, a battery powered power source, the like, or combinations thereof.

In select embodiments of the disclosed artificial intelligence entry management device, a wireless communication device may be included. The wireless communication device may be housed inside of the housing protrusion portion of the housing of the artificial intelligence entry management device. The wireless communication device may be configured to communicate with the entry management system or other artificial intelligence entry management devices via a wireless communication. The wireless communication of the wireless communication device may be selected from a group consisting of: Wi-Fi; UHF radio waves in the industrial, scientific and medical radio bands, from 2.402 GHz to 2.480 GHz, and building personal area networks (PANs), also known as Bluetooth® (Bluetooth trademark owned by Bluetooth SIG, Inc. of Kirkland, Wash.); the like; or combinations thereof.

One feature of the disclosed artificial intelligence entry management device may be that the speaker can be positioned in the housing protrusion portion and oriented toward the substantially open middle. This orientation of the speaker may be for projecting sound from the speaker out of the artificial intelligence entry management device.

Another feature of the disclosed artificial intelligence entry management device may be the inclusion of a processor. The processor may have a non-transitory computer readable storage medium including software. The software of the processor may have program instructions configured for providing artificial intelligence to the artificial intelligence entry management device. In select embodiments, the software may be configured for development of intelligence within the artificial intelligence entry management device, including, speech recognition, problem-solving, learning, planning, the like, combinations thereof, etc. In select embodiments of the disclosed artificial intelligence entry management device, the processor may be a networked processor. The networked processor may be connected to the artificial intelligence entry management device via a wireless communication to the wireless communication device on the artificial intelligence entry management device. In other select embodiments, the processor may be a chipped processor. The chipped processor may be housed inside of the housing protrusion portion of the housing of the artificial intelligence entry management device.

An exemplary artificial intelligence entry management system may employ an AI system similar to or including features of the Watson AI system. Watson is a supercomputer that combines artificial intelligence (AI) and sophisticated analytical software for optimal performance as a "question answering" machine. The supercomputer is named for IBM's founder, Thomas J. Watson. The Watson supercomputer processes at a rate of 80 teraflops (trillion floating-point operations per second). To replicate (or surpass) a high-functioning human's ability to answer questions, Watson accesses 90 servers with a combined data store of over 200 million pages of information, which it processes against six million logic rules. It is a platform for exploring, visualizing and presenting data that utilizes Watson's cognitive capabilities to automatically surface data-driven insights and recommend ways of presenting the data.

In another aspect, the instant disclosure embraces an artificial intelligence entry management system. The disclosed artificial intelligence entry management system may generally include utilizing the disclosed artificial intelligence entry management device in any of the various embodiments and/or combination of embodiments shown and/or described herein. As such, in general, the disclosed artificial intelligence entry management system may include the disclosed entry management device with a camera, a microphone, a motion detector, a speaker, a wireless communication device, the like, and/or combinations thereof. In addition, the disclosed artificial intelligence entry management system may include an artificial intelligence device. The artificial intelligence device may be in communication with the entry management device. The artificial intelligence device may include a processor with a non-transitory computer readable storage medium having software with program instructions configured for providing artificial intelligence to the artificial intelligence entry management device.

One feature of the disclosed artificial intelligence entry management system may be that the software may have programming instructions that, when executed, cause the entry management device to execute entry management and ecommerce support functions including the delivery of messages, directives, instructions, greetings, recordings, and facilitating the connection of a third party for two-way audio/video communication.

Another feature of the disclosed artificial intelligence entry management system may be that the motion detector of the entry management device may be configured to activate upon motion and provide a greeting, command, or instructions, whereby the system activates upon recognition of a paired mobile device. The paired mobile device may be a stored identification paired via the approval of an owner/administrator. The owner/administrator may be individuals assigned programming rights configured to allow the owner/administrator to make selections remotely via the artificial intelligence entry management system.

Another feature of the disclosed artificial intelligence entry management system may be that, when activation occurs, the artificial intelligence entry management system may be configured to provide a spontaneous response, or a pre-programmed response in accordance with the device it detects.

Another feature of the disclosed artificial intelligence entry management system may be that the artificial intelligence entry management system may be configured to provide a spontaneous response, or a pre-programed response in accordance with the image read by its camera.

Another feature of the disclosed artificial intelligence entry management system may be that, when activated, simultaneously, a notification is sent to the owner/administrator with an option to engage remotely in two-way communication, activate a preprogrammed or custom message, provide a virtual key or activate the recording for a message, detect a person or a device via the camera, the microphone, the motion detector, or the wireless communication device and provide an intelligent response to the person or device via the speaker or the wireless communication device.

The artificial intelligence entry management system may ask if a third party would like to leave a message and an audio message may be recorded via the microphone of the artificial intelligence entry management device and this message may be relayed to an administrator immediately, or upon their request to play the message, which may be one a plurality of recorded messages. The artificial intelligence entry management system may ask a third party if they would like to interface with an administrator and if and when the administrator confirms the request, a audio interface or call may be initiated between the administrator and the third party and or a video call, wherein the administrator is shown on the display screen of the artificial intelligence entry management device and the third party is shown on a display screen of the electronic device used by the administrator. An exemplary artificial intelligence entry management system may be configured to record messages for a number of administrators and a message may be indicated for only one or more than one recipient. Only the messages directed by the messenger would have access to these messages, thereby making it possible to leave a private message for a single recipient.

Another feature of the disclosed artificial intelligence entry management system may be that when a package is scanned by the camera of the entry management device, the artificial intelligence entry management system may be configured to initiate a geo-fence around an area of the entry management device, or any area that that a camera of the system can detect, like a monitored designated area (MDA) or multiple monitored designated areas (MDAs) created by the artificial entry management system in the view of the camera, or in view of multiple cameras of the artificial intelligence entry management system. Wherein, when the geo-fence or MDA is initiated, the entry management device may be configured to utilize the motion detector, camera, microphone, or combinations thereof for creating the geo-fence or MDA monitored area, having a proximity distance from the AI entry management device, for detecting a breach of the geo-fence area or MDA. In select embodiments, when a breach of the geo-fence area or MDA is detected, the artificial intelligence entry management system may be configured to: alert the owner via a wireless notification; trigger the entry management device to set off an alarm of the entry management device; trigger an external alarm; the like; and/or or combinations thereof. In select embodiments, when the package is placed in the geo-fence monitored area or MDA the entry management device, the carrier of the package can activate the entry management device to monitor the geo-fence area or MDA via the motion detector, camera, microphone, or combinations thereof. In other select embodiments, a carrier of the package can deactivate the geo-fence or MDA by scanning of the package or a virtual key, whereby the package may be retrieved, whereby the notification, alarms, or combinations thereof are deactivated by the scanning of the package or the virtual key, and a subsequent scan can reactivate the geo-fence monitored area or MDA.

In another embodiment, the artificial intelligence entry management system is operable to implement proximity detection and alerts upon a trigger, such as the entry management device scanning a package or a user entering a house associated with the artificial intelligence entry management system. By way of example, the artificial intelligence entry management system is operable to detect movement in a visual or auditory range of the artificial intelligence entry management device. Alternatively, scanning a label of a package or another trigger event causes the artificial intelligence entry management device to arm other devices to detect movement or sound. In one example, a camera connected to the entry management device either directly or through a platform is operable to detect movement in an area near a delivered package, with this area being outside of a range of vision of the artificial intelligence entry management device but within an area inside a range of vision of the camera. The area inside the range of vision of the camera is operable to be a defined space such as a geofence or an area within a predetermined distance of a monitored area such as a package delivery zone, a front porch, etc. Geofences and monitored areas are operable to be defined centroidally (i.e., relative to a central point) or non-centroidally (ex: a perimeter around an object or a perimeter of a space, such as a perimeter of a porch).

An exemplary artificial intelligence entry management system may be used to collect audio-visual information that may be recorded in the event of a breach of an access point. Sensors on an access point may be coupled with the artificial intelligence entry management system and when an access point is opened without authorization from the artificial intelligence entry management system, an alarm may sound and the camera and microphone may record information for later evaluation to determine the source of the breach. For example, a video may be recorded that is later watched to identify a thief breaking into a home. Note that a motion sensor may be coupled with the artificial intelligence entry management system and video and audio may be recorded when the motion detector is activated.

Another feature of the disclosed artificial intelligence entry management system may be that the artificial intelligence device can be configured to learn various inputs. An artificial intelligence device may learn from past events and can learn to recognize or predict when a particular person may be arriving or departing from a dwelling and may produce messages or questions that correspond with a recognized person or event. The artificial intelligence entry management system may learn to associate features of a person or vehicle that can be used to verify a person or a company. For example, the artificial intelligence entry management system may use the camera to take pictures when a delivery person arrives and these pictures may be analyzed for logos, or emblems that can be used to identify a person approaching the artificial intelligence entry management device. The camera may be used to detect emblems, logos, color or uniforms, hat shapes, etc. Likewise, an exemplary artificial intelligence entry management system may be configured to detect threats including masks or a weapon, such as a gun or knife. In the event that a threat is detected, a robot, land or aerial, may be configured to record images and/or video of the threat and may be configured to follow said threat as they leave the area. A robot may be able to communicate, such as by transmitting data, video and/or audio data, position data, such as through a global positioning system (GPS) to an administrator and/or emergency authorities to aid in tracking and locating said threat, such as said third party. The artificial intelligence entry management system may control the robot without input from the administrator to record images and/or follow a threat. The robot may also have artificial intelligence embedded in the robot and act independently to recognize threats, record threat data, images and video, and/or follow a threat. A robot may also be configured to receive packages from a delivery person and they may transport the package to a secondary location, such as within a dwelling or another building, or to a storage container. The access point may be unlocked by the system for the robot deliver a package. Likewise, a robot may be configured to retrieve a package through an access point and deliver the package to a person or other robot at the location.

Accordingly, in one embodiment, the present invention is directed to an artificial intelligence entry management system comprising an artificial intelligence entry management device comprising: a housing comprising: a camera; a microphone; a speaker; a controller; a wireless communication device; an access point comprising an electronic lock that is controlled by the controller to lock and unlock said access point; an artificial intelligence device in communication with the artificial intelligence entry management device including a processor with a non-transitory computer readable storage medium comprising software having program instructions configured for providing artificial intelligence to the artificial intelligence entry management device; a robot having a wireless signal transceiver that communicates with the controller of the artificial intelligence entry management device; wherein, the artificial intelligence entry management device is configured to work on a networkable platform with networked software accessible and interactive with said artificial intelligence entry management device and member devices running the networked software and participating on the networkable platform, wherein the networkable platform is configured for communication between said member devices including member devices of owners, service personnel, property management, real estate professionals, short term rentals, hotels, and employees, wherein the networkable platform is configured to provide access and logistics to access points. The camera is adapted to read a virtual key, and upon verifying the virtual key, the software of the artificial intelligence device is configured to unlock said electronic lock to said access point. The software of the artificial intelligence device is configured to provide a logistic message via the speaker including directions to the access point. The robot comprises a robot speaker and wherein said logistic message is emitted by said robot speaker. The robot comprises a robot speaker and wherein said robots emits a contextual greeting from said robot speaker. The robot is configured to open said access point. The robot comprises a package manipulator configured to retain and release a package, wherein the robot is configured to move a package from a first location to a second location. The robot comprises a robot camera configured to take images. The robot comprises an artificial intelligence device that is configured to identify a package or a threat from an image taken by said robot camera, wherein the threat is a person. The robot is configured to take images of said threat and transmit said image of said threat to said artificial intelligence entry management system or an authority. The robot is configured to track the threat and configured to transmit a location of said threat to said artificial intelligence entry management system or an authority. The robot is configured to take an image of a vehicle said threat and is configured to transmit said image of the vehicle is transmitted to said artificial intelligence entry management system or an authority. The artificial intelligence entry management system further includes a docking station for said robot, wherein the docking station comprises a charging port to charge a battery on the robot when said robot is docked on the docking station. The docking station also comprises an interchangeable battery configured to be exchanged with a battery on the robot when said robot is docked on the docking station. The docking station is also operable to receive power from a renewable power source. The docking station comprises a motion detector in one embodiment. The docking station is configured to monitor a substantial portion of a perimeter of a building having said access point, wherein at least 80% of the perimeter is monitored by said motion detector. The docking station also comprises a speaker. The docking station is also configured to emit an alarm. In another embodiment, the docking station comprises a motion detector and wherein the alarm is emitted when motion above a threshold motion is detected by the motion detector. A plurality of robots and a plurality of docking stations are also operable to be provided, wherein the plurality of robots are configured to dock on said docking stations, wherein the docking stations are configured around a building configured on a property and wherein the property comprises said access point and wherein the plurality of robots each comprise a robot camera that is configured to take images, wherein the plurality of robots are configured to monitor a substantial portion of a perimeter of the building, wherein at least 80% of the perimeter is monitored by said cameras on said plurality of robots. Each of the plurality of robots comprise a microphone that is configured to record sounds. The robot comprising a controller and wherein the robot acts autonomously from the entry management device to monitor a perimeter around a building. Each of the plurality robots comprise a speaker that is configured to emit an alarm when a threat is detected. Additionally, each of the plurality robots comprise a light that is configured to turn on when a threat is detected. A first robot of the plurality of robots communicates a location of said first robot with a second robot of the plurality of robots to follow a threat. The plurality of robots are operable to include aerial robots that follow a threat and form a robot swarm around said threat. A mobile device that interfaces with the artificial intelligence entry management system is also operable to be included in the present system, and wherein the mobile device is configured to activate the robot to monitor a substantial portion of a perimeter. The robot is also configured to conduct surveillance routes from the docking station. The robot comprises a deterrent device in one embodiment, such as a pepper sprayer or a weapon such as a gun, knife or spear.

A robot may be a land or aerial robot, wherein the land robot moves over land and wherein the aerial robot is configured to fly. An aerial robot may have one or more propellers and a land robot may have a wheel or wheels, actuating legs or treads for movement over land. A robot may be configured with a camera to monitor an area around a dwelling or building, such as a place of business and may be instrumental in creating the geofence area. A camera may be a thermal camera that more effectively detects when a person or animal is moving about a building. A thermal camera may capture still digital images or video. A robot may be configured to dock with a docking station wherein the robot is charged, or exchanges batteries. The docking station may be hard wired to receive electricity from the dwelling or place of business to charge the robot or the batteries for the robot, and/or the docking station may be coupled with a renewable power supply, such as a wind generator (wind turbine), or a solar generator, such as a photovoltaic cell (solar panel). The docking stations may be configured in strategic positions about the dwelling or place of business to provide effective monitoring. For example, four robots may be configured with one at each corner of the home. The robots and/or the docking stations may be configured to provide a substantially complete perimeter monitoring of the building, dwelling or place of business, wherein are least 80% or more of the perimeter is captured by a camera of the plurality of robots, or preferably 90% or more of the perimeter and even more preferably 95% or more of the perimeter. There may be cases where 100% of the perimeter is monitored and there may be overlap in the monitored area from one robot to another robot.

A docking station may be configured under an overhang or eaves of a building or under the rain gutter of the building for protection from the elements. An aerial robot may dock on top of the docking station between the overhang and the docking station. An aerial robot may have a docking extension the enables the aerial robot to dock to the docking station from underneath of the docking station or horizontally with the docking station. A docking station may have a docking cover that is configured to extend over the aerial robot to protect the aerial robot from the elements. The docking cover may be transparent to enable surveillance by the aerial robot when docked under the docking cover. A docking station may have a light that acts as an exterior light, or flood light around the building and this light may aid in the surveillance by the docking station or aerial robot by illuminating an area around the building.

The robots, such as aerial robots may be configured to monitor or conduct surveillance using a camera and/or a microphone. The robot may be programmed to focus in on any movement detected above some threshold of movement, and/or follow a person entering a geofence region or area around a dwelling or access point. The robots may take images, photographs or video, of a person entering such an area. In addition, the robots may be configured with lights and these lights may be programmed to activate when motion is detected or a sound in detected. The lights may be bright lights, such as flood light, producing about 500 lumens or more, or about 500 lumens or more, about 1,000 lumens or more, about 2,500 lumens or more, about 5,000 lumens or more and any range between and including the lumens provided. In addition, the robots may be configured with a speaker that is configured to produce an alarm when an intruder is detected, such as motion above a threshold motion being detected or sound above a threshold sound being detected. The lights may be any suitable color and may flash in an alarm mode while an alarm sound is emitted from the speaker. An administrator may be able to activate the surveillance mode of the robots through a user interface of the Artificial Intelligence entry management system, such as a compute or mobile device, such as a mobile phone. Also, a user may be able to activate an alarm mode to cause the robot(s) to produce flashing lights and/or an alarm sound from their speakers. An administrator may also be able to activate a light mode, wherein the lights on the robot are turned on. The robots may be aerial robots that are configured around the home and the lights on the robots may provide better visibility around the home, for example.

An exemplary artificial intelligence entry management system may include a robot, such as a land or aerial robot, that may be configured to move packages from a first location to second location, monitor a delivery location and/or communicate with people such as a delivery person. A robot may have a speaker, such as a directional speaker, to enable communication with a third party to provide a greeting and/or logistic information to a said third party. The speaker may be used to transmit a message that was recorded by a user or an administrator, such as specific instructions including logistic instructions. When a delivery person arrives and is identified by the robot, the pre-recorded message may be emitted through the robot speaker. In addition, a user or administrator may be notified when a person arrives at the building or home and the administrator may then view the person through a video captured by the camera on the robot and may communicate in real time through the robot speaker. The user may provide a greeting and then provide specific instructions for delivery of a package, for example. The user may communicate with the robot through their mobile device, such as a mobile phone.

A robot may be configured to lead the delivery person to an access point for delivering the package. An exemplary robot may be configured to take a package from a deliver person and deliver the package to an access point, such as inside a building or into a storage container. A directional speaker may enable communication with a third party with some level of privacy, wherein only the person the speaker is directed at can effectively hear the communication. Also, a directional speaker may enable effective communication from an aerial robot wherein the communication, such as logistic instructions, can be effective heard by a third party over noise made by the aerial robot from the propellers, for example. An administrator or authorities may be able to communicate through a speaker on the robot. A robot may be configured to pick up a delivery package using a package manipulator and deliver the package to a deliver location, which may be a storage container or a secondary location such as to a back porch or fenced in area for added security. In an exemplary embodiment, an aerial robot may guide or direct a delivery person to a delivery location. An aerial robot may be used for monitoring a delivery location and may provide input to a geofence or MDA and may provide input to the exemplary artificial intelligence entry management system if someone intrudes into a geofence location. An exemplary artificial intelligence entry management system may be configured to direct and control a robot to investigate abnormalities in a geofenced area, MDA, or surrounding area, such as when a noise is detected. Likewise, an exemplary robot may be configured to follow and record a delivery to an access point, to ensure the delivery is made.

An aerial robot may be small in size, or micro-robots, having a length, width and height of no more than about 25 mm, or even no more than about 10 mm. These micro aerial robots may be inconspicuous and easy to dock around the building.

A drone swarm may be utilized to follow, track, and deter threats. A drone swarm is defined as two or more robots, such as aerial robots, also referred to as drones, that follow an individual, such as a threat. A drone swarm may follow a person that has stolen a package delivered to an access point, or a storage container or that has breached a geofence area or a monitored designated are or areas (MDA) created by the artificial intelligence entrance management device in the view of the camera.

An exemplary artificial intelligence entry management device is configured to work on a networkable platform with networked software accessible and interactive with said entry management device and member devices running the networked software and participating on the networkable platform, wherein the networkable platform is configured for communication between said member devices including member devices of owners, service personnel, property management, real estate professionals, short term rentals, hotels, and employees, wherein the networkable platform is configured to provide access and logistics to access points.

Another feature of the disclosed artificial intelligence entry management system may be that the software of the artificial intelligence device can be configured to relate to the occupants of the building for enabling name recognition by the entry management device.

Another feature of the disclosed artificial intelligence entry management system may be that the software of the artificial intelligence device can be configured to enable the entry management device to establish contact, record messages, or deliver a message from the person or persons named.

Another feature of the disclosed artificial intelligence entry management system may be that the artificial intelligence device can be configured to interface with other artificial intelligence devices.

Another feature of the disclosed artificial intelligence entry management system may be that when the entry management device is activated by motion, the detection of a paired mobile device, the presentation of a virtual key, or the owner/administrator, the entry management device may be configured to cause the programming instructions of the software to activate or turn on the artificial intelligence entry management system.

Another feature of the disclosed artificial intelligence entry management system may be that the artificial intelligence device may be configured to cause the entry management device to detect the person and interpret voice detected by the microphone from the person.

Another feature of the disclosed artificial intelligence entry management system may be that the intelligent response provided by the artificial intelligence device may be selected from a group consisting of: logistics, a greeting, a command, directions, a message, an inquire, a recording request, an alarm to the speaker, the like, and/or combinations thereof.

Another feature of the disclosed artificial intelligence entry management system may be that the wireless communication device may be configured to establish the identity of the person or the device once paired. Wherein, after pairing, the artificial intelligence device may be configured to recognize the device and provide a customized greeting, specific instructions, access, or actions for the associated device.

Another feature of the disclosed artificial intelligence entry management system may be that the artificial intelligence device may be configured to require authentication of an image or mobile device that is active and unlocked, the device must be active, or combinations thereof, prior to providing the customized greeting, the specific instructions, access, or the actions for the associated device.

Another feature of the disclosed artificial intelligence entry management system may be that the artificial intelligence device may be configured to recognize the previously paired mobile device and a virtual key or an identification sequence. Wherein, if there is not a confirmed identification, a third-party authentication is sought which is an embedded code within the virtual key, or an audible or verbal response code including a word or words, a sentence, a number or numbers, sounds, or letters.

Another feature of the disclosed artificial intelligence entry management system may be that the virtual key utilized may be a humanly created mark, drawing, written sequence of numbers, letters, abstract sketch, or picture. A virtual key may be a digital photograph that an administrator sends to a third party for entry. The digital photograph may be from the administrator's library of photographs, for example. A virtual key may include words, letters, and the like. A virtual key may include a particular motion across a touchscreen, such as the display screen of the artificial intelligence entry management device. A virtual key that is from an administrator's personal photo library or stored on their electronic device in their photo gallery is a personalized virtual key. Also, a virtual key created by an administrator, such as by using a touch screen to draw a virtual key, such as a specific zig-zag pattern, is also a personalized virtual key. An application software may be part of the artificial intelligence entry management system and may be opened for an administrator to create a unique personalized virtual key through taking a photograph, or using the touch-screen to draw out a virtual key. This App or subroutine may be opened when a new authorization for entry in entered into the system. The system may ask for the person's name, their contact information, time or entry, or span of time, access point to be unlocked and for any messages to be delivered to the person/entrant upon presenting the virtual key to the artificial intelligence entry management device. A personalized virtual key is a digital file sent by an administrator that is created on or stored on their electronic device and therefore may be more secure than a virtual key that is generic.

A virtual key can be used as an electronic device or file virtual key, wherein the virtual key is used to unlock an electronic device or a file in an electronic device. A computer may require a person to show a virtual key to a camera, such as a camera coupled to the computer before the computer will unlock for use. The virtual key may take the place of a password that is typed into the computer. Passwords can be hacked and stolen but a virtual key may be much more difficult to obtain as it is configured on a separate electronic device or a separate physical item. Likewise, a virtual key may be used to unlock a file on an electronic device. The computer may request that a virtual key be verified by showing the virtual key to the camera of the computer before a file can be opened. Again, this may be very difficult for a hacker to obtain.

An exemplary artificial intelligence entry management system may require a plurality of virtual keys to be shown or displayed prior to verification and unlocking of a locked access point. A user may have to show two or more digital images that may have been sent to them by the artificial intelligence entry management system. In addition, the user may have to show these digital images, such as digital photographs, in a specific sequence to produce the virtual key. The artificial intelligence entry management system may send the digital photographs in a single file or may send them as separate files for security purposes. A virtual key may require a user to select digital images displayed on a display screen of the artificial intelligence entry management device. The artificial intelligence entry management device may display a plurality of images, such as four or more and the user may have to select one or more to produce the virtual key. Again, the artificial intelligence entry management system may send the images to the user and the user may then know which images to select on the display screen of the artificial intelligence entry management device. Furthermore, the artificial intelligence entry management system may require the user to select the digital images, or image virtual keys in a touch screen 17 that enables a user to select one or more digital images for entry. The user may have to select a plurality of digital images to produce a virtual key and the image virtual key may require each image virtual key 50, 50', 50" to be selected in a specific sequence, such as balloon, dog, cat, for example. A plurality of other digital images 66 or photographs may also be displayed on the display screen during the selection or entry of the virtual key.

A system administrator, or the artificial intelligence entry management system may automatically, send an image virtual key to a user, such as to their mobile electronic device, such as a mobile phone. The user may view the virtual key on their electronic device and then use the touch screen to select these images. The user may have to be within a certain range of the artificial intelligence entry management device to enable entry of the image virtual key by the selection of the correct images. Again, the images may have to be selected in a specific order. The artificial intelligence entry management system may send image virtual keys to a user when they are expected to arrive, such as to a cleaning professional prior to their weekly scheduled arrival. Then, when they arrive the artificial intelligence entry management device may communicate with the mobile electronic device to send the image virtual key for selection by the user. A plurality of digital images may be displayed on the user's mobile electronic device and they may then use the touch screen on their mobile electronic device to select the image virtual key.

In an alternative embodiment, a virtual key includes a biometric identifier of a user, such as a fingerprint of a user recognized by a fingerprint scanner or facial features of a user recognized by facial recognition software of the artificial intelligence entry management device or by facial recognition software of a platform in network communication with the artificial intelligence entry management device. A database stored in the platform stores biometric data and grants certain permissions to each user based on the biometric data received from the user. For example, one user is granted access to a garage based on the biometric identification, while another user is granted access to the entirety of a house.

Another feature of the disclosed artificial intelligence entry management system may be that the wireless communication device of the entry management device may be configured for exchanging data between the entry management device and fixed and mobile devices over short distances using Wi-Fi or UHF radio waves in the industrial, scientific and medical radio bands, from 2.402 GHz to 2.480 GHz, and building personal area networks (PANs), also known as Bluetooth® (Bluetooth trademark owned by Bluetooth SIG, Inc. of Kirkland, Wash.).

Another feature of the disclosed artificial intelligence entry management system may be that the artificial intelligence entry management system may be configured to notify designated security personnel.

Another feature of the disclosed artificial intelligence entry management system may be that the entry management device may be configured to work on a networkable platform with networked software accessible and interactive with any other devices running the networked software and participating on the networkable platform. Wherein the networkable platform is configured for use by a variety of members including owners, service personnel, property management, real estate professionals, short term rentals, hotels, employees, the like, etc., wherein the networkable platform may be configured to provide access and logistics to additional industries and uses.

In select embodiments of the disclosed artificial intelligence entry management system, a transponder device may be included. The transponder device may be configured to utilize a global positioning system or a wireless communication to identify a mobile device and begin to transmit a signal for easy identification and detection. In select embodiments, the transponder may be configured to be attached to a stationary object, a door, a room, a building box or a storage container. Wherein, upon the entry management device detecting the device, the programming instructions of the software may also be configured to: send out an audible noise, illuminate, provide mapping instructions or directions to the mobile device to provide guidance in locating a specific location of the stationary object, door, room, building box, or the storage container via the speaker; illuminate lights on the entry management device; provide a mapping direction on the device including: an exact location; a location inside a building, a building without a geo address, a container, a storage unit; the like; and/or combinations thereof As such, another feature of the disclosed artificial intelligence entry management system may be that the transponder device can be configured to take over where a global positioning system ends to guide the person or the device to a specific location inside a geo-fence or outside a geo-fence. Another feature of the disclosed artificial intelligence entry management system may be that the entry management device may be configured to utilize the global positioning system, Wi-Fi, rf, or a wireless communication to identify a mobile device previously paired and initiate actions including messages, access, logistics to guide the person or the device to the specific location such that the geo position of the entry management device may activate various actions. Another feature of the disclosed artificial intelligence entry management system may be that when the transponder is activated and detects the person or the device within a set range, the transponder device may be configured to emit a signal, a sound, a light, or input to the device configured to guide and direct the person or the device to the specific location.

Another feature of the disclosed artificial intelligence entry management system may be that the camera can be adapted to read a virtual key from the person or the device, and upon reading the virtual key, the entry management device may be configured to unlock an access point, provide a greeting, instructions or logistics, record a message, or establish contact with the individual requested. In select embodiments, the virtual key may be a humanly created image selected from a group consisting of: a humanly created photo; a humanly created picture; a humanly created drawing; a humanly created mark; a humanly created number or numbers; a humanly created letter or letters; a humanly created word or words; the like; and/or combinations thereof.

In select embodiments of the disclosed artificial intelligence entry management system, the access point may be a delivery storage container or mailbox. In these embodiments, the entry management device may be configured to lock and unlock the delivery storage container or mailbox. In select embodiments, the delivery storage container or mailbox may include a refrigerated compartment on an inside of the delivery storage container or mailbox. The refrigerated compartment may be configured for food or other refrigerated items. In select embodiments, the refrigerated compartment may be a first portion of the inside of the delivery storage container, and a second portion of the inside of the delivery storage container is configured for parcels. In other select embodiments, the refrigerated compartment may be the entire inside of the delivery storage container. Yet in other select embodiments, the refrigerated compartment may be the entire inside of a first delivery storage container and a second delivery storage container may be configured for parcels. In other select embodiments, the delivery storage container or mailbox may include a warmer on the inside of the delivery storage container or mailbox. The warmer may be configured to warm the inside of the delivery storage container or mailbox. The artificial intelligence entry management system may be configured to control the delivery storage container or mailbox with the ability to select warmer, refrigerated, parcel, or a combination thereof per section of the delivery storage container or mailbox.

In select embodiments, the delivery storage container or mailbox may be positioned just inside a door of a home and the entry management system may be configured to unlock and lock the door of the home for deliveries to the delivery storage container or mailbox. Wherein the position of the delivery storage container or mailbox may be configured to prevent the need for deliveries to be walked through the house to the kitchen. A feature of the delivery storage container or mailbox may be the inclusion of an ultraviolet light on an inside. The ultraviolet light may be configured for sanitizing the inside of the delivery storage container or mailbox including sanitizing any parcels placed in the inside of the delivery storage container or mailbox.

In select embodiments, the delivery storage container or mailbox may include the entry management device on an outside of the delivery storage container or mailbox. The entry management device may be configured in a separate location from the storage container however.

The artificial intelligence entry management system may be configured to produce an alarm including an alarm noise and/or light. The alarm may utilize a light and/or speaker that is part of the entry management device and/or the storage container. In select embodiments, the delivery storage container and/or the entry management device produces an alarm when the storage container is jostled or opened without authorization. A closure sensor may be configured to detect the position of the closure to the storage container and when the closure is opened without authorization, an alarm may be initiated. The storage container may also comprise a global positioning device, that is used by the artificial intelligence entry management system to monitor the location of the storage container. If the storage container is moved beyond a threshold distance from a set location, such as beyond the perimeter of an administrator's property, an alarm may be initiated. In this situation, the alarm may be initiated on the storage container, in an effort to prevent the storage container from being stolen and an alert notification may be sent to an administrator and/or authorities, such as the police. An exemplary storage container may also contain an accelerometer that detects if motion of the storage container. Again, if the storage container is jostled, such as when trying to be opened without authorization, an alarm may be initiated to deter the thief. Again, an alarm may be a light and/or sound emitted from the storage container and/or entry management device and an alert may be sent to an administrator when an alarm is activated.

A light on a delivery storage container may be configured for illuminating the delivery storage container and area around the delivery storage container or mailbox. A speaker on a delivery storage container may be configured to communicate with a delivery person and provide logistic instructions regarding a deliver, such as which compartment to deliver a package into. In other select embodiments, the delivery storage container or mailbox may include a power source being selected from a group consisting of: a wired power source; a battery operated power source; a solar power source; the like; and/or a combination thereof. In other select embodiments, the delivery storage container or mailbox may include a warmer configured to heat the inside of the delivery storage container or mailbox. In other select embodiments, the delivery storage container or mailbox may include a wireless connection configured to control the delivery storage device or mailbox via a mobile device or a personal computer, including being configured to control the locking and unlocking of the delivery storage container or mailbox, controlling the temperature inside of the delivery storage container or mailbox via the warmer or the refrigerated compartment, the ultraviolet light inside of the delivery storage container or mailbox, or combinations thereof.

Another feature of the disclosed artificial intelligence entry management system may be that the camera may be adapted to read a virtual key from the person or the device, and upon reading the virtual key, the entry management device may be configured to activate a drone to retrieve deliveries from a specific location.

Another feature of the disclosed artificial intelligence entry management system may be that the entry management device may be configured as a receptionist device for corporate, commercial, institutional or industrial applications. The receptionist device may be configured to provide custom messages for each occupant and for receiving and recording custom messages for each user. One feature of the receptionist device may be that information may be forwarded wirelessly to each occupant, or information is retrieved from the entry management device by displaying a virtual key assigned to each occupant. Another feature of the receptionist device may be that the entry management system may include a plurality the entry management devices configured as the receptionist device for corporate, commercial, institutional or industrial applications. Wherein each of the plurality of entry management devices may interact and communicate with each other, whereby the plurality of entry management devices are configured to relay messages to the occupant.

Another feature of the disclosed artificial intelligence entry management system may be that the microphone may be adapted to identify an audible key from the person or the device. Upon identifying the audible key via the microphone, the entry management device may be configured to unlock an access point or provide a greeting, information or logistics. In select embodiments, the audible key may be a word, words, a sentence, a number, a sound or sounds, wherein the microphone is configured to match the audible key with the person or device. In select embodiments, the artificial intelligence device may be configured to assign audible keys to a variety of users, whereby the artificial intelligence device may be configured to provide access or information to each of the variety of users. In other select embodiments, the artificial intelligence device may be configured to maintain a record of each of the variety of users. Yet in other select embodiments, the artificial intelligence device may be configured to record audible messages.

Another feature of the disclosed artificial intelligence entry management system is that the artificial intelligence entry management system is configured to record data, such as interactions with the system including, but not limited to, audio recordings, video recordings, dates, times, third person identification, such as electronic address, dates and/or times of entry, what access point was locked or unlocked, dates and times of system breaches, such as a lock being opened without access, or a storage container being moved. A sensor may be configured to monitor the lock status of a lock on an access point, including a lock on a storage container for delivery. In addition, a storage container may have a motion sensor or a GPS as described herein and the system may record if the storage container is tampered with or record a location if it is stolen and moved to a new location. The artificial intelligence entry management system may also keep records of the virtual keys used for entry. This recorded data may be kept on a database or computer storage drive and may be secured, whereby only a system administrator can access this recorded data.

In a further embodiment, a software platform of the artificial intelligence entry management system is operable to analyze images, video, audio, or any other content provided by the artificial intelligence entry management system to provide data such as foot traffic analytics, length of visits for customers, an amount of time spend browsing particular items or sections of items, and wait times for customers. The artificial intelligence entry management system is operable to create customer profiles based on this information and retrieve information from the customer profile for use at a later date, such as when a customer returns and is recognized by the artificial intelligence entry management system via facial recognition, scanning a code or image by the artificial intelligence entry device, audial identification by the customer of their identity, or any other method described herein.

In another embodiment, the platform of the present invention provides for automated follow ups with customers or visitors to a retail space or office space. By way of example, the software platform of the artificial intelligence entry management system collects contact information associated with visitors such as an email address, phone number, or social profile account through manual entry from a device in network connection with the artificial intelligence entry management system or through identification of this contact information through web crawling or internet searches based on a customer's name, facial recognition, or any other method of identification of a person described herein. In one embodiment, information is extracted from a social media profile such as LINKEDIN, FACEBOOK, INSTAGRAM, TWITTER or any other website or platform. For example, the information includes a job title, a company of employment, and/or hobbies and interests from a social media profile. By way of example, visitors to an office receive an email message including a survey, follow up on services provided, or solicitation from the business associated with the office 1 week after their visit to the office.

In another aspect, the instant disclosure embraces an artificial intelligence entry management system with a plurality of entry management devices. Each of the plurality of entry management devices may be the disclosed artificial intelligence entry management device in any of the various embodiments and/or combination of embodiments shown and/or described herein. As such, in general, each of the entry management devices may be configured for use with an artificial intelligence device in communication with the entry management device including a processor with a non-transitory computer readable storage medium comprising software having program instructions configured for providing artificial intelligence to the artificial intelligence entry management device. A network platform in communication with each of the plurality of entry management devices may also be included. The network platform may be configured to allow each of the plurality of entry management devices to communication with each other.

In select embodiments of the disclosed artificial intelligence entry management system with a plurality of entry management devices, the plurality of entry management devices may be installed in a neighborhood. Wherein, each of the plurality of entry management devices may be configured with the ability to communicate if a burglary occurs in any other house, or activate and pan the streets to record all traffic activity.

The terminology used herein is for the purpose of describing particular embodiments only and is not intended to limiting of the disclosure. As used herein, the term "and/or" includes any and all combinations of one or more of the associated listed items. As used herein, the singular forms "a", "an" and "the" are intended to include the plural forms as well as the singular forms, unless the contest clearly indicates otherwise. It will be further understood that the terms "compromises" and/or "comprising" when used in this specification, specify the presence of stated features, steps, operations, elements and/or components, but do not preclude the presence of addition of one or more other features, steps, operations, elements, components and/or groups thereof.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

A storage container, as used herein, is a receptable configured for receiving a package and may have a lock that is controlled by the artificial entry management system, and may be a portable storage container that can be moved to a desired location or a storage container that is fixed in a location, such as a mailbox. A storage container may be an example of an access point that is locked and unlocked by the artificial entry management system.

A smart-home system, as used herein, is a system that utilizes electronic locks to lock and unlock entry ways, such as doors to a building such as a home or place of business from a remote source, such as a mobile device or mobile phone. A smart-home system may also have subsystems to turn on or off lights, set the temperature on a home heating or air conditioning system and the like.

Referring now to FIGS. 1-7, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring now to FIGS. 1-7, in a preferred embodiment, the present invention overcomes the above-mentioned disadvantages and meets the recognized need for such an apparatus or method by providing of a smart-home system 11 having an artificial intelligence entry management device 10 for an entry management system 100. Advantageously, the smart-home system 11 is operable to include a plurality of internet of things (IoT) or smart home devices which are in network communication with the artificial intelligence entry management device 10 or operable for one-way communication or two-way communication with the artificial intelligence entry management device 10 or a platform connected to the artificial intelligence entry management device 10. In one example, the artificial intelligence entry management device 10 is operable to send a command to one or more IoT devices based on the artificial intelligence entry management device 10 scanning a code or an image, recognizing a user via audio or video input, or any other method described herein.

In an exemplary embodiment, the artificial intelligence entry management device 10 is operable to communicate with cameras to capture imagery data and track a person around a property. For example, a camera detects a guest or intruder using image or audio recognition and alerts the artificial intelligence entry management device 10 regarding the presence of the guest or intruder. The artificial intelligence entry management device 10 is operable to send an alert to a device based on this detection or is operable to command other cameras, robots, or IoT devices to track, record, communicate with, or otherwise engage with the guest or intruder. In one embodiment, a prerecorded or real-time or near real-time recording received from a user device associated with the artificial intelligence entry management device 10 is sent from the artificial intelligence entry management device 10 to other cameras, robots, or IoT devices for playback in real-time or near real-time. The recording is operable to be played aloud by multiple devices simultaneously or sequentially in one embodiment. Sequential playing of this recording is determined by which device(s) the intruder is closest to, with the devices closest to the intruder playing the recording first and devices further away from the intruder or guest playing the devices next. These recordings are operable to be repeated by these devices until an intruder or guest is no longer identified as being on the property or until a predetermined threshold of number of playbacks is reached, which causes an alert to be sent to a user associated with the artificial intelligence entry management device 10 or to the authorities.

In one embodiment, the artificial intelligence entry management device 10 is operable to command and control these cameras based on the detection of an intruder, a guest, or any other event. For example, a camera sends an image, a video, audio, or a notification of movement detection to the artificial intelligence entry management device 10, and the artificial intelligence entry management device 10 sends the image, the video, or the audio to the software platform, and the software platform uses an artificial intelligence or machine learning algorithm or other algorithm, which in one embodiment includes facial recognition or action recognition to identify an intruder or a guest. The software platform then sends a command to the artificial intelligence entry management device 10 to command the camera to zoom in on the intruder or guest or track the intruder or guest. In one embodiment, an alert is sent to a user device associated with the artificial intelligence entry management device 10 that a certain person is on the property along with an identification of where that person is on the property (ex: Karen is in your driveway or Roy is in your backyard). Alternatively, the artificial intelligence entry management device 10 commands another IoT device or a camera to zoom in on, track, or otherwise engage with the guest or intruder. In one embodiment, the artificial intelligence entry management device 10 is operable to analyze the audio, video, or image using an algorithm such as an artificial intelligence algorithm or machine learning algorithm without sending the audio, video, or image to a software platform. Alternatively, a local computing device such as an edge device is operable to analyze the audio, video, or image. In one embodiment, upon detection of an intruder or guest, the entry management device instructs one or more cameras to scan the premises for a vehicle and capture images of a vehicle. In one embodiment, cameras include all functionality recited with respect to robots below, including weapon detection, action detection, etc.

In one embodiment, one or more cameras in combination with the artificial intelligence entry management device 10 are operable to detect a delivery of a package, such as drone delivery of a package and provide an alert to a user device associated with the artificial intelligence entry management device 10. The one or more cameras are operable to capture images, video, or audio, and recognize delivery of a package via a shape of a package or actions associated with delivering the package, such as a drone landing and taking off or a delivery person performing the action of delivering a package. This recognition occurs through software of the cameras, software of the artificial intelligence entry management device 10 upon images, video, or audio being sent to the artificial intelligence entry management device 10, or the software platform upon images, video, or audio being sent to the platform. This is particularly useful in situations when the delivery location is out of a line of sight of the artificial intelligence entry management device 10.

An artificial intelligence entry management device 10 may generally include camera 22, microphone 24, motion detector 14, speaker 18, and housing 12. Housing 12 may have oval shape 16 with substantially open middle 20. Substantially open middle 20 may have housing protrusion portion 26 configured to house camera 22, microphone 24, motion detector 14, and speaker 18.

Plurality of lights 28 may be included with artificial intelligence entry management device 10. Plurality of lights 28 may be positioned around periphery 30 of oval shape 16 of housing 12. In select embodiments, each of the plurality of lights 28 may be light emitting diode 32, also known as LEDs. One feature may be that each of the light emitting diodes 32 of the plurality of lights 28 may be configured to light up based on sounds emitted from speaker 18, With this configuration, one feature of the disclosure may be that plurality of lights 28 may be configured to mimic artificial intelligence entry management device 10 as if it were talking. Another feature may be that plurality of lights 28 can be configured to indicate an alarm has been triggered by flashing. Another feature may be that plurality of lights 28 can be configured to indicate a status of the artificial intelligence entry management device 10. As shown in the Figures, and best shown in FIGS. 6 and 7, in select embodiments of the disclosed artificial intelligence entry management device 10, LED lens 34 may be included. LED lens 34 may be configured to cover and protect the plurality of lights 28, like light emitting diodes 32. LED lens 34 may have oval shape 16 of housing 12.

Figure 1:
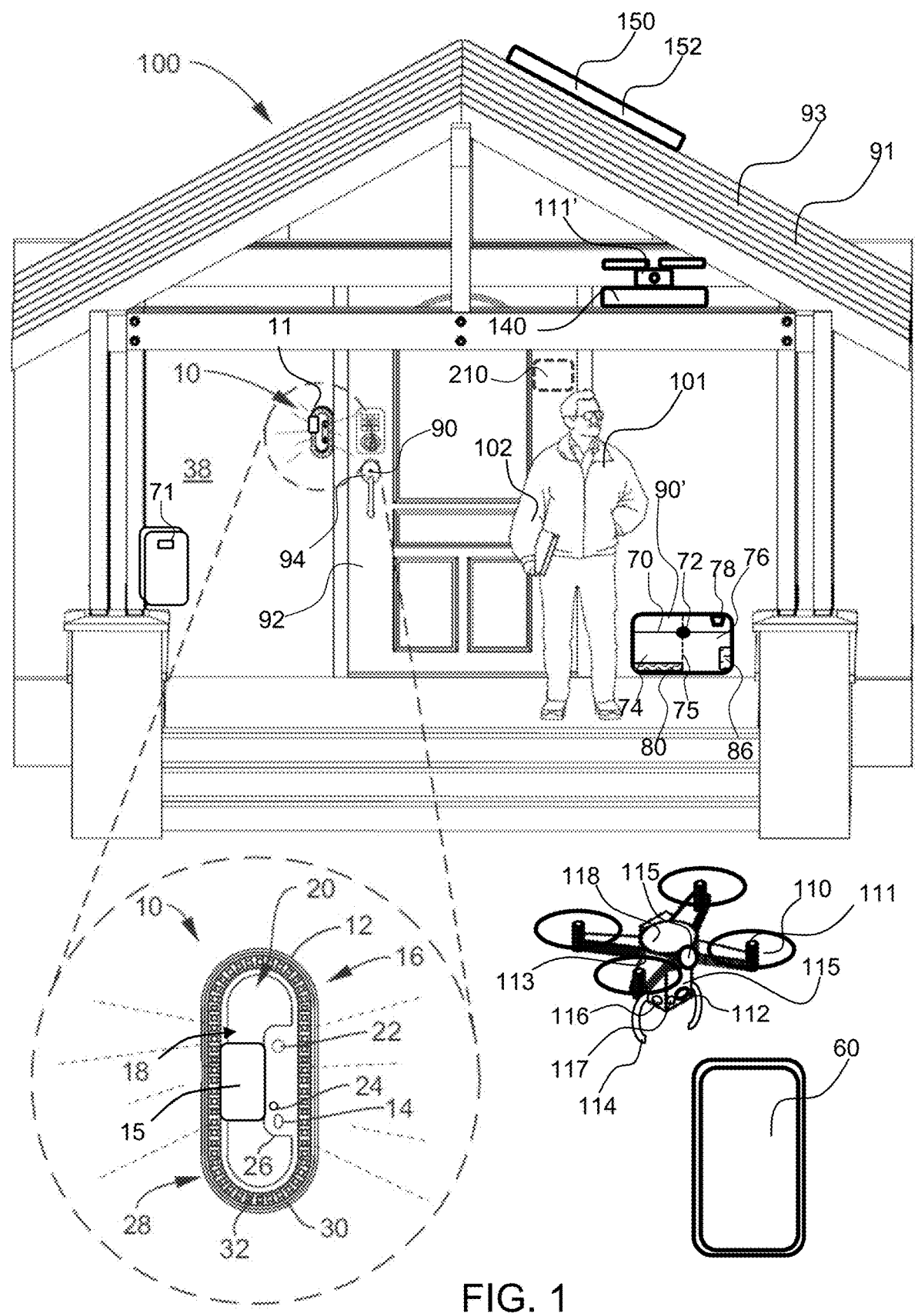
FIG. 1 shows a perspective environmental view of an artificial intelligence entry management device and system according to select embodiment of the disclosure.
Figure 4:
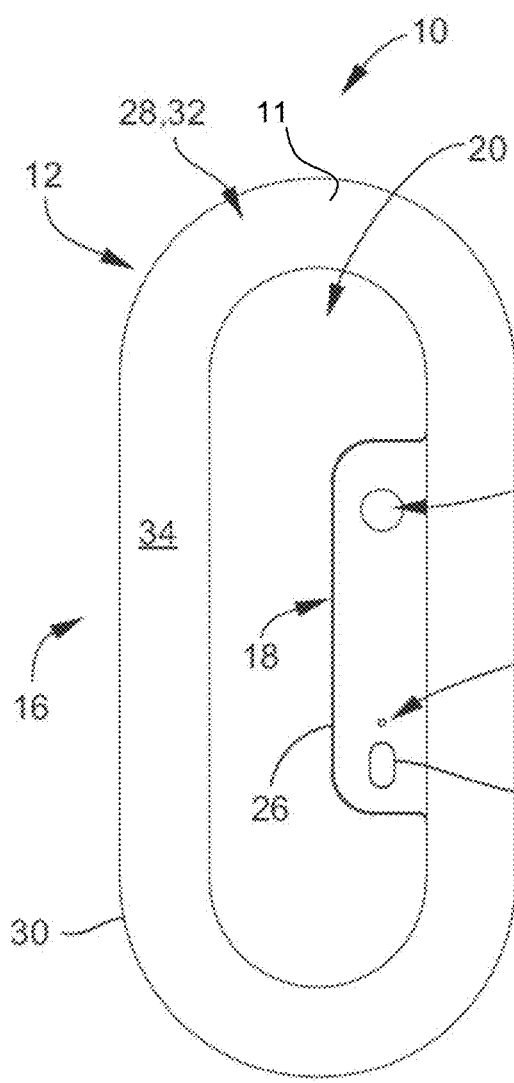
FIG. 4 shows a front view of the artificial intelligence entry management device according to FIG. 2.
Figure 5:
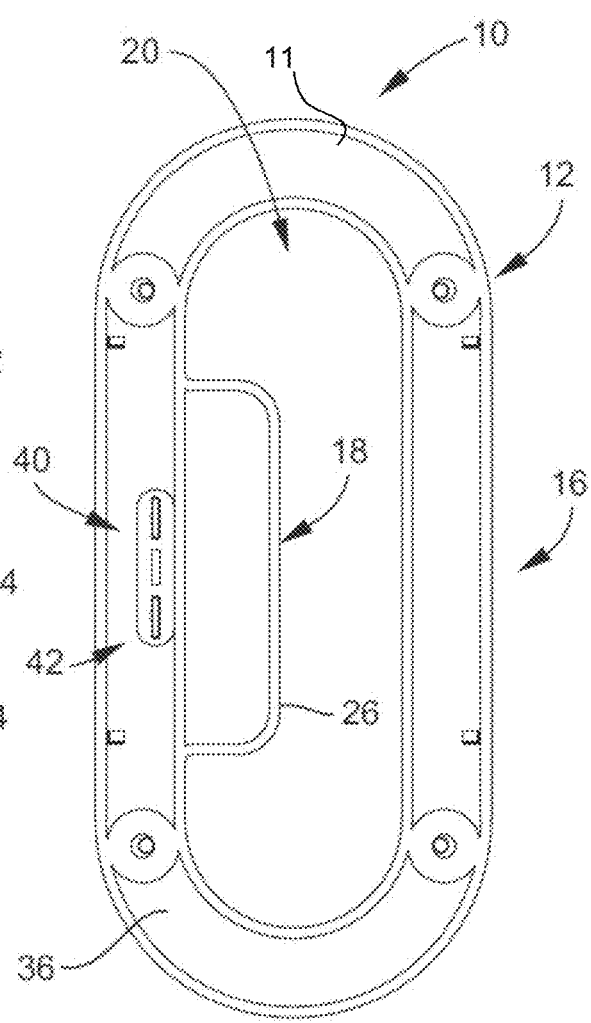
FIG. 5 shows a back view of the artificial intelligence entry management device according to FIG. 2.
Figure 6:
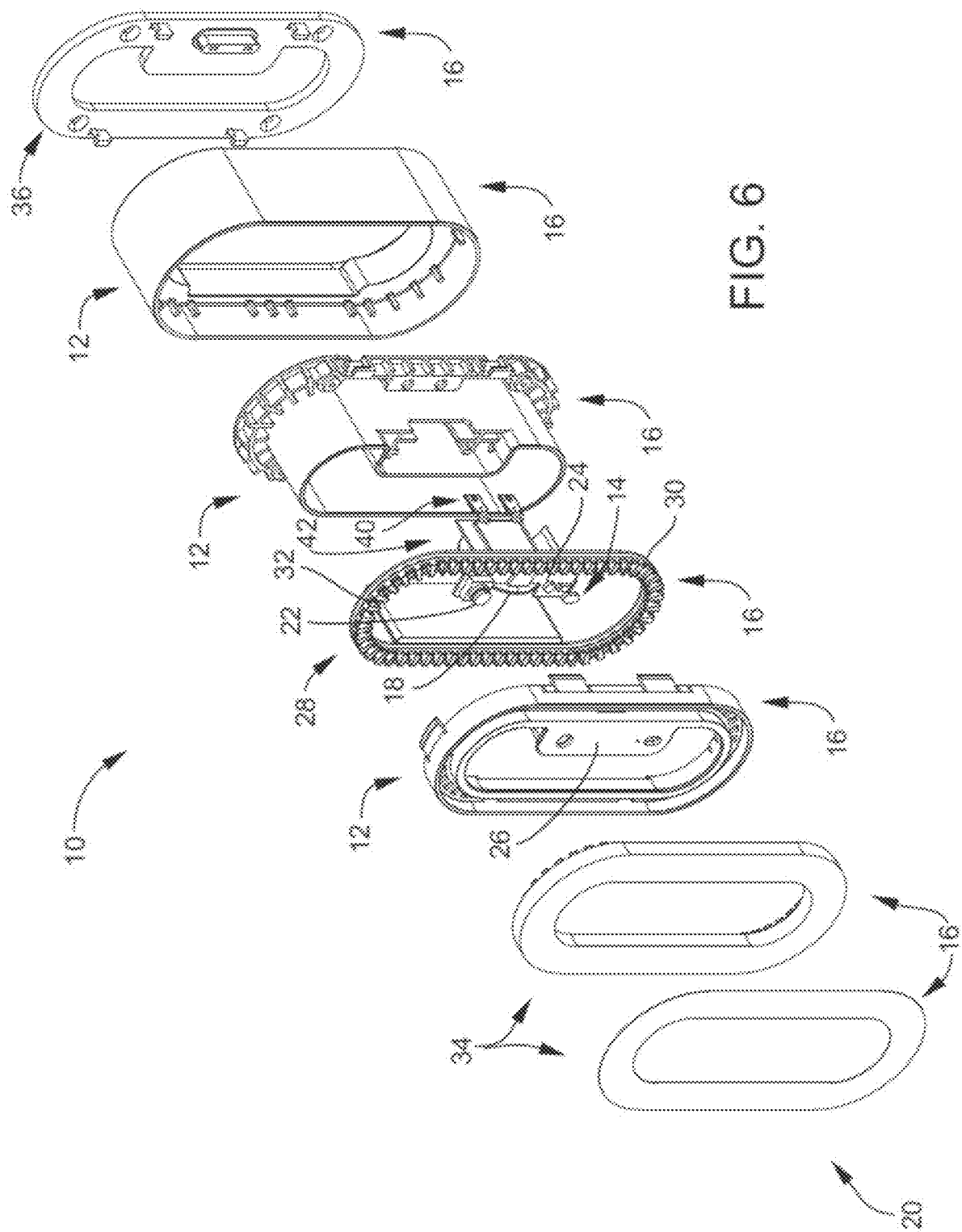
FIG. 6 shows a front right perspective partially disassembled view of the artificial intelligence entry management device according to FIG. 2.
Figure 7:
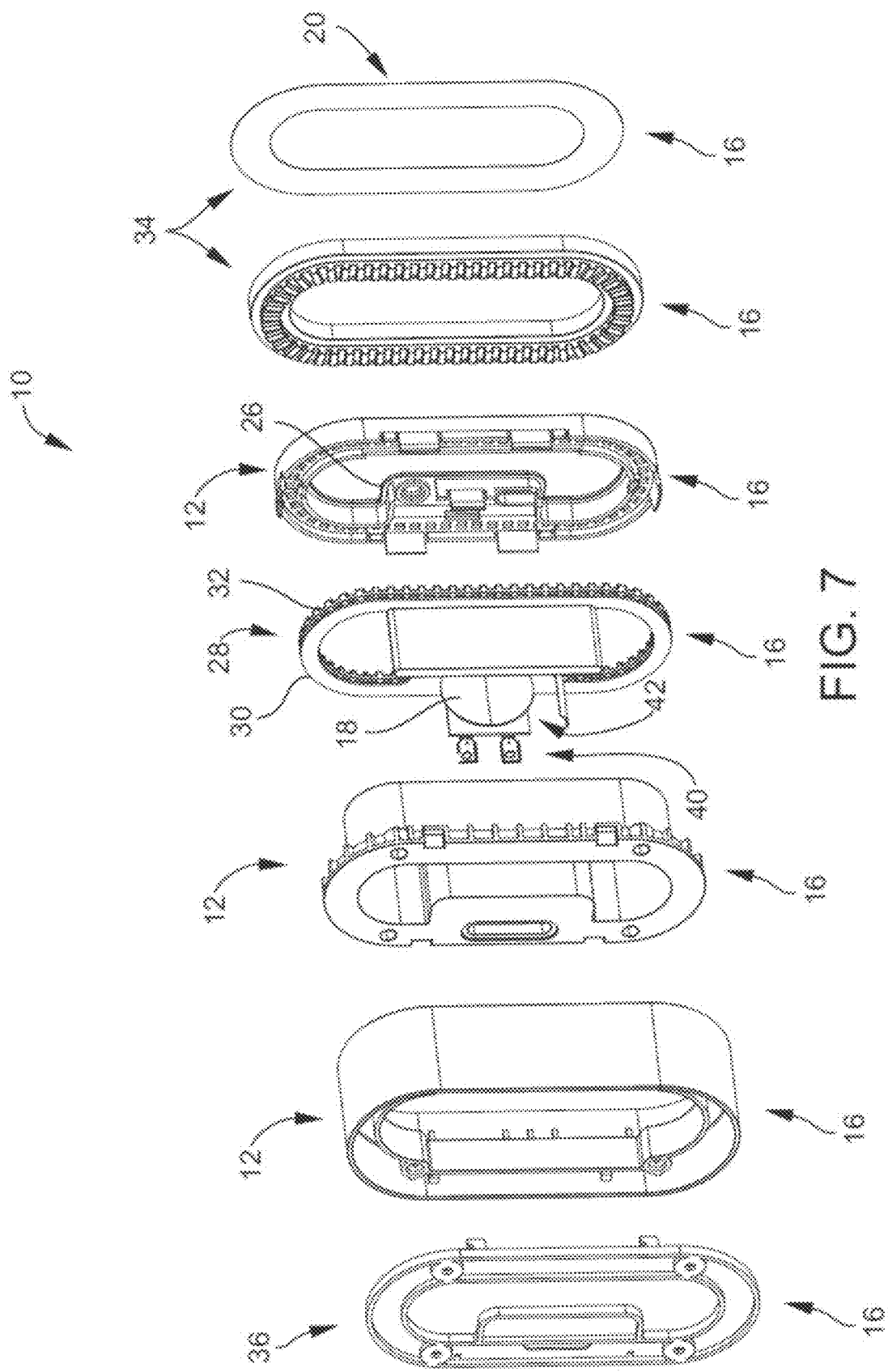
FIG. 7 shows a back left perspective partially disassembled view of the artificial intelligence entry management device according to FIG. 2.

Mounting bracket 36 may be included with artificial intelligence entry management device 10. Mounting bracket 36 may be configured for mounting housing 12 of artificial intelligence entry management device 10 to surface 38, as shown in FIG. 1. Mounting bracket 36 may have oval shape 16 of housing 12.

Power source 40 may be included with artificial intelligence entry management device 10. Power source 40 may be a hardwired power source (as shown in the Figures), a battery powered power source, the like, or combinations thereof.

Wireless communication device 42 may also be included with artificial intelligence entry management device 10. Wireless communication device 42 may be housed inside of housing protrusion portion 26 of housing 12 of artificial intelligence entry management device 10. Wireless communication device 42 may be configured to communicate with entry management system 100, like a networked software platform, or the like, or other artificial intelligence entry management devices 10 via a wireless communication. The wireless communication of wireless communication device 42 may be, but is not limited to, Wi-Fi; UHF radio waves in the industrial, scientific and medical radio bands, from 2.402 GHz to 2.480 GHz, and building personal area networks (PANs), also known as Bluetooth® (Bluetooth trademark owned by Bluetooth SIG, Inc. of Kirkland, Wash.); the like; or combinations thereof.

One feature of the disclosed artificial intelligence entry management device 10 may be that speaker 18 can be positioned in housing protrusion portion 26 and oriented toward substantially open middle 20. This orientation of speaker 18 may be for projecting sound from speaker 18 out of artificial intelligence entry management device 10.

Another feature of the disclosed artificial intelligence entry management device 10 may be the inclusion of a processor. The processor may have a non-transitory computer readable storage medium including software. The software of the processor may have program instructions configured for providing artificial intelligence to artificial intelligence entry management device 10. In select embodiments, the software may be configured for development of intelligence within artificial intelligence entry management device 10, including, but not limited to, speech recognition, problem-solving, learning, planning, the like, combinations thereof, etc. In select embodiments of artificial intelligence entry management device 10, the processor may be a networked processor. The networked processor may be connected to artificial intelligence entry management device 10 via a wireless communication to wireless communication device 42 on artificial intelligence entry management device 10. In other select embodiments, the processor may be a chipped processor. The chipped processor may be housed inside of artificial intelligence entry management device 10, including, but not limited to, inside of housing protrusion portion 26 of housing 12 of artificial intelligence entry management device 10.

In another aspect, the instant disclosure embraces artificial intelligence entry management system 100. Artificial intelligence entry management system 100 may generally include utilizing the disclosed artificial intelligence entry management device 10 in any of the various embodiments and/or combination of embodiments shown and/or described herein. As such, in general, the disclosed artificial intelligence entry management system 100 may include the disclosed AI entry management device 10 with camera 22, microphone 24, motion detector 14, speaker 18, wireless communication device 42, the like, and/or combinations thereof. In addition, artificial intelligence entry management system 100 may include an artificial intelligence device. The artificial intelligence device may be in communication with AI entry management device 10. The artificial intelligence device may include a processor with a non-transitory computer readable storage medium having software with program instructions configured for providing artificial intelligence to the artificial intelligence entry management device 10.

The AI entry management device system 100 and AI entry management device 10 may be configured to unlock an access point including, but not limited to a door or gate or a storage container. As shown in FIG. 1, the AI entry management device 10 is configured on a dwelling 91, an exemplary access point 90, and is configured to unlock the door-lock 94 on the door 92 of the dwelling. Also, the AI entry management device 10 may be configured to unlock the lock 72 on the storage container 70, another access point 90', to enable retrieval of items therein or delivery of item into the storage container, or a compartment thereof.

As shown in FIG. 1, an exemplary artificial intelligence entry management system may include a robot 110, such as an aerial robot 111, that may use a package manipulator 114 to pick up and release packages for movement of a package from a first location to a secondary location. The aerial robot is configured to fly and is commonly referred to as a drone. The aerial robot may also have a camera 112 for taking digital photographs or video that may be transferred to the exemplary artificial intelligence entry management system. The aerial robot may be used for monitoring and surveillance of a delivery area and may be used for creating and monitoring a geofence and/or MDA after a package has been delivered. After a package has been delivered, the aerial robot may monitor an area and take images that can be delivered to an administrator of someone entering a geofence area and/or an MDA. A robot speaker 116 may be used to communicate with a third party, such as a delivery person, to provide logistic instructions for package delivery. A speaker may also be used as an audible alarm. A microphone 117 may be used for receiving communication from a third party that is provided to an administrator of the artificial intelligence entry management system, for example. An exemplary robot has a wireless signal transceiver 118 for communication with the artificial intelligence entry management system 100 such as the artificial intelligence entry management device 10. The robot may send photographs, video, audio recordings and the like to the artificial intelligence entry management system which may be then transferred to an administrator or a third party. A robot may also communicate directly with an administrator or authority using the wireless signal transceiver 118. A robot may have controller 113 that incorporates artificial intelligence to control functions of the robot. The artificial intelligence of the robot may interface with the artificial intelligence of the artificial intelligence entry management device, for example. Robot 110, like a drone or a land robot, may be configured to be activated by AI entry management system to investigate any suspicious activity, or threats, determined by the AI device. Once activated, robot 110, like a drone may be configured to leave its docking station and investigate such suspicious activities and/or threats. Whereby, robot 110 or drone can relay information, like images, back to the system, issue a command to the suspicious activity or threat, and follow or track the individuals or vehicles, like by transmitting images of the vehicle, license plate, color, make, etc., as well as providing locational information or direction information of such suspicions activities and/or threats. As such, robot 110, such as a drone, may be configured as a deterrent for suspicious activities or threats. A robot may have a light 119 that is activated when a motion or sound above a threshold value is detected. The robot speaker 116 may emit an alarm and the robot light 119 may flash a color when a threat is detected, such as a person that is not identified by the artificial intelligence entry management system or someone carrying a weapon, such as a gun or knife.

An exemplary robot 110, such as the aerial robot 111 may be configured to return to a docking station 140 wherein the robot can monitor an area with the camera 112 and microphone 117 and recharge. As shown, aerial robot 111' is docked to the docking station 140 and is being charged, wherein a rechargeable battery 115 is receiving electrical power. This charging electrical power may come from the dwelling, or from a renewable power source 150, such as a solar panel 152 as shown.

An artificial intelligence entry management system 100 may include or interface with a storage container 70 to lock and unlock said storage container for deliver and safe storage of items therein. A storage container 70, including a mailbox 71, collectively referred to herein as a storage container, may comprise a lock 72 and a wireless signal transceiver 78 for receiving a wireless signal from the wireless communication device 42 of the AI entry management device 10. An exemplary storage container may have a plurality of compartments that may have separate locks 72, 72' for separate closures 79, 79' and features for retaining items therein, such as a heating device 80 or refrigeration device 86. As shown, a first compartment 74 includes a heating device 80 and a second compartment 76, separated from the first compartment by a divider 75, has a refrigeration device 86. Grocery items that need to be refrigerated may be delivered into the refrigerated compartment and in cold climates, medications and other items may be stored in the heated compartment to prevent freezing.

An artificial intelligence entry management system 100, as shown in FIG. 1, may have a number of control interfaces, such as the AI entry management device 10, a mobile electronic device 60, such as a mobile phone or tablet computer, or a control panel 210, which may be configured within the dwelling 91 or building 93. A user may use any of these control interfaces to set up specific routines or directions for the system. They may set a start and end time for a particular surveillance protocol including surveillance flight paths of aerial robots, for example. A user may set a start time of 10 pm and an end time of 8:00 am for aerial robots fly surveillance flight paths or routes about the building. In one embodiment, the AI entry management device, or a computing device in network communication with the AI entry management device or platform, instructs a robot such as a drone or a land robot to create a defined patrol path, such as a flight path or a land path. In one embodiment, these paths are defined and implemented using the Global Positioning System (GPS). Alternatively, these paths are defined and implemented using any method of geolocation known in the art or described herein, such as geofencing. In one embodiment, a robot or drone is operable to survey a designated area using GPS or any other method of geolocation in the art to generate patrol paths such as flight paths or land paths for other robots or drones. By way of example and not limitation, an aerial robot is operable to instruct a land robot to follow a certain path based on data collected by the aerial robot, such as images, audio, or video. In one embodiment, the aerial robot is operable to perform image or audio recognition or send the images, audio, or video to the platform or the AI entry management device to perform image or audio recognition. In one embodiment, a robot instructs other robots to follow paths independent of the robot or simultaneously with the robot. Programming of patrol paths includes programming periodic surveillance or triggered surveillance, such as surveillance triggered by image or audio recognition. The present invention is operable to use a combination of technology to enable mapping of areas and implementation of patrol routes. For example, Light Detection and Ranging (LIDAR) and/or Airborne Laser Swath Mapping (ALSM) are operable to be used in locations where density prevents GPS mapping. The present invention also provides for user input to select drones or robots to follow patrol paths created by a robot or drone through the platform or the AI entry management device of the present invention.

A user may use the mobile electronic device 60 and or the control panel to view images taken by the AI entry management device 10 and/or a robot camera 112. Any of these control interfaces may have Artificial intelligence and may communicate through the AI entry management device or directly with components of the system, such as the robots and/or the storage container and/or any other access point, such as the front door to operate a smart lock to open or lock.

Figure 8:
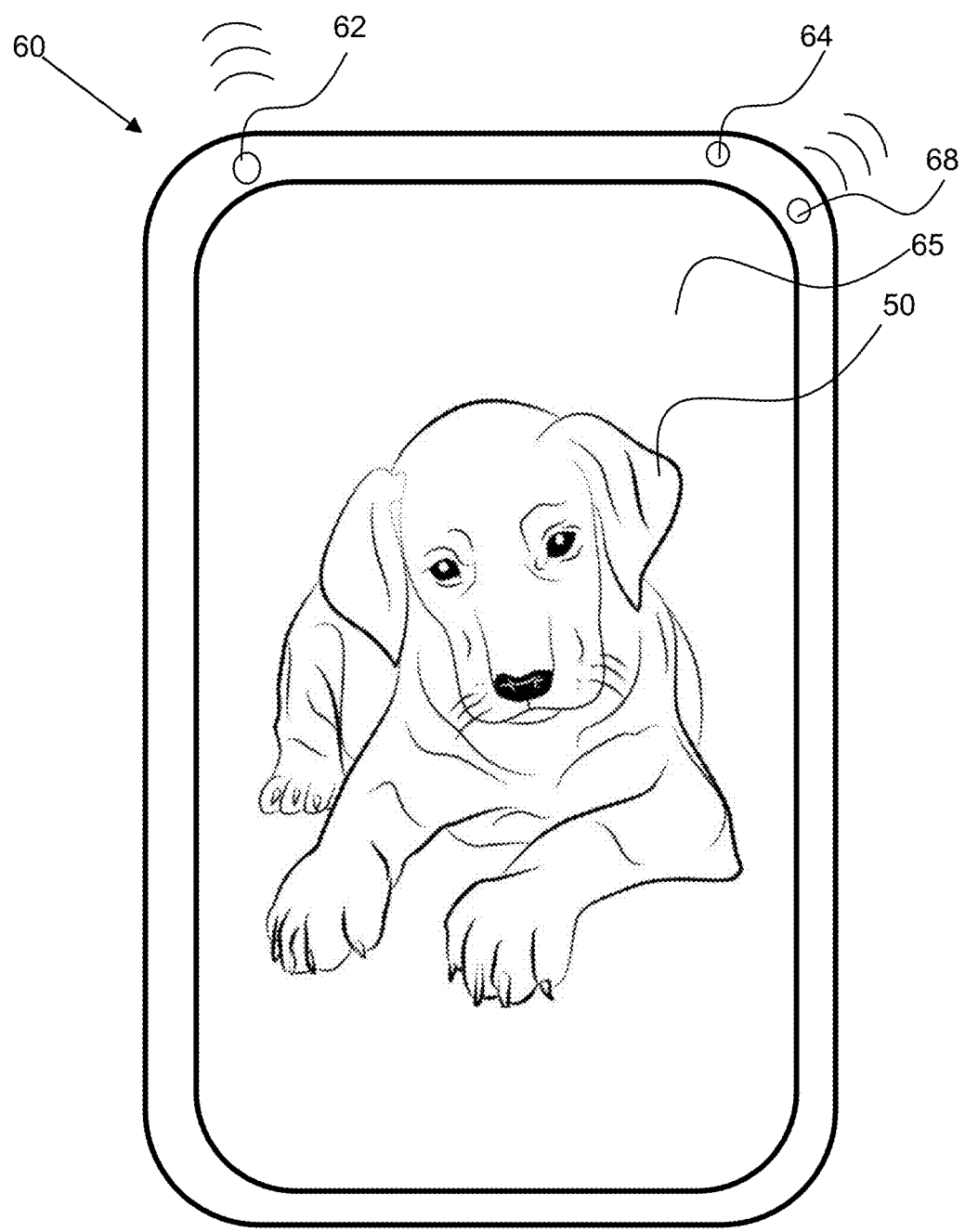
FIG. 8 shows a front view of a mobile electronic device with a digital photograph that is an image virtual key configured to be identified by the camera of the artificial intelligence entry management device and verified for access to an access point.

An artificial intelligence entry management system 100 may be configured to unlock the lock 72 of the storage container 70, or a compartment thereof, when a virtual key is verified by the AI entry management device 10. As described herein, a virtual key may be an image that is read by camera 22 of the AI entry management device 10, or an audible virtual key that is received by the microphone 24 of the AI entry management device 10. An image virtual key 50, may be a digital image that is sent by an AI entry management system administrator, such as through an APP or as an attachment in a text message to a third party's mobile electronic device. As shown in FIG. 8, an administrator has provided a digital photograph of their puppy to a second parties mobile electronic device 60 which was received by a wireless communication device 62, such as a wireless signal transceiver. The third party may then show this image on the display screen 65 to the camera 22 of the AI entry management device 10 to gain access to an access point, wherein the door-lock 94 of the door to the dwelling is unlocked, or the lock 72 on the storage container 70 is unlocked, for example. In addition, the virtual key may include an audible key that is played by the mobile device through the speaker 68. The microphone on the AI entry management device may receive the audible key in order to verify it. In an exemplary embodiment, both an image virtual key and an audible key are required for verification before an access point is unlocked. The mobile electronic device 60 may also have a microphone 64 for providing verbal input that is delivered to the artificial intelligence entry management system.

One feature of artificial intelligence entry management system 100 may be that the software may have programming instructions that, when executed, cause AI entry management device 10 to execute entry management and ecommerce support functions including the delivery of messages, directives, instructions, greetings, recordings, and facilitating the connection of a third party for two-way audio/video communication.

A greeting may be a contextual greeting that includes some context to the third party, such as their name, or the name of an organization they are associated with. For example, a friend Jan, may come over to water the plants while an owner is away and the AI entry management device system may provide a greeting to Jan that includes her name. In another example, a UPS delivery driver may be tracked by the AI entry management device system and a greeting that includes the "UPS" name may be provide when the delivery person moves within a threshold range or distance of the AI entry management device or when they provide their virtual key. The artificial intelligence entry management system may track an electronic device having a global positioning system by receiving a location from the mobile electronic device or by interfacing with a program, such as an Application software, or App, to receive location information regarding the electronic device. A package delivery person may carry a transponder or other device that is used to track their location or the location of their vehicle and the artificial intelligence entry management system may interface with a program or database to determine this location.

A greeting may be contextual for a particular occasion, such as for holidays or special occasions including birthdays, anniversaries and the like. An exemplary AI entry management device system may offer occasion greeting packages that include a song or other occasion specific messages for an additional fee to the administrator.

Another feature of artificial intelligence entry management system 100 may be that motion detector 14 of AI entry management device 10 may be configured to activate upon motion and provide a greeting, command, or instructions, whereby system 100 may activate upon recognition of a paired mobile device. The paired mobile device may be a stored identification paired via the approval of an owner/administrator. The owner/administrator may be individuals assigned programming rights configured to allow the owner/administrator to make selections remotely via the artificial intelligence entry management system.

Another feature of artificial intelligence entry management system 100 may be that, when activation occurs, artificial intelligence entry management device 10 may be configured to provide a spontaneous response, or a preprogrammed response in accordance with the device it detects.

Another feature of artificial intelligence entry management system 100 may be that artificial intelligence entry management device 10 may be configured to provide a spontaneous response, or a pre-programed response in accordance with the image read by camera 22.

Another feature of artificial intelligence entry management system 100 may be that, when activated, simultaneously, a notification may be sent to the owner/administrator with an option to engage remotely in two-way communication, activate a preprogrammed or custom message, provide a virtual key or activate the recording for a message, detect a person or a device via camera 22, microphone 24, motion detector 14, or wireless communication device 42 and provide an intelligent response to the person or device via speaker 18 or wireless communication device 42.

Another feature of artificial intelligence entry management system 100 may be that when a package is scanned by camera 22 of AI entry management device 10, artificial intelligence entry management system 100 may be configured to initiate a geo-fence and/or MDA around an area of AI entry management device 10. A geo-fence is a monitored area within proximity of an access point and/or the AI entry management device. An MDA, or monitored designated area, is an area created by AI entry management device within the field of view of camera 22. A geo-fence and/or MDA proximity distance from an access point and/or the AI entry management device may be about 1 m or more, about 5 m or more, about 10 m or more, about 20 m or more, about 50 m or more and may be dynamic as a mobile robot may interface with the AI entry management device. Wherein, when the geo-fence and/or MDA of AI entry management device 10 is initiated, AI entry management device 10 may be configured to utilize motion detector 14, camera 22, microphone 24, or combinations thereof, for detecting a breach of the geo-fence area and/or MDA around AI entry management device 10. In select embodiments, when a breach of the geo-fence area and/or MDA around AI entry management device 10 is detected, artificial intelligence entry management system 100 may be, but is not limited to, being configured to: alert the owner via a wireless notification; trigger the entry management device to set off an alarm of the entry management device; trigger an external alarm; the like; and/or or combinations thereof. In select embodiments, when the package is placed in the geo-fence area and/or MDA around AI entry management device 10, the carrier of the package can activate AI entry management device 10 to monitor the geo-fence area and/or MDA via motion detector 14, camera 22, microphone 24, or combinations thereof. In other select embodiments, a carrier of the package can deactivate the geo-fence area and/or MDA around AI entry management device 10 by scanning of the package or a virtual key, whereby the package may be retrieved. Once scanned, the notification, alarms, or combinations thereof are deactivated by the scanning of the package or the virtual key, and a subsequent scan can reactivate the geo-fence area and/or MDA around AI entry management device 10.

Another feature of artificial intelligence entry management system 100 may be that AI artificial intelligence device 10 can be configured to learn various inputs.

Another feature of artificial intelligence entry management system 100 may be that the software of the artificial intelligence device can be configured to relate to the occupants of the building for enabling name recognition by AI entry management device 10.

Another feature of artificial intelligence entry management system 100 may be that the software of the artificial intelligence device can be configured to enable AI entry management device 10 to establish contact, record messages, or deliver a message from the person or persons named.

Another feature of artificial intelligence entry management system 100 may be that the artificial intelligence device can be configured to interface with other artificial intelligence devices, like other AI entry management devices 10 configured as a part of artificial intelligence entry management system 100.

Another feature of artificial intelligence entry management system 100 may be that when AI entry management device 10 is activated by motion, the detection of a paired mobile device, the presentation of a virtual key, or the owner/administrator, AI entry management device 10 may be configured to cause the programming instructions of the software to activate or turn on artificial intelligence entry management system 100.

Another feature of artificial intelligence entry management system 100 may be that AI artificial intelligence device 10 may be configured to cause AI entry management device 10 to detect the person and interpret voice detected by microphone 24 from the person.

Another feature of artificial intelligence entry management system 100 may be that the intelligent response provided by the artificial intelligence device may include, but is not limited to: logistics, a greeting, a command, directions, a message, an inquire, a recording request, an alarm to speaker 18, the like, and/or combinations thereof.

Another feature of artificial intelligence entry management system 100 may be that wireless communication device 42 may be configured to establish the identity of the person or the device once paired. Wherein, after pairing, the artificial intelligence device may be configured to recognize the device and provide a customized greeting, specific instructions, access, or actions for the associated AI device 10.

Another feature of artificial intelligence entry management system 100 may be that the artificial intelligence device may be configured to require authentication of an image or mobile device that is active and unlocked, AI device 10 must be active, or combinations thereof, prior to providing the customized greeting, the specific instructions, access, or the actions for the associated device 10.

Another feature of artificial intelligence entry management system 100 may be that the artificial intelligence device may be configured to recognize the previously paired mobile device and a virtual key or an identification sequence. Wherein, if there is not a confirmed identification, a third party authentication is sought which is an embedded code within the virtual key, or an audible or verbal response code including, but not limited to, a word or words, a sentence, a number or numbers, sounds, or letters.

Another feature of artificial intelligence entry management system 100 may be that the virtual key utilized may be a humanly created mark, drawing, written sequence of numbers, letters, abstract sketch, or picture.

Another feature of artificial intelligence entry management system 100 may be that wireless communication device 42 of AI entry management device 10 may be configured for exchanging data between AI entry management device 10 and fixed and mobile devices over short distances using wireless communications, including, but not limited to, Wi-Fi or UHF radio waves in the industrial, scientific and medical radio bands, from 2.402 GHz to 2.480 GHz, and building personal area networks (PANs), also known as Bluetooth® (Bluetooth trademark owned by Bluetooth SIG, Inc. of Kirkland, Wash.).

Another feature of artificial intelligence entry management system 100 may be that artificial intelligence entry management system 100 may be configured to notify designated security personnel.

Another feature of artificial intelligence entry management system 100 may be that AI entry management device 10 may be configured to work on a networkable platform with networked software accessible and interactive with any other devices running the networked software and participating on the networkable platform. Wherein the networkable platform is configured for use by a variety of members including owners, service personnel, property management, real estate professionals, short term rentals, hotels, employees, the like, etc. Wherein the networkable platform may be configured to provide access and logistics to additional industries and uses.

In one embodiment, the AI entry management device 10 is operable to scan a code, an image, or any other data or symbol which is operable to grant access to a property and retrieve a profile associated with the device or account associated with the code, image, or the other data or symbol operable to grant access to the property. The AI entry management device 10 is then operable to send one or more command and control messages to one or more of a plurality of IoT devices or other devices connected to the AI entry management device 10 over a network or via one-way or two-way wireless or wired communication. For example a profile includes settings for one or more thermostats, one or more smart locks, one or more lighting devices, one or more smart window devices, one or more media devices, and/or one or more smart sockets. The AI entry management device is operable to control these devices directly through a wireless connection between the AI entry management device and the devices or through a platform, with the AI entry management device and the devices being connected to a network such as a wireless network (e.g. WIFI, cellular, etc.). All references to control of other devices through the AI entry management device described herein are understood to encompass direct control or control of other devices through a platform. The software platform associated with the AI entry management device is operable to store account or profile information for a plurality of users. In one embodiment, a hierarchy of profiles or accounts exists, wherein higher ranked accounts (e.g. parent or administrator accounts) are operable to set and overrule settings for lower ranked accounts (e.g. child, guest, or service people accounts). Overruling settings includes manually overruling settings through the platform entered by a user associated with the lower ranked account or overruling implemented settings in a property or house upon the entry management device allowing a device or user associated with a higher ranked profile to enter a home. In one embodiment, compromise settings exist between two accounts of the same hierarchical level. For example, a compromise setting includes the thermostat settings of a first account overruling the thermostat settings of a second account but the lighting settings of the second account overruling the lighting settings of the first account. Profiles are customizable such that there are different settings for different times of the year, different days of the week, and different times of day.

In one example, the AI entry management device 10 receives an image from a device associated with the profile, and the AI entry management device 10 sends a command to a smart thermostat to set a temperature of one or more rooms or floors to a certain setting. These temperature settings are operable to be set through a software application connected to the AI entry management device 10 or the software platform of the present invention. In one embodiment, there is a hierarchy of profiles, such that settings of an adult account overrule settings of a child account. For example, a child account includes a thermostat setting of 75 degrees for a living room, and an adult account includes a thermostat setting of 72 degrees for the living room. If the child account is granted access by the AI entry management device 10, the AI entry management device 10 sends a command to the thermostat for the living room to set the temperature to 75 degrees. Upon the adult account being granted by the AI entry management device 10, the AI entry management device 10 commands the thermostat to adjust the temperature in the living room to 72 degrees. Conversely, if the adult account is granted access first by the AI entry management device, the AI entry management device sends a command to the thermostat to adjust the temperature of the living room to 72 degrees. Upon the child account being granted access by the Ai entry management device after the adult account has already been granted access, the AI entry management device does not send a command to the thermostat to adjust the temperature of the living room. In another example, only certain thermostats are commanded to adjust the temperature of certain rooms or floors. An adult account granted access to the property only causes thermostats on the first floor to be adjusted as to a predetermined settings since the bedroom of the adult is on the first floor. Conversely, a child account granted access by the AI entry management device after an adult account is granted access does not cause the settings of any network devices or IoT devices to change since the adult account has a higher priority than the child account.

In another embodiment, a child account is granted access to certain rooms or certain areas in a property via unlocking of smart lock IoT devices for these rooms or areas when the AI entry management device grants access to a child account. The child account is permitted to access a study via unlocking of a smart lock associated with the study but a smart lock associated with a playroom is not unlocked in one embodiment. Alternatively, thermostat or lighting IoT devices are utilized to incentivize or disincentivize certain behavior, with a thermostat in a study being set to a warmer temperature in winter months than a thermostat in a play room upon the child account being granted access by the AI entry management device.

Additionally, network connected or IoT lighting devices are operable to be controlled based on the AI entry management device granting property access a certain account. For example, the AI entry management device is operable to grant access to a guest account associated with a service technician such as a plumber and turn on lighting associated with the area the plumber will be working (such as a bathroom or a kitchen) and lighting on a path from the entryway to the area where the plumber will be working. In another embodiment, these lighting devices are operable to include settings associated with a particular account or profile. In one embodiment, an adult profile includes a brightness setting for one or more lighting devices, with the AI entry management device operable to overrule or not implement settings associated with a child profile based on the adult profile settings. Lighting devices are also operable to be utilized to incentivize or disincentivize certain behavior, with lighting in a study being set to automatically be turned on for weeknights after school hours for a child account while lighting in a play room is not automatically turned on for a child account during these time periods.

Smart window devices such as smart curtains or smart blinds are also operable to be controlled autonomously based on profile settings. In one example, smart curtains are automatically opened upon a maid account being granted access to a property by the AI entry management device.

In another embodiment, profile settings also control media devices such as audio, video, and/or gaming devices. By way of example, an audio device connected to the AI entry management device is operable to play a different audio track or playlist associated with a profile upon the user associated with that profile being granted access by the AI entry management device.

Smart sockets are also operable to be connected to the AI entry management device platform. Any electrical device is operable to be plugged into a smart socket, with the AI entry management device being operable to cause the smart socket to be powered on or off based on settings associated with a profile upon the user associated with that profile being granted access by the AI entry management device. For example, a stove is powered on when the person who typically cooks dinner is granted access by the entry management device. In another example, a laptop computer is provided power when the owner of that computer is granted access via the entry management device.

IoT or network devices include at least one alarm system associated with the access point in one embodiment, with the alarm system operable to be automatically deactivated upon the entry management device receiving a command to unlock the access point. The entry management device is preferably in wireless communication with at least one alarm system associated with the access point, and wherein, upon receiving a command to unlock the access point, the facial recognition module identifies any authorized individuals within a predetermined distance of the access point, and the at least one alarm system is automatically disactivated if any authorized individuals are detected.

In one embodiment, settings for any network device or IoT device are operable to be overruled in real-time by an administrator or parent account.

In another embodiment, wearables or sensor data is operable to be uploaded to the platform, and IoT devices are operable to be automatically adjusted based on this data. For example, body temperature data is operable to be sent to the platform and thermostat temperature or the temperature of a cooling or heating device, such as a cooling or heating mattress pad, mattress, or piece of furniture such as a chair is operable to be adjusted based on the wearable data in real time or near real time. Additionally or alternatively, the AI entry management device is operable to provide wearable data and other data about settings and history of settings for IoT or network devices to an account associated with the platform, such as a caregiver or nurse account. This enables a caregiver or nurse to better care for people in the property, and in one embodiment the caregiver or nurse account is operable to overrule settings on the fly for the benefit of the health of people within the house.

Wearable data is also useful for granting access to certain devices or areas within a house. For example, a child must have wearable data such as steps, heart rate, etc., an entry management app can verify the child exercised for a predetermined period of time and grant access to a device or a room of a house.

In one embodiment, a mobile device associated with a profile remains in network communication with the platform or the AI entry management device while the mobile device is within the house or property associated with the AI entry management device. In one embodiment, a geofence is created around the house or the property (including the boundaries of the property), and the platform or AI entry management device determines when the mobile device leaves the geofence and automatically locks the access point and turns off or adjusts settings associated with one or more IoT devices or network devices. In another embodiment, an application on the mobile device is operable to determine a geolocation of the mobile device and transmit the geolocation of the mobile device to the platform, with the platform being operable to automatically lock the access point and turn off or adjust settings associated with one or more IoT devices or network devices upon the mobile device moving a certain distance away from the AI entry management device. Location data is created in the present invention using one or more hardware and/or software components. By way of example and not limitation, geolocation data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

Geofence and geolocation technology is also operable to be used to determine when child accounts or guest accounts have left a house or property. In on embodiment, an alert is sent to a parent account or administrator account upon a detection by the platform that a child account or guest account has left the property or house.

In select embodiments of artificial intelligence entry management system 100, a transponder device may be included. The transponder device may be configured to utilize a global positioning system or a wireless communication to identify a mobile device and begin to transmit a signal for easy identification and detection. In select embodiments, the transponder device may be configured to be attached to a stationary object, a door, a room, a building box or a storage container. Wherein, upon AI entry management device 10 detecting the transponder device, the programming instructions of the software may also be configured to: send out an audible noise, illuminate, provide mapping instructions or directions to the mobile device to provide guidance in locating a specific location of the stationary object, door, room, building box, or the storage container via the speaker; illuminate lights on the entry management device; provide a mapping direction on the device including: an exact location; a location inside a building, a building without a geo address, a container, a storage unit; the like; and/or combinations thereof. As such, another feature of artificial intelligence entry management system 100 may be that the transponder device can be configured to take over where a global positioning system ends to guide the person or the device to a specific location inside a geo-fence or outside a geo-fence. Another feature of artificial intelligence entry management system 100 may be that AI entry management device 10 may be configured to utilize the global positioning system, Wi-Fi, radiofrequency (RF), Bluetooth®, or another wireless communication to identify a mobile device previously paired and initiate actions including messages, access, logistics to guide the person or the device to the specific location such that the geo position of AI entry management device 10 may activate various actions. Another feature of artificial intelligence entry management system 100 may be that when the transponder device is activated and detects the person or the device within a set range, the transponder device may be configured to emit a signal, a sound, a light, or input to AI entry management device 10 configured to guide and direct the person or the device to the specific location.

Another feature of artificial intelligence entry management system 100 may be that camera 22 can be adapted to read a virtual key from the person or the device, and upon reading the virtual key, AI entry management device 10 may be configured to unlock an access point, provide a greeting, instructions or logistics, record a message, or establish contact with the individual requested. In select embodiments, the virtual key may be a humanly created image including, but not limited to: a humanly created photo; a humanly created picture; a humanly created drawing; a humanly created mark; a humanly created number or numbers; a humanly created letter or letters; a humanly created word or words; the like; and/or combinations thereof.

In select embodiments of artificial intelligence entry management system 100, the access point may be a delivery storage container or mailbox. In these embodiments, AI entry management device 10 may be configured to lock and unlock the delivery storage container or mailbox. In select embodiments, the delivery storage container or mailbox may include a refrigerated compartment on an inside of the delivery storage container or mailbox. The refrigerated compartment may be configured for food or other refrigerated items. In select embodiments, the refrigerated compartment may be a first portion of the inside of the delivery storage container, and a second portion of the inside of the delivery storage container is configured for parcels. In other select embodiments, the refrigerated compartment may be the entire inside of the delivery storage container. Yet in other select embodiments, the refrigerated compartment may be the entire inside of a first delivery storage container and a second delivery storage container may be configured for parcels. In other select embodiments, the delivery storage container or mailbox may include a warmer on the inside of the delivery storage container or mailbox. The warmer may be configured to warm the inside of the delivery storage container or mailbox. Wherein, a feature of artificial intelligence entry management system 100 may be that system 100 may be configured to control delivery storage container or mailbox the ability to select warmer, refrigerated, parcel, or a combination thereof per section of the delivery storage container or mailbox. In select embodiments, the delivery storage container or mailbox may be positioned just inside a door of a home and AI entry management system 100 may be configured to unlock and lock the door of the home for deliveries to the delivery storage container or mailbox. Wherein the position of the delivery storage container or mailbox may be configured to prevent the need for deliveries to be walked through the house to the kitchen. A feature of the delivery storage container or mailbox may be the inclusion of an ultraviolet light on an inside. The ultraviolet light may be configured for sanitizing the inside of the delivery storage container or mailbox including sanitizing any parcels placed in the inside of the delivery storage container or mailbox. In select embodiments, the delivery storage container or mailbox may include AI entry management device 10 on an outside of the delivery storage container or mailbox. In other select embodiments, the delivery storage container or mailbox may include an alarm attached to the delivery storage container or mailbox configured for security. In other select embodiments, the delivery storage container or mailbox may include lighting attached to the delivery storage container or mailbox configured for illuminating the delivery storage container or mailbox and area around the delivery storage container or mailbox. In other select embodiments, the delivery storage container or mailbox may include a power source which may be, but is not limited to: a wired power source; a battery operated power source; a solar power source; the like; and/or a combination thereof. In other select embodiments, the delivery storage container or mailbox may include a warmer configured to heat the inside of the delivery storage container or mailbox. In other select embodiments, the delivery storage container or mailbox may include a wireless connection configured to control the delivery storage device or mailbox via a mobile device or a personal computer, including being configured to control the locking and unlocking of the delivery storage container or mailbox, controlling the temperature inside of the delivery storage container or mailbox via the warmer or the refrigerated compartment, the ultraviolet light inside of the delivery storage container or mailbox, or combinations thereof.

Another feature of artificial intelligence entry management system 100 may be that camera 22 may be adapted to read a virtual key from the person or the device, and upon reading the virtual key, AI entry management device 10 may be configured to activate a drone to retrieve deliveries from a specific location.

In yet another embodiment, the artificial intelligence entry management system 100 is operable to create and analyze data relating to delivery services and supply chain management. In this embodiment, scanning of a code on a package by the entry management device updates a database with information including time and date of delivery, length of time from when merchant shipped the good to when the customer received the good, and other pertinent information for insights on supply chain. Aggregation and analytics of this data provides for determining trends in deliveries in certain geographic areas and determining average delivery times for certain couriers from the time of hand off to the courier to delivery. For example, the AI entry management device is operable to provide data related to the frequency of use of the AI entry management device for entry, package delivery, or any other function described herein, the type of deliveries made, the cost of products delivered, a number of deliveries made by different couriers using the entry management device, a total cost of products delivered using the entry management device, an average cost of products delivered using the entry management device, and/or any other statistic operable to be determined from a label of a package or through image or audio analysis. In one example, the platform is operable to aggregate this data across multiple AI entry management devices for certain locations, such as neighborhoods, zip codes, cities, states, countries, etc.

This information is useful for providing analytics about which couriers are active in a certain area, which merchants are shipping packages in a certain area, and even granular analytics relating to individual delivery drivers, routes, and supply chain. Potential consumers of this information include couriers to determine courier competitor activity by date, time, and geographic area, and merchants to determine merchant competitor activity by date, time, and geographic area. For example, a clothing merchant is interested in activity of a competitor in a certain geographic area and is able to obtain information about this activity through the aggregation of data by the artificial intelligence system of the present invention regarding different courier activity for different merchants in a geographic area.

In another embodiment, the artificial intelligence entry management system 100 is operable to create and store data relating to entries and attempted entries for the artificial intelligence entry management device, such as an aggregated number of attempts to access the access point using the entry management devices and a number of times entry has been granted to the access point using the entry management device.

Another feature of artificial intelligence entry management system 100 may be that AI entry management device 10 can be configured as a receptionist device for corporate, commercial, institutional or industrial applications. The receptionist device may be configured to provide custom messages for each occupant and for receiving and recording custom messages for each user. One feature of the receptionist device may be that information may be forwarded wirelessly to each occupant, or information is retrieved from AI entry management device 10 by displaying a virtual key assigned to each occupant. Another feature of the receptionist device may be that AI entry management system 100 may include a plurality of AI entry management devices 10 configured as the receptionist device for corporate, commercial, institutional or industrial applications. Wherein each of the plurality of AI entry management devices 10 may interact and communicate with each other, whereby the plurality of AI entry management devices 10 may be configured to relay messages to the occupant.

Another feature of artificial intelligence entry management system 100 may be that microphone 24 may be adapted to identify an audible key from the person or the device. Upon identifying the audible key via microphone 24, AI entry management device 10 may be configured to unlock an access point or provide a greeting, information or logistics. In select embodiments, the audible key may be a word, words, a sentence, a number, a sound or sounds, wherein microphone 24 is configured to match the audible key with the person or device. In select embodiments, the artificial intelligence device may be configured to assign audible keys to a variety of users, whereby the artificial intelligence device may be configured to provide access or information to each of the variety of users. In other select embodiments, the artificial intelligence device may be configured to maintain a record of each of the variety of users. Yet in other select embodiments, the artificial intelligence device may be configured to record audible messages.

In another aspect, the instant disclosure embraces artificial intelligence entry management system 100 with a plurality of AI entry management devices 10. Each of the plurality of AI entry management devices 10 may be the disclosed artificial intelligence entry management device 10 in any of the various embodiments and/or combination of embodiments shown and/or described herein. As such, in general, each of the AI entry management devices 10 may be configured for use with an artificial intelligence device in communication with the entry management device 10 including a processor with a non-transitory computer readable storage medium comprising software having program instructions configured for providing artificial intelligence to the artificial intelligence entry management device 10. A network platform in communication with each of the plurality of AI entry management devices 10 may also be included. The network platform may be configured to allow each of the plurality of AI entry management devices 10 to communication with each other.

In select embodiments of artificial intelligence entry management system 100 with a plurality of AI entry management devices 10, the plurality of AI entry management devices 10 may be installed in a neighborhood. Wherein, each of the plurality of AI entry management devices 10 may be configured with the ability to communicate if a burglary occurs in any other house, or activate and pan the streets to record all traffic activity.

As shown in FIG. 1, AI entry management device 10 of AI entry management system 100 may be configured as a doorbell device 10. The doorbell device 10 can be positioned on or proximate to a door, and the system can include a lock on the door. The doorbell device 10 can include a computing device comprising a computer processor, such as a microcontroller. The microcontroller is operatively connected to camera 22 and the lock on the door via a Wi-Fi or Bluetooth® (Bluetooth trademark owned by Bluetooth SIG, Inc. of Kirkland, Wash.) signal. When camera 22 scans and processes a preprogrammed bar code, image, numbers or pictures, the microcontroller of the doorbell device 10 sends a signal unlocking the door lock. Also, camera 22 processes a preprogrammed bar code, image, numbers or pictures, a signal is received from the cloud server or computer processor after authentication causing a locking device to open or access to be gained. The doorbell device 10 can optionally include a card reader adapted for electronically reading identification cards, credit cards, and the like. The microcontroller can comprise a computer processor and a non-transitory computer readable storage medium comprising software having programming instructions that, when executed, cause the microcontroller to carry out the above described steps. According to an embodiment of the disclosure, the software can be adapted for use as an application on a mobile smart phone. The doorbell device 10 can include and interface with one or more artificial intelligence devices.

According to another embodiment of the disclosure, the system comprises the AI entry management device 10 or doorbell device 10 or an independent scanner located near or secured to a door, or in proximity to or secured to a lock box or other storage apparatus. The lock box or other storage apparatus can be adapted to contain letters, packages, or other deliveries. The lock box can be located near an entry point, built into a residential or commercial structure, located in a free-standing structure such as a mailbox or decorative column, in the ground or other places within the range of a Wi-Fi/Bluetooth® (trademark owned by Bluetooth SIG, Inc. of Kirkland, Wash.) signal. The independent scanner can have wireless or wired capabilities. The entire system can be wired, wireless or battery operated. A warning signal is delivered to an administrator(s) when any battery in the system becomes weak.

The independent scanner is capable of reading bar codes, images, numbers, and pictures. Upon reading and processing a preprogrammed bar code, image(s), numbers or pictures, a lock on the door, lock box or other storage apparatus is unlocked. Also, upon reading and processing of preprogrammed bar code, image(s), numbers or pictures, an appointed message or a general message can be delivered audibly or via a text to a mobile phone or an e-mail.

The independent scanner is capable of voice recognition. The independent scanner can comprise numbered buttons for additional authentication or to route information or notification to the appropriate user/client/owner. The independent scanner can be located at an entry point or in proximity of a lock box, storage facility or compartment. The scanner can comprise a storage or lockbox container with a built-in scanner either wired, wireless or battery operated.

According to an embodiment of the disclosure, the system can include a card reader capable of reading identification cards, credit cards, and the like. The card reader can be incorporated in the AI entry management device 10, or in the independent scanner.

According to an embodiment of the disclosure, the system can include a scanner/reader incorporated in another device connected to a storage container, box, storage facility or the like.

According to an embodiment of the disclosure, the system can include a secure storage container located on a property for the purpose of receiving packages and deliveries. The container can have an automatic locking and unlocking mechanism triggered directly by the scanner remotely via wireless technology or via a signal from a computer or cloud server. The storage container can be built into a structure, such as a house, located inside a column or other decorative structure, or can be free standing. The storage container or lock box can be equipped with a scanner.

According to an embodiment of the disclosure, the system can include a computer processor and a non-transitory computer readable storage medium comprising software having programming instructions that, when executed, cause a computer processor to carry out various steps described herein. According to an embodiment of the disclosure, the software can be adapted for use as an application on a mobile smart phone.

The software can enable a user to create a virtual key. The virtual key can be a bar code, a graphic image such as a photograph, and/or an alphanumeric code comprised of letters and/or numbers. In a preferred embodiment, the virtual key comprises a graphic image and an underlying alphanumeric code, and the scanner is adapted to read graphic images and alphanumeric characters. If weather or other issues prevent the scanner from being able to read the graphic image, the scanner can read the alphanumeric code. In another embodiment, the virtual key comprises a graphic image and an underlying code that may be used for authentication of the image, and the scanner is adapted to read graphic images and bar codes. If weather or other issues prevent the scanner from being able to read the graphic image, the scanner can read the alphanumeric code. When the scanner reads the virtual key it initiates one or more actions, such as unlocking an associated lock to allow access to a secured location or container, or transfer data to a computer processor or a cloud server to authenticate the key or perform the functions enabling access.

Notifications from the scanner can be sent wirelessly to the appropriate respondent enabling a remote signature receipt. The software application is capable of voice recognition. The software can create bar codes, images, and pictures and can forward them, such as by text or e-mail, to allow access to authorized visitors, deliveries, service personnel, and the like.

The software application can deliver a specific message for the specific bar code, image, picture and/or number(s) to input. The software enables remote programming of the scanner, lockbox, storage etc.

The software application enables remote two-way communication via wireless mobile devices. The software application coordinates the actions of all features of the system. The software application can receive data from a plurality of mobile devise or fixed devices via Internet, Wi-Fi, or other wireless or wired means.

The software enables the programmer to create a virtual key, which can be a unique barcode, character, picture, letter(s) and/or number(s). A corresponding virtual key is sent to designated recipient(s), such as delivery or service personnel. When scanned, access is gained, or a message is delivered from the system. The software allows access and messages to expire as programmed in accordance with each unique barcode, character, picture, letter(s) and/or number(s).

Each virtual key can be programmed to have a predetermined limited life span. Upon creating a virtual key, the user can select a predetermined date and time at which the virtual key will expire and no longer provide access.

The software can require a driver's license scan or card reader for the purposes of verifying entry. The software can time stamp every activation and document identity when desired. The software allows notifications to be sent to one or more mobile devices.

The software enables the person notified wirelessly to forward a unique barcode, character, picture, letter(s) and/or number(s) etc. to one or more recipients to provide access or messages.

The software can send a delivery confirmation to the sender, the delivery service and/or others involved. The software allows owners to change access according to need for residents or guests, thereby eliminating the need to change locks.

The software enables preprogrammed messages, directives to different individuals in accordance with the corresponding scan. The software enables a remote signature, symbol, and/or image to be sent from a handheld device to the system, enabling the delivery person to obtain such through the scanner or doorbell or other system apparatus.

The software can allow a mobile or stationary transmission of a barcode, image, etc. for the purposes of access, message and/or information. The software has voice recognition and artificial intelligence, enabling dissemination to appropriate users and interface with an authorized delivery person or guest. The artificial intelligence can provide information, directives, and/or greetings etc.

The software application enables all devices in the system to be synchronized in a secure manner by usernames and passwords or similar identification protocol. The system can be referred to as "Virtual Access Locator Technology" (VALT). The system comprises:

Scanner/Scanner/Doorbell/Light apparatus mounted in proximity to a door, lockbox, storage, compartment or other secured location or container.

Scanner can include illumination, camera, speaker, microphone, alarm, and reader(s) for cards, mobile phones, and mobile devices.

Controller comprised of a catalogue of keys for creation of a variety of selected inputs to be sent or transmitted to the scanner or to an individual(s) with a remote device or to an email address, or other address. Each virtual key, bar code, alphanumeric input has the capability of triggering a corresponding message, directive, etc. from the system when a scan is performed.

Controller(s) consisting of programmable devices (computer, laptop, cell phone, tablet etc.) running a software application controlling one or more systems of the disclosure.

Lock box(s), storage, compartments for storage of deliveries that interface with the controller and the scanner.

Software with a menu of features to customize the VALT system for uses such as managing construction sites and deliveries, providing remote contact by real estate agents with prospective buyers, forwarding an electronic code/virtual key for access utilizing the scanners, and serving property owners with a secure method of receiving deliveries.

A camera for monitoring package deliveries, recording access and egress, and date stamping time of events.

Two-way communication for wireless communication between person initiating scan and appropriate person(s).

Motion detection for activation of system or the pressing of a button.

If a delivery package requires a signature and the occupant is not home, the scan will enable the system to notify the occupant and an electronic signature can be forwarded to the deliverer as well as remote access triggered to a selected structure, such as a lockbox, storage, compartment.

An app enabling networking of artificial intelligence devices within or outside the Wi-Fi network.

An embodiment of the disclosure comprises a general-purpose computer that has been programmed to perform particular functions as a specific purpose computer pursuant to the instruction from program software, such as the software described above.

According to an embodiment of the disclosure, when a package, letter or other delivery is anticipated, the source of the delivery, which can be an online retailer, identifies itself as a VALT application member enabling the source to select delivery options which may include the provision of a virtual key to the retailer or carrier for delivery. The owner may designate specific delivery instructions, access, and/or access points for each delivery. The virtual key can be a predetermined bar code(s), graphic image(s), and/or other access authorizing input. When the purchaser receives the access authorizing input, that input is entered into the VALT system. The delivery source can also provide the authorizing delivery input (virtual key) to a delivery person responsible for delivering the package, letter, or other delivery to the purchaser. Alternatively, the purchaser can provide the virtual key to the delivery person. The VALT system stores the authorizing input until an anticipated match is received from a delivery person (bar code, image, numbers, etc.).

The VALT system scanner scans the input from the delivery person to determine if it matches the authorizing input that had been entered by the purchaser. When a match occurs, the VALT system is triggered to initiate one or more of the following actions:

Provide access (such as by unlocking a door or container)
Deliver a preprogrammed message to the source of the delivery
Establish contact with appropriate individual(s)
Date stamp delivery
Notify appropriate individuals of delivery (such as the intended recipient)
Initiate two-way communication
Activate camera
Activate motion detection
Activate the artificial intelligence device which will then interface with the VALT system providing instructions, directives, etc.

In an alternative embodiment of the disclosure, the intended recipient can create the authorizing input, such as a bar code(s) or image(s), and the intended recipient sends the authorizing input to the delivery source. For example, an individual can create a personalized authorizing input that the individual can provide to an online retailer at the time of making a purchase from the online retailer.

According to an embodiment of the disclosure, a system administrator has the ability to create barcodes, images, etc. or other authorizing inputs that can be sent for the purpose of access:

Deliveries
Guest
Family
Real Estate Sales
Service and repair personnel
Property management
Online real estate rental platforms, such as Airbnb An administrator/owner can create label and provide the label to a number of vendors. The label can be created by the sender using identified numbers or codes provided by the sender such as credit card number, number provided by administrator/owner at the time of order, and/or image selected by the administrator/owner at the time of order.

According to an embodiment of the disclosure, the VALT system has the capability of sending a signal to a variety of access points. One of which can be mail compartments, storage compartments, entry, or other. Once access is provided, the access information becomes invalid, or programmed to expire at a designated time.

The VALT system can include the ability to deliver messages or information associated with each scan. The system can also include voice recognition and AI (artificial intelligence), either built in or networked with other external AI devices, enabling it to conduct inquiries, provide information, and respond to inquiries.

The VALT system can be connected to a data base for the purpose of reading drivers' licenses or other Identification cards or badges. The VALT system date stamps, stores and configures a report of all activity. The VALT system confirms deliveries, date stamping each, and provides access to package containers, storing them safely.

According to an embodiment of the disclosure, the two-way communication enables remote communication with the owner/administrator and the person triggering the scan.

Locking compartments or storage compartments for the VALT system can be built in the structure or located in proximity to a structure in range of the VALT wireless input, the cloud server running the application, or a mobile device running the application.

In select embodiments, the VALT system comprises a scanner device, such as the AI entry management device 10 described above. Upon the purchase of an item from an online retail seller platform, a virtual key is created and transmitted to the AI entry management device 10 of the item purchaser. The virtual key can include the specific IP address of the purchaser. The virtual key is also sent to the designated retailer or delivery service that is to deliver the item to the purchaser if a VALT membership is confirmed. Upon delivering the item to the purchaser's location, the delivery service presents the virtual key, which can be a bar code that is scanned by the doorbell device. Upon scanning the virtual key, the VALT scanner AI entry management device 10 transmits a signal to the application server, computer processor or door lock that unlocks the door 112. The VALT system can program the virtual key so that it expires after a predetermined number of uses at the AI entry management device 10. For example, the virtual key can expire after it has been scanned one time by the AI entry management device 10. As such, the virtual key cannot be used again. Alternatively, the virtual key can be programmed to activate at a predetermined time and expire at a predetermined time.

According to an embodiment of the disclosure, the VALT system can be used in the field of real estate sales. Real estate agents can send access information wirelessly in the form of a bar code or image to a potential buyer visiting a home for sale. The potential buyer can input the access information into the system to unlock the door of the home and gain entrance. The VALT system can also confirm the identity of the potential buyer via driver's license scan. The system can monitor access via built in camera(s), conduct remote tour via interior cameras and monitor exit. The VALT system can be used with online real estate rental platforms, such as Airbnb.

In another embodiment of the disclosure, the VALT system can be used to receive service providers at a location, such as building contractors, sub-contractors, repair men, cleaning staff and other service personnel doing work at a residence. The homeowner can use the system to create access information and provide the information to the service providers who input the information into the system to gain access to the residence.

Another embodiment of the disclosure comprises a mobile app that allows for the creation of a virtual key to enable the transfer of keys for accessing a structure.

According to an embodiment of the disclosure, the VALT system comprises an artificial intelligence (AI) device and AI entry management device 10 having camera 22 that can be used as a scanner and a mobile app that can be utilized by merchants. The mobile app allows the transfer of specific barcode or other information. Also, included in the app is the ability to create virtual keys which may be sent to delivery personnel or service people. An unlocking component is associated with the creation of the virtual keys.

According to an embodiment of the disclosure, the virtual key expires at a predetermined time selected by the creator of the virtual key. The virtual key can be securely sent to a cell phone for access by various personnel.

In another embodiment of the disclosure, multiple artificial intelligence (AI) devices such as robots including aerial robots, communicate with one another in an established network. This allows messages to be shared, transmitted, and stored in other AI devices for both security and information purposes. If a delivery occurs and the recipient or occupant is not available, the VALT system communicates with the AI device with a notification that may be stored or sent to another AI device. According to an embodiment of the disclosure, membership in the network can be accepted via programming of a code, IP address, or some other identifier that can be accepted by another device or devices for shared communication. The information may extend to the merchant who has the ability to send a message to an AI device regarding delivery, shipping, or order information. The AI device may also communicate instructions to the delivery person via the VALT scanner or independently, in addition to storing important information from a delivery or service person.

Another embodiment of the disclosure comprises a system for delivering merchandise comprising an online membership platform on which a user, at the time of creating a membership, enters personal data, such as name, address, and credit card information. The user can create a virtual key, and enter special instructions for delivery personnel, such as the user's preferred location for leaving packages. The membership platform can be accessed at the time of making an online purchase. For example, an online retailer can make customers aware of the membership platform and provide a link to the platform when customers are about to make a purchase from the online retailer. Returning customers who have already created a membership can enter a password to bring up their existing membership. The system includes a scanner device that can read bar codes, images, and alphanumeric symbols. The scanner device can be encoded with the personal data of a particular user, including the user's "virtual key." The online retailer delivers the encoded scanner device to the particular user when the user creates a membership on the membership platform.

The user positions the scanner device proximate an access door of the user's home, business or other location to which the user has purchased from the online retailer is to be delivered. The scanner device can include adhesive or other attachment means that allows the scanner device to be securely attached to the user's home, storage container or other secure location. The scanner device can include a speaker, microphone, a display screen and a camera. Preferably, the display screen is a touch screen. When a delivery is scanned, confirmation of receipt of the package is transmitted to the online retailer and the user. Upon scanning of the package, the scanner device reads the virtual key.

If the user entered special delivery instructions on the membership platform, the instructions (such as "place the package on the back porch") can be broadcast audibly via the speaker and/or presented visually as text on the touch screen. If the delivery service personnel have an issue and wishes to communicate with the user, he can do so using the microphone. The online retailer can offer an "upgraded" scanner device that includes means for installing an electronic lock on the user's access door that is operatively connected to the scanner device. Upon scanning of the package by the scanner device, the scanner device reads the virtual key, which triggers the electronic lock on the access door to unlock for a predetermined amount of time to allow the delivery service personnel to place the package inside the user's home.

According to another embodiment of the disclosure, the VALT application can maintain a record of every activation and access key. A record is maintained of each activation that includes the virtual key utilized for the activation, the IP address and authorized user of the mobile device of the individual and/or entity utilizing the virtual key for access, the duration of stay, and the date/time of departure and/or termination of the virtual key.

According to another embodiment of the disclosure, the VALT application can include voice recognition technology and the virtual key comprises an audible recording of a series of numbers, words and/or sounds, which can be created by the administrator. The voice recognition technology can be operatively connected to the scanner device whereby the scanner device is adapted to receive and process voice data. When the scanner device receives and processes the audible sound of the virtual key one or more actions can be initiated, such as unlocking a door to a structure and/or providing a greeting and/or logistics information.

According to another embodiment of the disclosure, access to the VALT application can be protected by biometric recognition of the user. Access to the VALT application is granted when certain biometric data of the user is authenticated. Authentication can be achieved by scanning fingerprints and/or other physical features of the user.

According to another embodiment of the disclosure, the VALT system can include a secondary power source that enables the system to continue working in the event of a power outage. The secondary power source can (a) serve as a backup power source, (b) charge a battery capable of powering the system when electricity is not available, and/or (c) contain a backup energy/power device capable of powering the system. The secondary power source can comprise one or more solar (photovoltaic) panels.

According to another embodiment of the disclosure, the virtual key can trigger a drone device that retrieves a package and takes it to a designated storage area. Rather than the virtual key being used to access a structure, the key activates a drone device that flies to the delivery area and retrieves the package when the key is scanned.

Another embodiment of the disclosure comprises a system that can be referred to herein as "Mapping and Locator Technology" (MALT). The MALT system can be an optional or additional feature of the VALT system. In accordance with the MALT system, a global navigation satellite system, such as The Global Positioning System (GPS), is used to interface with multiple devices to initiate access and/or activate messages or logistics when devices are within a particular range of distance between each other. The particular range of distance necessary to initiate access and/or messages or logistics can be entered into the MALT system. The range of distance can be for example five feet, or it can be greater or less. The GPS detects the geo-location of each device, and when it is determined that the multiple devices are within the particular range of distance of each other a number of different actions can be initiated, such as granting access to a structure and/or activate messages and logistics.

The MALT system, utilizing a standard GPS service, can establish a relationship between a host device and one or more mobile devices running the VALT application. The mobile devices can be mobile smartphones. The host device comprises a computer processor and is linked to each mobile device using the IP address of each mobile device. The host device can be an artificial intelligence device. When the mobile device comes within proximity of the host device, the host device initiates one or more actions, such as providing access to a structure and/or providing a greeting and/or logistics information. This feature eliminates the need for optics and/or near-field communications (NFC). When utilized in delivery services it enables the carrier to simply arrive and come within proximity of the host device.

In another embodiment, the MALT system, utilizing a standard GPS service, can establish a relationship between a mobile device and a specific landmark or address. When the mobile device is within proximity of the specific landmark or address, access or logistics are activated utilizing. The mobile devices can be mobile smartphones or a carrier's diad (mobile device) which can be utilized for access and logistics. This feature eliminates the need for optics and/or near-field communications (NFC). When utilized in delivery services it enables the carrier to simply arrive and come within proximity of the landmark or address.

The MALT system can interface with devices of VALT members. Information and logistics can be programmed into each carrier's mobile device and when the carrier's mobile device is within proximity of a landmark or address, access and directives are initiated.

According to a preferred embodiment, the MALT system can utilize a virtual key for added security. The host device can be the AI entry management device 10 described above. The AI entry management device 10 is linked to a mobile device using the IP address of the mobile device. In addition, a virtual key can be created and transmitted to the linked mobile device. When the mobile device comes within proximity of the AI entry management device 10 and the virtual key is read by the AI entry management device 10, the host device initiates one or more actions, such as unlocking the door to the structure operatively connected to the AI entry management device 10 and/or providing a greeting and/or logistics information. In order to initiate the action, the linked mobile device must be within the particular predetermined range of distance of the AI entry management device 10 and the AI entry management device 10 must read the virtual key from the mobile device. This provides an added layer of security. The virtual key can be a bar code, a graphic image, such as a photograph, and/or an alphanumeric code comprised of letters and/or numbers. Preferably, the virtual key comprises a graphic image and an alphanumeric code. If weather or other issues prevent the AI entry management device 10 from being able to read the graphic image, the AI entry management device 10 can read the alphanumeric code.

In a method according to a preferred embodiment of the disclosure, the MALT system can be used in a delivery process. When delivery of an item, such as package or letter, is anticipated, a virtual key is created and transmitted, such as by e-mail or text, to the delivery service responsible for delivering the item. The virtual key preferably comprises a graphic image and an underlying alphanumeric code. The virtual key can be created by the recipient of the item by taking and selecting a photograph and entering a series of alphanumeric characters. Alternatively, the virtual key can be created by the seller of the item to be delivered, and the seller transmits the virtual key to the recipient and the delivery service responsible for delivering the item. The delivery service transmits the virtual key to the mobile device of the delivery person delivering the item. In addition, the delivery person's mobile device is linked to the recipient's AI entry management device 10 via the IP address of the mobile device. The AI entry management device 10 is provided at the home of the recipient. The AI entry management device 10 can be operatively connected to an access point of a structure, such as the front door of the recipient's home whereby the AI entry management device 10 can lock and unlock the front door. When the delivery person arrives at the recipient's home, the delivery person presents the virtual key on his mobile device to the AI entry management device 10. When the AI entry management device 10 detects that the delivery person's linked mobile device is within the required range of distance and reads the virtual key on the mobile device, the VALT system initiates one or more actions, such as provide access (such as by unlocking the front door), provide a preprogrammed message to the delivery person, contact the recipient or other appropriate individual(s), date stamp delivery, notify appropriate individuals of delivery (such as the intended recipient), initiate two-way communication between the recipient and the delivery person, activate the camera, activate motion detection, and activate an artificial intelligence device which interfaces with the VALT system providing instructions, directives, etc.

The MALT feature can be activated or canceled via the VALT application. VALT offers at least two levels of authentication and convenience: (1) image identification with a code to prevent the forwarding or transfer of the image, and (2) code detection via NFC for the purposes of verifying the image code. The use of GPS makes deliveries interactional and intuitive by providing immediate access and/or information or directives.

Figure 9:
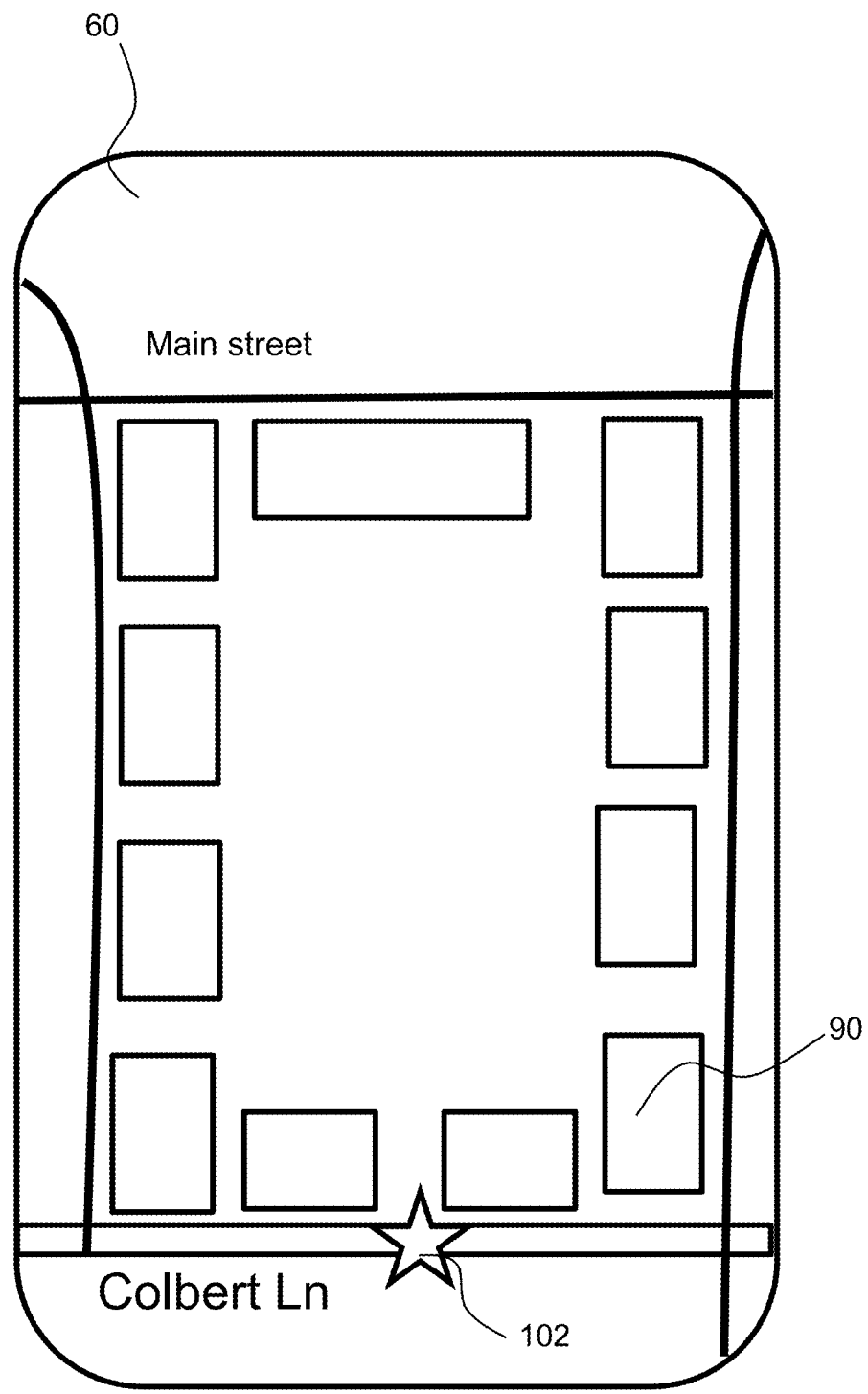
FIG. 9 shows a display screen showing the artificial intelligence entry management system tracking a mobile electronic device, such as a mobile phone, of a third party to enable a contextual greeting and to provide logistic instructions to said third party when their mobile device moves within a threshold distance of the artificial intelligence entry management device.

Mobile electronic devices and GPS provide advantages over GPS and vehicle location. The VALT application can use GPS to provide delivery confirmation when the mobile device of the carrier and the VALT host are in proximity. As shown in FIG. 9, a mobile electronic device 60 may be tracked by the AI entry management device system, wherein a location of a mobile electronic device 102 of a third party 102, such as a mobile phone or beacon with respect to an access point 90, as represented by display 15 of the AI entry management device system, as an example. It is to be understood that the tracking may be accomplished without any display output, however the display 15 may be provided on the AI entry management device 10, and/or on the third party's mobile electronic device and/or an administrator's mobile electronic device. The AI entry management device system 100 may provide a contextual greeting when the third party's mobile electronic device moves within a threshold distance from the AI entry management device 10, such as within about 20 m or less, about 10 m or less, about 5 m or less and any range between and including the threshold ranges provided. The contextual greeting may include the name of the person associated with the third party mobile electronic device or the name of a company that they are associated with. The artificial intelligence entry management system may provide a greeting a logistic instructions for delivery of a package, such as "Hi UPS driver, please place the package in the storage container on the porch." It is to understood that this tracking and display feature may be provided and/or accessed by an administrator on an electronic device including a mobile electronic device. Furthermore, the display on the AI entry management device may also show the location of a tracked delivery person, as shown. A person may pull up the location of a deliver person before leaving or entering their home to know when to expect a delivery.

Figure 10:
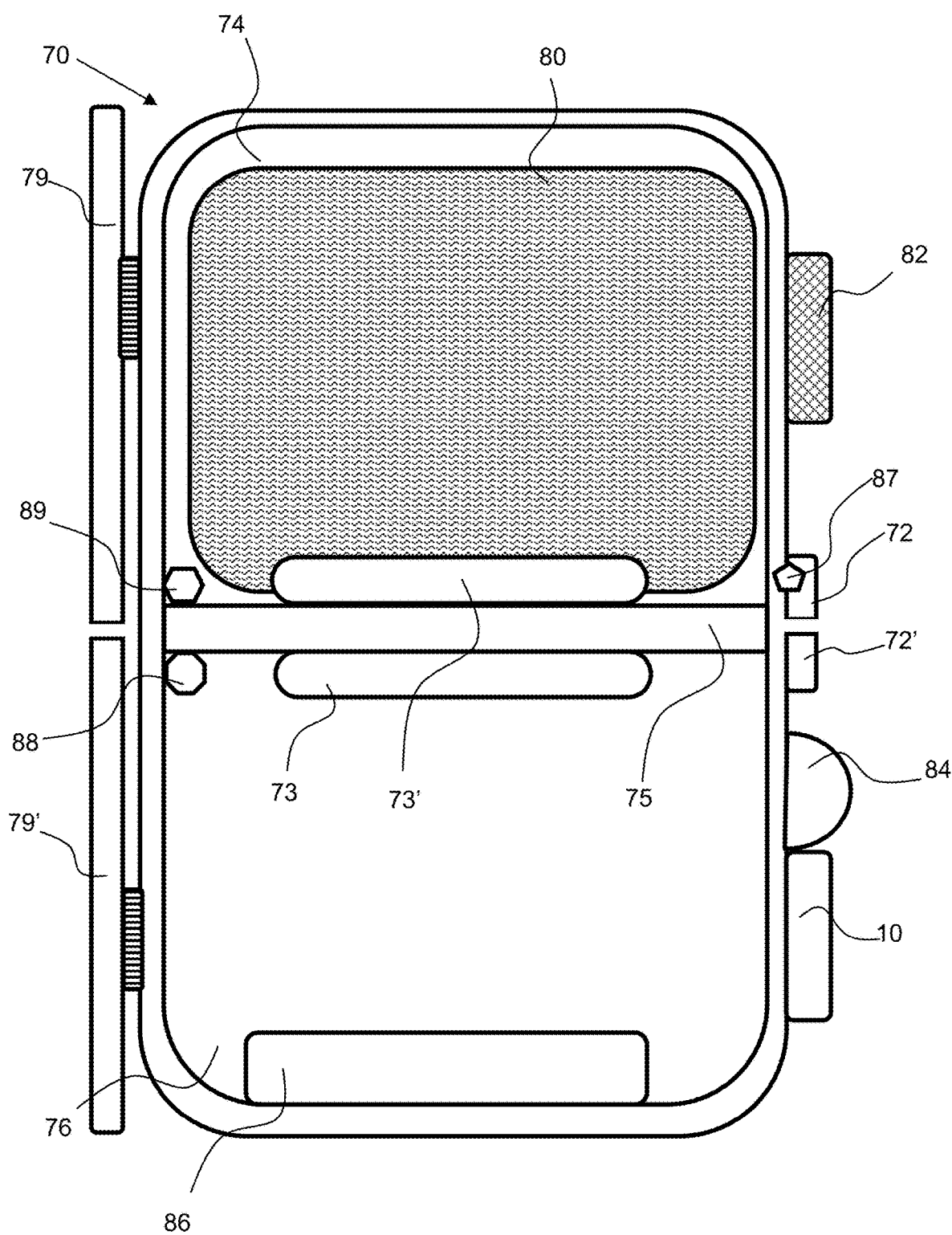
FIG. 10 is a top view of an exemplary storage container having two compartments therein.

As shown in FIG. 10, an exemplary storage container 70 has a first compartment 74 and a second department 76 formed by a divider 75. The first compartment has a heating device 80 and the second compartment has a refrigeration device 86. Also, the UV lights 73, 73' are configured to produce a disinfecting UV light used to disinfect packages and contents within the storage container. The storage container 70 is also configured with a lock, which is an electronic lock that is unlocked and locked by the AI entry management device system when a virtual key is verified. The storage container also has a light 84 and a speaker 82. The light may be used to aid in finding and opening the storage container, when used after dark and the speaker may be used to emit audible phrase from the AI entry management device system, such as logistic information. It may direct the delivery person to place a package in a specific compartment of the storage container, for example. Also, the speaker and light may be used as an alarm in the event the storage container is jostled or moved or in the event that the storage container is opened without authorized access.

Figure 11:
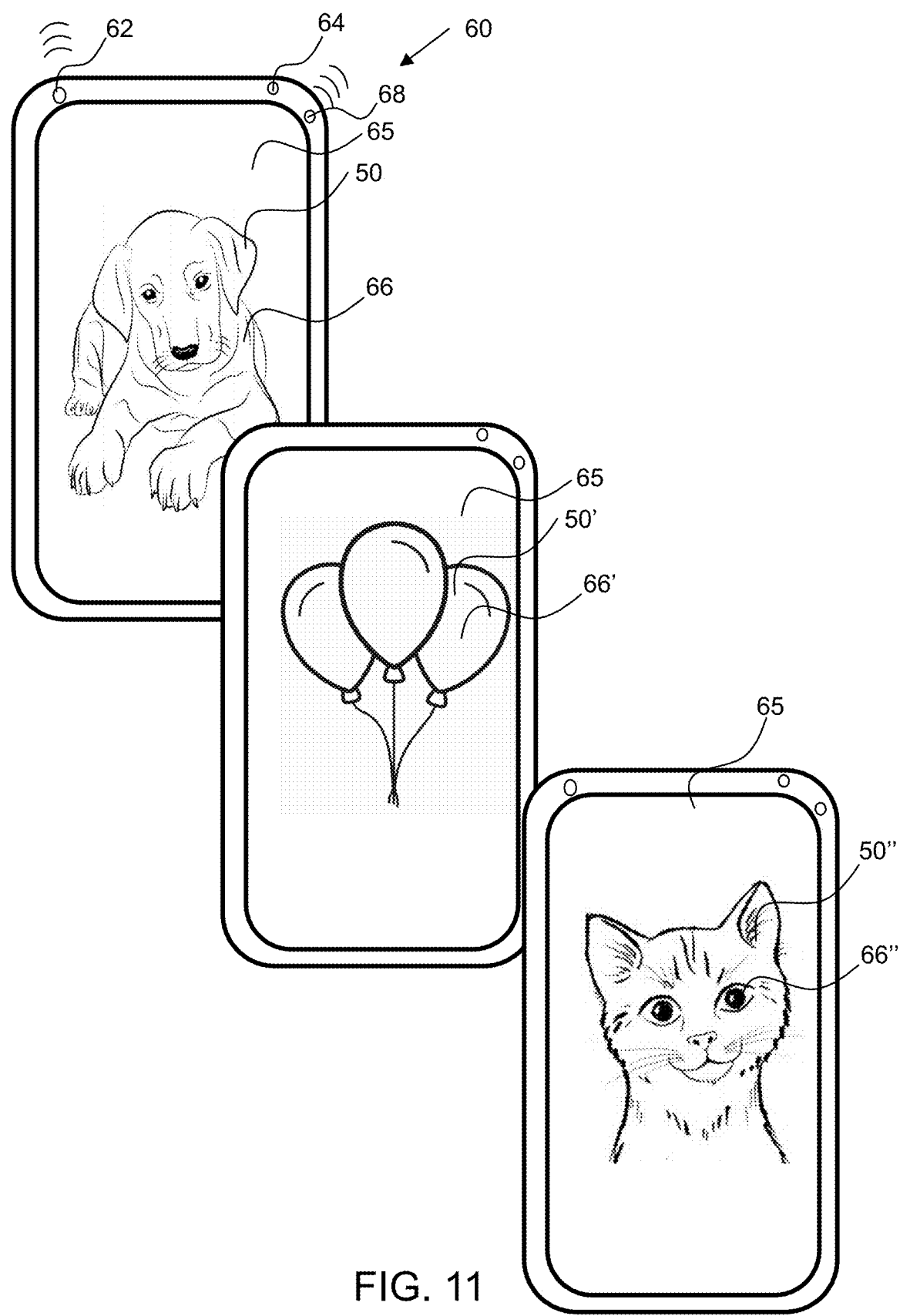
FIG. 11 shows a front view of a mobile electronic device that displays a plurality of digital photographs that in series are an image virtual key configured to be identified by the camera of the artificial intelligence entry management device and verified for access to an access point.

As shown in FIG. 11, a mobile electronic device 60 is configured to display a plurality of digital images 66, which may be digital photographs that, in series, are an image virtual key 50, 50', 50" configured to be identified by the camera of the artificial intelligence entry management device and verified for access to an access point. A user may receive a plurality of digital images or photographs from an administrator of the entry management system, which may all be in a single file or separate files, and the user may then display the virtual key images to the camera of the entry management device in sequence, dog, balloons, cat, for example. The artificial intelligence entry management system may be configured to unlock a lock when a virtual key is verified by the AI entry management device.

Figure 12:
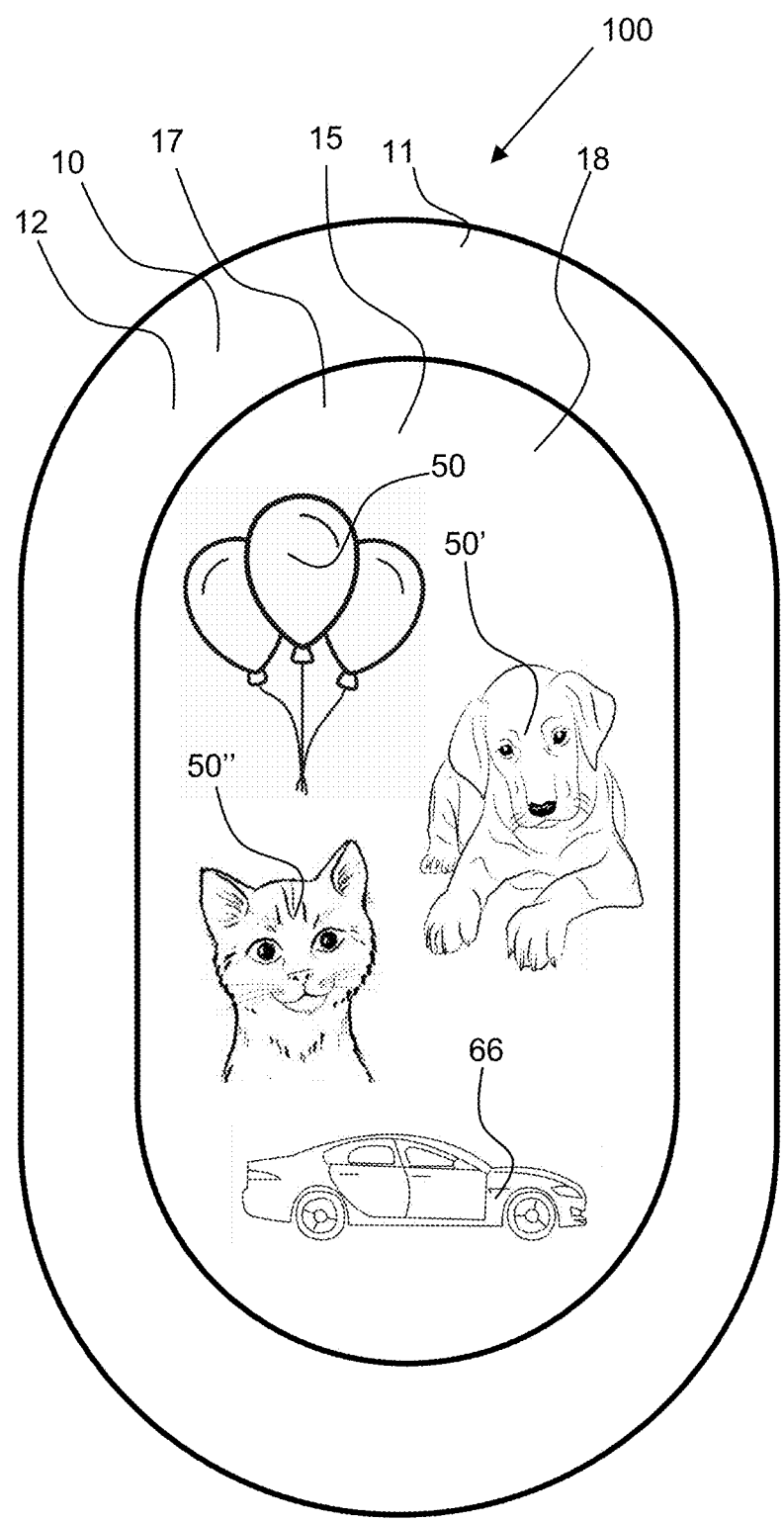
FIG. 12 shows a front view of an exemplary artificial intelligence entry management device having a display screen that displays images for selection as a selected virtual key.

As shown in FIG. 12, an exemplary artificial intelligence entry management system 100 may require a virtual key to be selected on a display screen 15, from a plurality of digital images 66, before a lock is unlocked. The artificial intelligence entry management device 10 may have a display screen 15 that may also be a touch screen 17 that enables a user to select one or more digital images for entry. The user may have to select a plurality of digital images to produce a virtual key and the image virtual key may require each image virtual key 50, 50', 50" to be selected in a specific sequence, such as balloon, dog, cat, for example. A plurality of other digital images 66 or photographs may also be displayed on the display screen during the selection or entry of the virtual key. Again, a system administrator, or the artificial intelligence entry management system may automatically, send an image virtual key. The user may view the virtual key on their electronic device and then use the touch screen to select these images. The artificial intelligence entry management system may send image virtual keys to a user when they are expected to arrive, such as to a cleaning professional prior to their weekly scheduled arrival.

Figure 13:
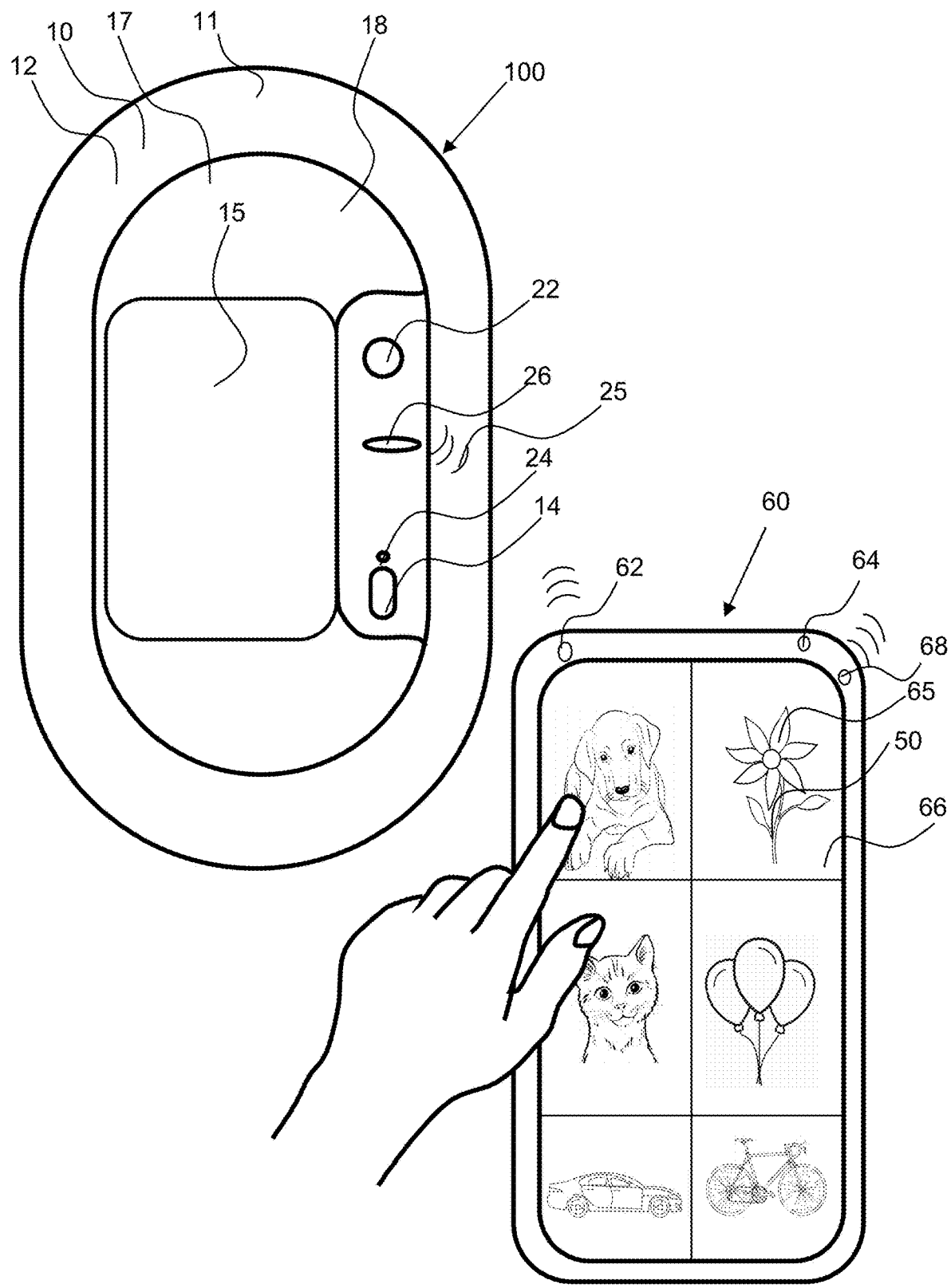
FIG. 13 shows a front view of an exemplary artificial intelligence entry management device communicating with a mobile electronic device to present a plurality of images for selection to produce an image virtual key for access to an access point.

As shown in FIG. 13, an exemplary artificial intelligence entry management system 100 may require a virtual key to be selected on a display screen 65, of a mobile electronic device 60, from a plurality of digital images 66, before an access point is unlocked. The artificial intelligence entry management device 10 may communicate with the mobile electronic device through a wireless signal 25, such as a Bluetooth signal and send a plurality of digital images for the person to select on their own mobile device to enable entry to an access point. The plurality of digital images may be configured in a grid and may include one or more images that were sent previously to said person via the artificial intelligence entry management system. The person may then select the images when they approach the artificial intelligence entry management device 10. The user may have to select a plurality of digital images to produce a virtual key and the image virtual key may require each image virtual key 50, 50', 50" to be selected in a specific sequence, such as balloon, dog, cat, for example. A plurality of other digital images 66 or photographs may also be displayed on the display screen 65 during the selection or entry of the virtual key. Again, a system administrator, or the artificial intelligence entry management system may automatically, send an image virtual key. The user may view the virtual key on their electronic device and then use the touch screen to select these images. The artificial intelligence entry management system may send image virtual keys to a user when they are expected to arrive, such as to a cleaning professional prior to their weekly scheduled arrival.

The artificial intelligence entry management device 10 may be configured on the storage container and may have a speaker and camera configured to interface with the person to scan a virtual key and provide access to the storage container and/or another access point. An exemplary storage container 70 may comprise a closure sensor 87 that detects the position of a storage container closure, such as a lid or door. In the event the closure is opened without authorization, the light 84 and/or speaker 82 may be activated to produce an alarm. Also, an exemplary storage container may have an accelerometer 88 that detects motion and when the motion above a motion threshold is detected, an alarm may be activated on the storage container and/or entry management device. An exemplary storage container may have a global positioning system (GPS) location device 89 that is used to monitor a location of the storage container and when the storage container is moved beyond a perimeter limit or a threshold distance from a location, an alarm may be activated on the storage container and/or entry management device. These theft prevention measures may help to ensure that packages delivered into a storage container and the storage container are not stollen.

Figure 14:
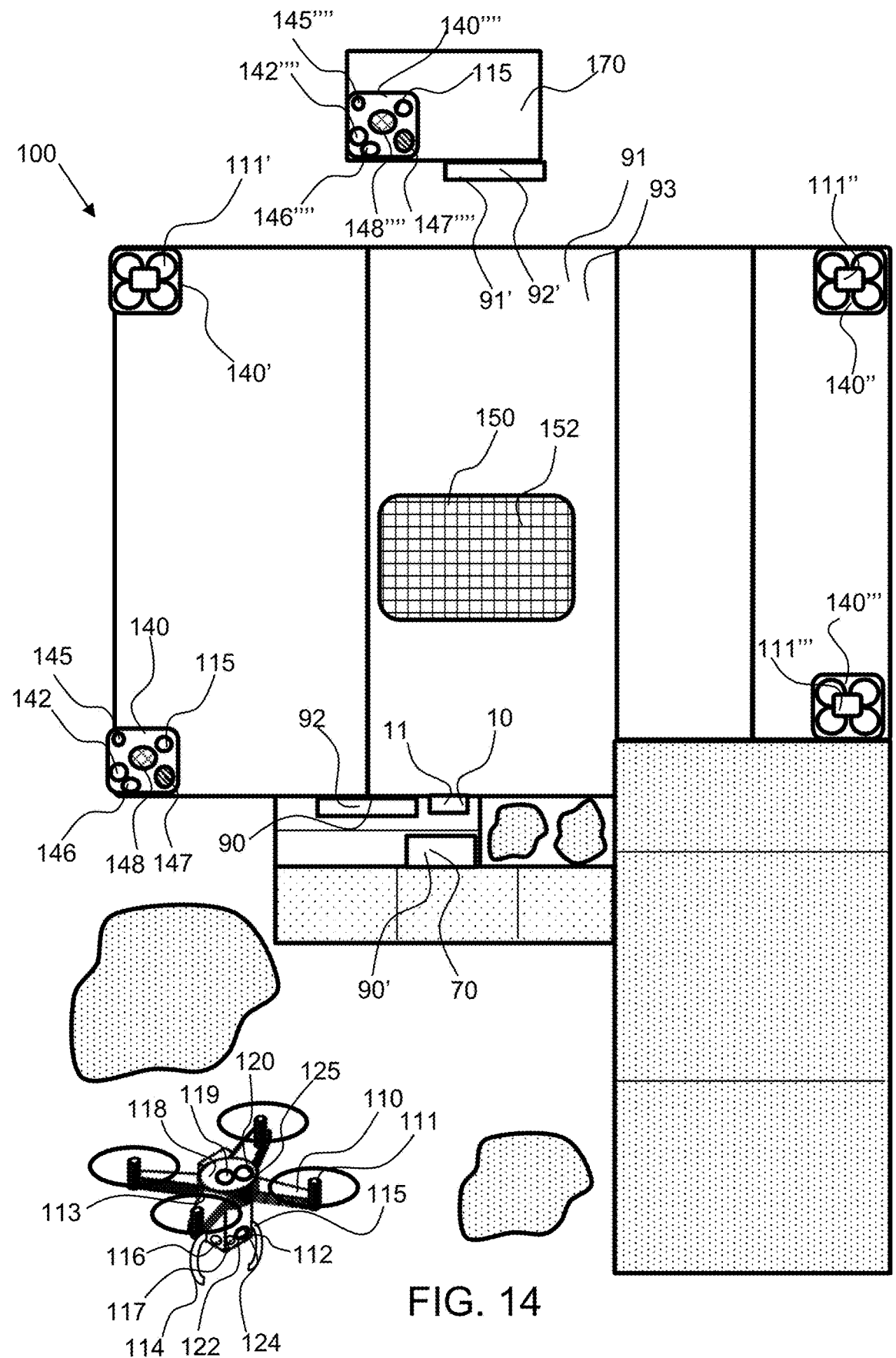
FIG. 14 shows a top view of a building, a dwelling, having robot docking stations configured on each corner of the building to provide substantially complete monitoring of the perimeter of the building.
Figure 15:
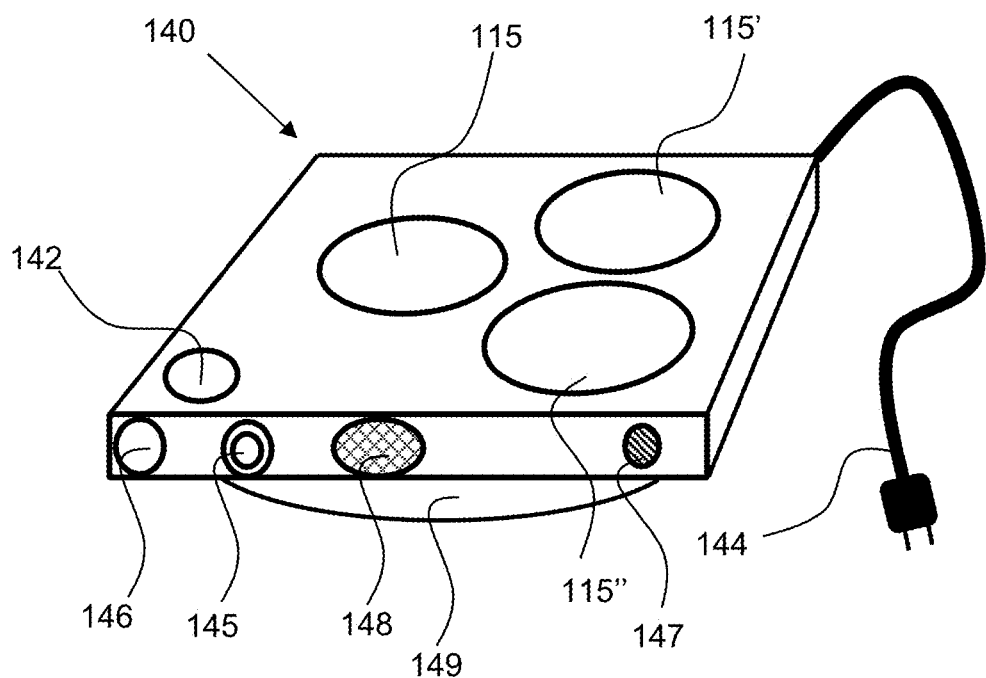
FIG. 15 shows an exemplary docking station having a plurality of batteries and a charging interface for charging a robot docked thereon.

Referring now to FIGS. 14 and 15, an exemplary artificial intelligence entry management system 100, comprises an artificial intelligence entry management device 10 an access point 90, the front door to the home and 90' a storage container 70, as well as a plurality of robots 110, aerial robots 111, 111', 111" and 111'" that are configured to dock on corresponding docking stations 140, 140', 140" and 140'". The docking stations are configured to provide power to the robot via a charging port 142 and/or interchangeable batteries 115, 115', 115". A battery on the robot 115 may be charged by the charging port 142 when the robot is docked on the docking station 140, and/or the battery on the robot may be interchanged with a battery of the docking station. The power for the charging of the batteries may be from a power source of the building, such as from a power line 144 that is plugged into or otherwise coupled with the building electrical power system. The power may also come from a renewable power source, such as a solar panel 152. The power generated from the solar panel may be coupled directly with the docking station(s) and may be configured on or near the docking stations.

Four of the docking stations are configured proximal to the corners of the building to provide substantially complete perimeter monitoring via the camera 112, motion detector 120 and/or microphone 117 on the robot 110, such as the aerial robot 111. Also, the docking station 140 may include a camera 145, motion detector 146, microphone 147 and/or a speaker 148. The docking station may also effectively monitor an area around an access point, such as around a perimeter of a home or business. The docking station may emit an alarm when motion is detected or when a threat is detected by the robot or docking station. In the event that the camera on either the robot or the docking station detects motion for example, the areal robots may be deployed from the docking station to investigate more closely by flying to be in closer proximity to the source of the motion and/or sound. An alert may be provided to the intelligence entry management system 100 and images and audio received by the microphone, of the robot or docking station, may be transferred in real time to the intelligence entry management system 100 for an administrator to review. Also, the access points may be locked in the event that any motion or sound above a threshold amount is detected. The robot may act autonomously when monitoring the perimeter of the building and may interface with the intelligence entry management system 100 only when the detected sound or movement is determined to be threat. A robot may be configured for surveillance or a property or an area around a building or access point and may use a camera to detect motion and a microphone to detect sound. The robot(s) may act independently to monitor, record events detected and/or follow a threat or person that is detected.

In another embodiment, a robot is programmed with one or more patrol routes on a predetermined schedule within a property, with the one or more patrol routes controlled or determined by the entry management device or a software platform to which the entry management device is connected over a network. The software platform preferably includes at least one server or at least one edge device. Alternatively, the software platform is a cloud-based platform. The patrol routes are operable to include random movement across a property, a patrol around a perimeter of a property, a patrol around a perimeter of a house, a patrol around the outside of a specific area of a house such as the front porch or bedrooms, or any combination thereof. Patrol routes are operable to differ based on the day of the week or the time of day.

In one embodiment, the robots include image recognition technology to assist in providing security for a property. Alternatively, the platform of the present invention is operable to provide image recognition technology upon receiving images or videos from a robot. In one example, the image recognition technology includes facial recognition technology, whereby certain people are whitelisted, i.e. allowed on the premises, or blacklisted, i.e. not allowed on the premises. Upon detection of a blacklisted person on the premises, the robot is operable to automatically send a command to the entry management device to alert the authorities, a registered user device associated with the entry management device, or a guest device granted access by the entry management device upon recognition of a blacklisted person. Alternatively, the platform is operable to receive the image or video, recognize the blacklisted person, and alert the authorities, a registered user device associated with the entry management device, or a guest device granted access by the entry management device. In one embodiment, recognition of a whitelisted person causes an alert to be sent to a registered user device associated with the entry management device or a guest device granted access by the entry management device. The entry management device is operable to communicate with a database or web crawler to retrieve information relating to an unknown person, a blacklisted person, or a whitelisted person based on facial recognition. In one embodiment, the information includes an identification of a career or position of the person, information about a company associated with the person, an age of the person, an identification of any criminal history, litigation history of a person, mutual contacts between an owner of the entry management device and the person, or any other information available from a web search, an online criminal background search, or a social media search including recent activity, media, posts, reported locations of the user, etc. In the event that facial recognition is not possible due to concealment of the user's face, such as via a mask, a hood, sunglasses, or any other face obscuring article or item, the robot is operable to automatically send a command to the entry management device to alert a registered user device associated with the entry management device or a guest device granted access by the entry management device.

The entry management device is also operable to include a facial recognition module operable to identify individuals who are approaching the access point and identify the individuals as authorized or unauthorized individuals. The entry management device is operable to automatically transmit a lock command to the electronic lock when an unrecognized or unauthorized individual approaches the access point. Advantageously, this command is operable to be sent when the individual is more than a predetermined distance away from the access point, such as 1 meter away or more than 2 meters away from the access point, thereby effectively locking an access point before the unauthorized or unrecognized individual is able to open the access point. The entry management device is operable to automatically send a command to the at least one secondary camera to zoom in on a face of at least one unrecognized individual within a predefined distance of the access point. If the facial recognition module identifies an unauthorized individual, then the entry management device automatically transmits an alert to at least one registered user device associated with the access point. The entry management device is operable to activate and/or deactivate the at least one robot, and wherein activation of the at least one robot causes the at least one robot to track and follow at least one individual proximate to the access point.

In another embodiment, image recognition technology includes weapon recognition technology providing for recognition of weapons. Upon recognition of a weapon, such as a firearm, a knife, a crowbar, a baseball bat, etc., the robot automatically sends a command to the entry management device to alert the authorities, a registered user device of the entry management device, or a guest device granted access by the entry management device. Alternatively, the platform is operable to receive the image or video, recognize a weapon, and alert the authorities, a registered user device associated with the entry management device, or a guest device granted access by the entry management device. In another embodiment, image recognition technology provides for recognition of threatening or damaging actions, such as kicking a door, breaking a window, throwing an object at a house, shooting a firearm, physical violence such as hitting another person, or injury or medical emergencies such as someone falling, fainting, or passing out. Upon recognition of this action, the robot sends a command to the entry management device to alert the authorities, a registered user device of the entry management device, or a guest device granted access by the entry management device upon recognition of the action. Alternatively, the platform is operable to receive the image or video, recognize an action, and alert the authorities, a registered user device associated with the entry management device, or a guest device granted access by the entry management device. Artificial intelligence or machine learning algorithms are utilized by the platform connected to the entry management device in one embodiment to assist in image recognition.

In another embodiment, the robots or the platform include audio recognition technology which is operable to identify and classify certain sounds. Examples of recognizable sounds include a gunshot, glass breaking, screaming or yelling, or any other sound that signifies a threat, a potential threat, violence, or physical injury. Upon recognition of a recognizable sound, the robot sends a command to the entry management device to alert the authorities, a registered user device of the entry management device, or a guest device granted access by the entry management device upon recognition of the action. Alternatively, the platform is operable to receive the audio, recognize the recognizable sound, and alert the authorities, a registered user device associated with the entry management device, or a guest device granted access by the entry management device. Artificial intelligence or machine learning algorithms are utilized by the platform connected to the entry management device in one embodiment to assist in audio recognition.

A docking station 140"" may be configured on the ground or on another structure 170 detached from the building 93, such as a dwelling 91, having an access point 90, such as a door 92. This structure 170 may also include an access point 90', such as a door 92' and may be a shed or other dwelling or building. The structure may also be specific for docking and be configured proximal to the ground for servicing.

Figure 16:
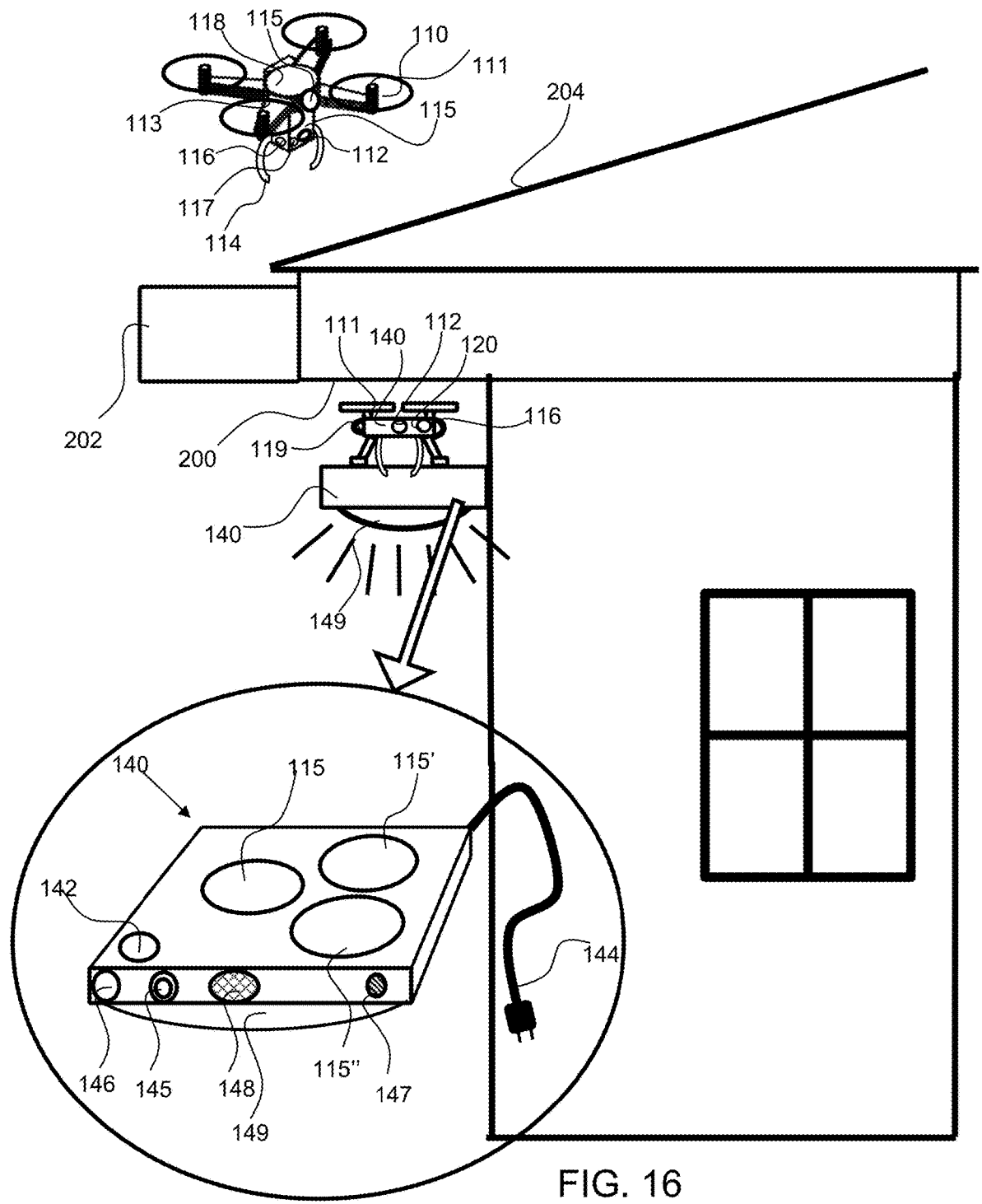
FIG. 16 shows an exemplary docking station configured under the eave of a home.
Figure 17:
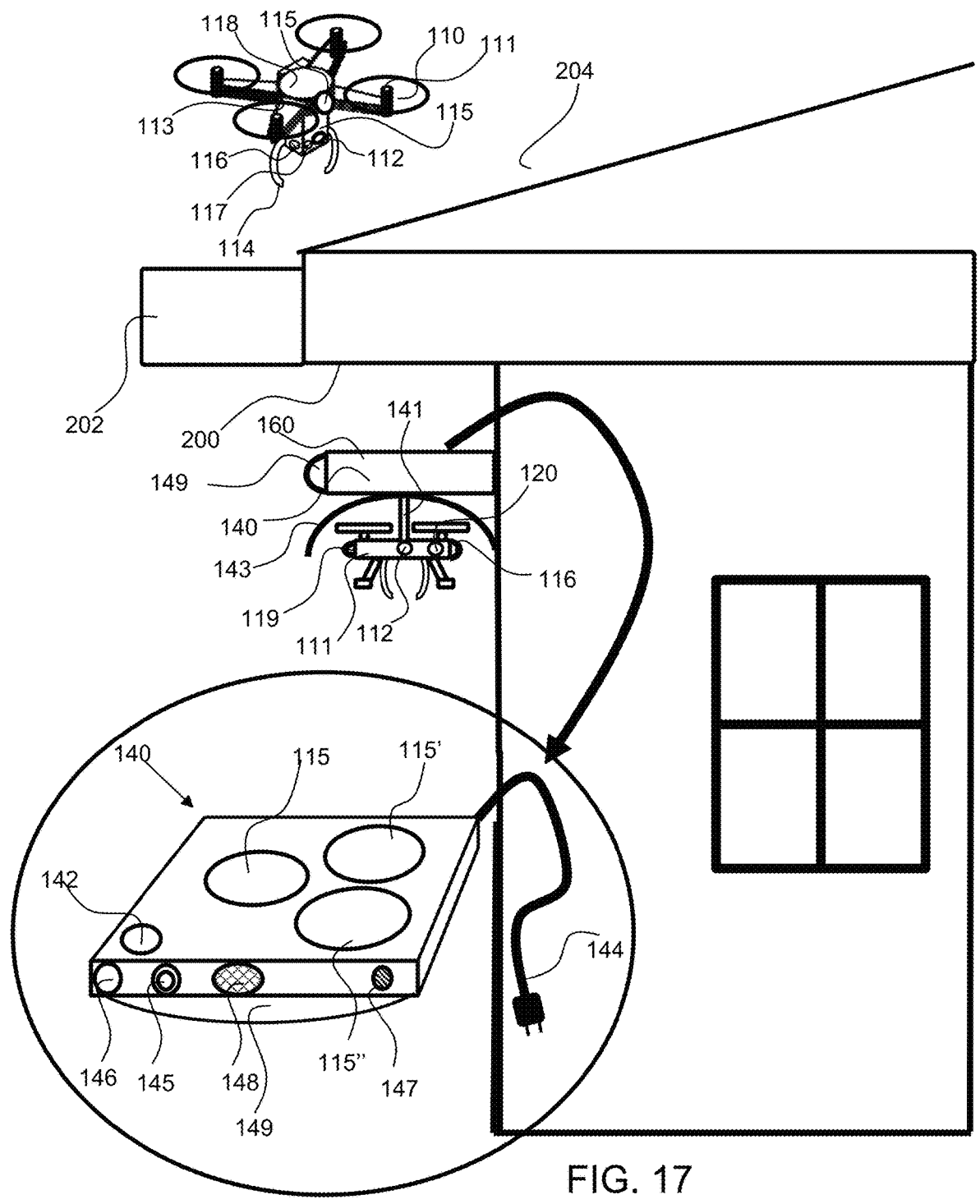
FIG. 17 shows an exemplary docking station configured under the eave of a home.

Referring now to FIGS. 16, 17 and 18, an exemplary docking station 140 may be configured under the eave 200 of a home, or under the gutter 202 for protection from the elements. The docking station may have a docking station light 149, which may act as an exterior light or flood light. As shown in FIG. 16, the aerial robot 111 is configured on top of the docking station 140, between the docking station and the eave 200 and gutter 202. The docking station light 149 is on to provide illumination which may aid in the aerial robot surveilling an area around the home. A second aerial robot 111' is flying above the roof 204 of the home. The details of the docking station 140 are shown in the docking station in the circle, for clarity. The docking station may have any of the components as describe and shown in FIG. 15. As shown in FIG. 17, the aerial robot 111 is configured on under the docking station 140 and under a docking cover, a dome shaped cover to protect the aerial robot from the elements. The docking cover may be transparent to enable surveillance through the cover by the motion detector 120 and/or camera 112 of the aerial robot. A docking extension 141 is coupled with the docking station 140 to retain the aerial robot 111 to the docking station. Again, the docking station may have any of the components as describe and shown in FIG. 15. As shown in FIG. 17 the aerial robot is coupled with a docking station 140 that is also a light fixture 160, such a flood light for the home. The aerial robot may be small and inconspicuous with respect to the light fixture. As shown in FIG. 18, the aerial robot 111 is docked horizontally via the docking extension 141 that is coupled with the docking station 140. The docking extension may extend from the top, bottom or side of the aerial robot. The docking extension or receiver on the docking station for the docking extension may have a latch or pin or other mechanical retaining mechanism to keep the aerial robot securely docked.

A robot may be activated to begin surveillance by the system, or by a separate mobile device. A person may activate the robot(s) to monitor an area around their home when they leave, for example. A robot may interface with any smart-home system, a system configured to lock and unlock doors for access to a building, such as a home and place of business. A smart-home system may have an artificial intelligence entry management system as described herein. A robot may be controlled by the smart-home system, wherein they receive instructions through a wired or wireless connection with the smart-home system to perform a function. A robot may have some autonomous functions, such as surveillance, monitoring and capturing images and sound recordings. Also, a robot may act independently to follow a threat to record images of said threat and/or vehicle.

In one embodiment, the entry management device instructs one or more robots to patrol the premises for a vehicle and capture images of a vehicle, including a license plate, if a person is detected by the entry management device or by another device in network communication with the entry management device or another device that transmits an alert to the entry management device regarding detection of a person on the premises. Alternatively, other devices such as cameras are instructed by the entry management device to capture images or videos of a vehicle. These instructions include movement or pivoting of a camera or a camera zooming in or out in one embodiment. This functionality is useful for cataloging a list of visitors to a property or premises, and in one embodiment the platform or the entry management device creates a searchable database of visitors who have visited a property along with a time of entry to the property, a time of exit from the property, a duration of time spent on the property, and an identification of guests with a person during their visit. If a person is not detected damaging property on camera, but property damage occurs the day a person visited the premises, this information assists a resident and the authorities in obtaining more information about potential suspects.

One or a plurality of the robots and in particular aerial robots may be configured to monitor and track a threat, such as an unauthorized person on or around an access point. The robot or robots may be deployed from a docking station and follow the threat for closer surveillance. The robot(s) 110 may activate the robot light 119 to deter the threat. The light may flash and may be a bright light, such as more than 500 lumen or more than 1,000 lumen. The light may also flash rapidly such as about 1 hertz or more, or about 2 hertz or more, about 5 hertz and any range between and including the cycles per second provided. This bright rapidly flashing light may effectively deter the threat. Also, the robot or robots may emit an alarm by the robot speaker 116 and this alarm may be directed at the threat via the directional speaker capability as described herein. A user may activate the alarm or siren, such as when they are notified of activity detected by the robot. A user may be sent a picture or video of an intruder that is actively moving about the building and the user may then activate the alarm, and or deploy the robots to take action to deter the intruder. The alarm or siren may be loud such as about 75 decibels or more, about 100 decibels or more, about 120 decibels or more and any range between and including the sound levels provide. The docking stations may also be activated when a threat is detected and emit a bright light and also an alarm having the lumens and decibel levels, respectively, or even higher lumens and decibels. A first robot may detect a threat and the robot may communicate with one or more additional robots to enable additional robots to find the threat, such as by communicating a location of the first robot. The robots may have GPS location and may use this to ensure that they do not collide with one another. A plurality of aerial robots may create a robot swarm around a threat to effectively deter the threat. The robot swarm of flying aerial robot may also further include one or more of the aerial robots emitting a light deterrent and/or sound deterrent.

A robot may have a physical deterrent 122, or a deterrent that is carried by the robot and delivered to the threat, such as being projected at a threat, such as pepper spray 124, a stunning device 125, a net, a projectile such as a bullet, a fluid such as a dye or foul smelling fluid. One or more of the robots, such as an aerial robot may dispense pepper spray at a threat to effectively deter the threat from proceeding. When a dye is dispensed by a robot on a threat, the dye may help authorities to later identify the threat as they leave the area. A stunning device may include electrodes to deliver an electrical shock and this may disable the threat temporarily. The robot may project the electrodes at the threat or may deliver the electrodes to the threat, such as by intercepting with the threat. An aerial robot may fly into the threat with an electrode armed to deliver the stunning and immobilizing electric shock. Likewise, a robot may project a net over a threat. When the threat is disabled by the pepper spray, a stunning device, or by a net, an administrator and/or the authorities may be contacted by the artificial intelligence entry management system, including directly by the robot. A very bright light, or flashing light, as well as an alarm or siren may also be a deterrent that is projected at a threat, as described herein.

A robot may be weaponized to do bodily harm and may be configured with a weapon, such as a gun to shoot a projectile into a threat, or a piercing object, such as a knife or spear. A robot may be configured to project the bullet, knife or spear at the threat from a distance, or delivery a projectile to a threat when they intercept the threat, such as by flying into the threat. A small charge may project a bullet into the threat when the aerial robot intercepts the threat. A knife or spear may be retractable and may be deployed prior to intercepting with a threat.

A home owner having an artificial intelligence entry management system may activate a monitoring and surveillance by the robot or robots using a mobile device and this may directly initiate the monitoring by the robots or may initiate the monitoring through the artificial intelligence entry management system or device. The robots may be configured to travel in a programmed path in a routine manner to provide improved surveillance of the premises. An administrator may program the robot or robots to fly around the building, such as a home every 10 minutes, or have one of the aerial robots flying in a prescribed path while the other robots remain stationed on their docking stations. The robots may alternate which one is conducting a surveillance route, such as a surveillance flight path around a building, for example. Other flight maneuvers may be programmed in as well, such as a deterring and coordinated flight path by a plurality of aerial robots. An administrator may control when the aerial robots run surveillance and may direct and aerial robots to return to a docking station, such as when bad weather is approaching.

Robots may be configured to communicate directly with each other, wherein when a first aerial robot finishes a surveillance route or flight path, it may communicate with a second aerial robot which may then fly a surveillance route before docking and communicating with the first or another, third aerial robot. The robots may also communicate collectively with the controller or the entry management system, or an authority, such as the police when required, such as when an intruder is detected or when requested by an administrator.

A robot may be configured within a building, such as within a home and may be configured to open an access point, such as the door for greeting a person or visitor or delivery person. The robot may produce an audible greeting to the person and this audible greeting may be a customized greeting as the artificial intelligence entry management system open another access point for delivery of a package or give logistic instruction to the person. The robot may take a package from the person and deliver the package to an access point such as to a storage container or inside of the home, behind a door which may be an access point. The robot may be configured with a camera to scan a package including an address, or code, such as a bar or QR code to determine what the appropriate action should be with respect to the package. The artificial intelligence entry management system in combination with the robot(s) may act as a security system around an access point, such as around a home or storage container.

Data recorded by the artificial intelligence entry management system including images, including still and videos, and audio recording captured by the artificial intelligence entry management device or robot(s) may be stored on a SIM card or a local data storage device, and/or may be uploaded to the cloud for safety and security. An administrator and/or authorities may review recorded files to identify a threat or a threat's vehicle. As described herein, the robots may be programmed to capture images of license plate and/or other identifying features of a threat or a threat's vehicle.

The GPS application can comprise a device capable of being tracked by GPS. The device can be a mobile device or other device capable of being tracked by GPS. When the GPS device and the host device are in proximity, access and/or messaging and logistics can be triggered. The host device can be an artificial intelligence device. The robots may include a GPS application.

According to another embodiment of the disclosure, access and/or messaging is triggered when a linked mobile device is within a predetermined distance of a particular address. In such embodiment, a host device is not needed.

According to another embodiment of the disclosure, the MALT system comprises a transponder device that can be positioned at a specific location, such as a location where a delivery is to be made. The transponder device can be used to identify the location of an object or location not associated with an address or landmark. This is particularly useful for rural delivery locations that do not have a valid or determinable address. For example, the transponder device can be positioned on a mailbox or house where a delivery is to be made.

The transponder device can be a GPS transponder that transmits a signal to a receiver device. The transponder device can be positioned at a particular location, such as a storage facility, building or house, or on a particular object, such as a box or container. The receiver device can be a GPS-integrated smartphone with GPS tracking software. The transponder can be positioned at a location where an item is to be delivered. The receiver smartphone can be provided to a delivery person responsible for delivering the item. The transponder transmits a signal to the smartphone guiding the delivery person to the transponder.

The transponder can have an identifier number or signal that can be programmed into a device or a master server, or other designated application. The designated controller device or application programs the transponder to transmit a signal to one or more receiving devices such as a mobile phone or other device utilizing GPS capabilities.

The GPS transponder can serve as a guide to a specific box, package, location or object that may not have an association with a GPS address in a mapping application. The transponder can confirm the correct and appropriate match with a receiver device when identified. The transponder serves as a beacon/locator device for deliveries or pickup.

The system can be used by delivery personnel to facilitate delivery of an item. The system can be used by first responders, such as law enforcement officers, fire fighters and emergency medical personnel, to help them find a particular location. The system can be used in any circumstance to help locate a stationary structure or moveable object.

The GPS transponder can be physically attached to or built into devices, boxes, or objects. The transponder can be reusable, and added and removed for similar uses. The transponder can be disposable.

The transponder can be utilized to assist a delivery person locate a specific package or mailbox within a high-rise building or apartment. The transponder can be utilized to identify or locate a package, mailbox or location when weather or other conditions may interfere with GPS mapping satellites.

Once the transponder and the receiver establish a match, the transponder can be reprogrammed to match with other receivers. The transponder can be programmed to signal one or more receivers. The transponder utilizes GPS technology to assist in establishing a relationship with one or more receivers. The GPS transponder can be battery powered or hardwired if at a fixed location.

According to an embodiment of the disclosure, the system can be used to track the location of a package. The GPS transponder is fixed to the package, and transmits a signal to the receiver indicating the location of the package.

According to an embodiment of the disclosure, the system can include a container that is adapted to automatically open when the receiving device is within a specific range or proximity of the transponder.

According to an embodiment of the disclosure, an action is triggered when the receiver device (smartphone) comes within a certain range or proximity of the transponder. The action can be a text message provided to the smartphone, or the event can be access granted to the building where the transponder is located. Access can be granted by unlocking an electronic lock on door of the building.

In an alternative embodiment, the transponder may function outside of a GPS network and may be independent of GPS. The transponder utilizes a unique identifier network.

A secured delivery system and methods of using same are described above. Various changes can be made to the disclosure without departing from its scope. The above description of preferred embodiments of the disclosure is provided for the purpose of illustration only and not limitation.

The AI entry management system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The AI entry management system is operable to use any of the aforementioned learning techniques alone or in combination. In one embodiment, the AI entry management system or device utilizes an autoregressive language model that uses deep learning such as Generative Pre-trained Transformer 3 (GPT-3).

Further, the AI entry management system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The AI entry management system is preferably operable to recommend and/or perform actions based on historical data, external data sources, ML, AI, NNs, and/or other learning techniques. The AI entry management system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

FIG. 19 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 19, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 19, is operable to include other components that are not explicitly shown in FIG. 19, or is operable to utilize an architecture completely different than that shown in FIG. 19. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. An entry management system comprising:
   an entry management device including a housing comprising a camera, a microphone, and a speaker;
   an access point comprising an electronic lock that is operable to lock and unlock the access point; and
   a software platform;
   wherein the electronic lock is in direct wireless communication with the entry management device or wherein the electronic lock is in wireless communication with the entry management device via the software platform, and wherein the electronic lock is operable to receive commands from the entry management device to lock and unlock the access point;
   wherein the entry management device is in wireless communication with at least one network device through the software platform;
   wherein the entry management device is operable to process visual data produced by the camera and/or audio data produced by the microphone to determine if an image and/or a sound displayed to the entry management device corresponds with at least one authorized image and/or at least one authorized sound for the access point;
   wherein the entry management device is operable to send a command to the electronic lock to unlock the access point if the image and/or the sound displayed to the entry management device matches the at least one authorized image and/or the at least one authorized sound;
   wherein the entry management device is operable to cause the at least one network device to perform an action based upon detection of a trigger event; and
   wherein the entry management device is operable to instruct at least one drone or at least one robot to follow a patrol path for the at least one drone or the at least one robot, wherein the at least one robot or the at least one drone utilizes Global Positioning System (GPS) or geofencing to determine the patrol path, wherein the patrol path is created by the entry management device, the software platform, the at least one drone, or the at least one robot, and the at least one robot or the at least one drone is operable to be substituted for at least one other drone or at least one other robot to follow the patrol path or supplemented by the at least one other drone or the at least one other robot when following the patrol path.

2. The entry management system of claim 1, wherein the at least one network device includes at least one secondary camera, wherein the trigger event includes a detection of a person, an object, movement, or audio by the entry management device, and wherein the action includes the at least one secondary camera photographing an area associated with the trigger event, recording video of the area associated with the trigger event, repositioning to view the area associated with the trigger event, and/or zooming in on the area associated with the trigger event.

3. The entry management system of claim 1, wherein the at least one network device includes at least one drone, wherein the at least one drone is operable to follow at least one object or person of interest, take photographs of the at least one object or person of interest, record video of the at least one object or person of interest, and/or follow a surveillance route.

4. The entry management system of claim 1, wherein the at least one drone or the at least one robot is operable to map an area utilizing GPS or geofencing, and wherein the at least one drone, the at least one robot, the entry management device, or the software platform is operable to create a plurality of patrol paths based on the mapped area, wherein the plurality of patrol paths include the patrol path for at least one other drone or at least one other robot.

5. The entry management system of claim 4, wherein the plurality of patrol paths include at least one scheduled patrol path including times and corresponding locations for the at least one drone, the at least one robot, the at least one other drone, and/or at least one triggered patrol path, wherein the at least one triggered patrol path is created based on the trigger event.

6. The entry management system of claim 4, wherein Light Detection and Ranging (LIDAR) and/or Airborne Laser Swath Mapping (ALSM) is utilized for mapping in areas in which GPS or geofencing is not operable to be used for mapping.

7. The entry management system of claim 1, wherein the software platform is operable to store data relating to the entry management system, wherein the data includes a number of attempts to access the access point using the entry management device, a number of times entry has been granted to the access point using the entry management device, a number of deliveries made using the entry management device, a number of deliveries made by different couriers using the entry management device, a total cost of products delivered using the entry management device, an average cost of products delivered using the entry management device, and/or aggregated data for a plurality of entry management system including an aggregated number of attempts to access a plurality of access points using entry management devices, a number of times entry has been granted to the access points using the entry management devices, a number of deliveries made using the entry management devices, a number of deliveries made by different couriers using the entry management devices, a total cost of products delivered using the entry management devices, and/or an average cost of products delivered using the entry management devices.

8. The entry management system of claim 1, wherein the trigger event includes the entry management device receiving the image and/or the sound, and wherein the at least one network device includes at least one media device, at least one thermostat, at least one lighting device, at least one smart window device, and/or at least one smart socket, and wherein the action includes turning on, turning off, and/or adjusting a setting on the at least one media device, the at least one thermostat, the at least one lighting device, the at least one smart window device, and/or the at least one smart socket.

9. The entry management system of claim 8, wherein the entry management device is operable to receive a second image and/or a second sound, wherein the entry management device is operable to cause the at least one network device to perform a second action based upon receipt of the second image and/or the second sound, wherein the second action includes an action different than the action.

10. The entry management system of claim 1, wherein the entry management device or at least one secondary camera in wireless communication with the entry management device is operable to detect movement near at least one delivered package, and wherein the entry management device is operable to transmit an alert in response to the movement near the at least one delivered package or send a command to at least one tertiary camera to capture at least one image or at least one video of an area where the movement was detected near the at least one delivered package.

11. The entry management system of claim 1, wherein the at least one authorized image and/or the at least one authorized sound is associated with a user profile, and wherein the user profile includes at least one setting or at least one activation status for the at least one network device, wherein the trigger event includes unlocking the access point and the action includes implementing the at least one setting or the at least one activation status for the at least one network device.

12. The entry management system of claim 1, wherein the at least one authorized image and/or the at least one authorized sound is associated with a user profile, and wherein the entry management device is operable to retrieve information from the software platform based on the user profile and play an audio message based on the information from the software platform.

13. The entry management system of claim 1, wherein the at least one authorized image includes a face of a user, and wherein the entry management device and/or the software platform is operable to perform facial recognition to match the image to the face of the user.

14. The entry management system of claim 1, wherein the entry management device is operable to perform image or video analysis on a secondary image or a video obtained from the entry management device or the at least one network device, wherein the secondary image or video analysis includes recognition of at least one person, at least one weapon, at least one action, or at least one sound.

15. An entry management system comprising:
an entry management device including a housing comprising a camera, a microphone, and a speaker;
an access point comprising an electronic lock that is operable to lock and unlock the access point; and
a software platform;
wherein the electronic lock is in direct wireless communication with the entry management device or wherein the electronic lock is in wireless communication with the entry management device via the software platform, and wherein the electronic lock is operable to receive commands from the entry management device to lock and unlock the access point;
wherein the entry management device is in wireless communication with at least one network device through the software platform;
wherein the entry management device is operable to process visual data produced by the camera and/or audio data produced by the microphone to determine if an image and/or a sound displayed to the entry management device corresponds with at least one authorized image and/or at least one authorized sound for the access point;
wherein the entry management device is operable to send a command to the electronic lock to unlock the access point if the image and/or the sound displayed to the entry management device matches the at least one authorized image and/or the at least one authorized sound;
wherein the entry management device is operable to perform an action based upon detection of a trigger event by the at least one network device; and
wherein the entry management device is operable to instruct at least one drone or at least one robot to follow a patrol path for the at least one drone or the at least one robot, wherein the at least one robot or the at least one drone utilizes Global Positioning System (GPS) or geofencing to determine the patrol path, wherein the patrol path is created by the entry management device, the software platform, the at least one drone, or the at least one robot, and the at least one robot or the at least one drone is operable to be substituted for at least one other drone or at least one other robot to follow the patrol path or supplemented by the at least one other drone or the at least one other robot when following the patrol path.

16. The entry management system of claim 15, wherein the trigger event includes the at least one network device detecting a presence of a person or an object.

17. The entry management system of claim 16, wherein the action includes the entry management device instructing a second network device to record video or take photos of the person or the object or follow the person or the object.

18. The entry management system of claim 15, wherein the entry management device and/or at least one secondary camera are operable to detect a delivery of a package, and wherein the entry management device is operable to transmit a package delivery alert to at least one user device associated with the entry management device.

19. The entry management system of claim 15, wherein the entry management device includes a facial recognition module operable to identify individuals approaching the access point as individuals authorized to enter the access point or perform an action near the access point or individuals not authorized to enter the access point or perform an action near the access point.

20. The entry management system of claim 19, wherein the entry management device is operable to automatically transmit a lock command to the electronic lock when an unrecognized individual approaches the access point.

21. The entry management system of claim 15, wherein the entry management device is in wireless communication with the at least one robot, wherein the entry management device is operable to activate and/or deactivate the at least one robot, and wherein activation of the at least one robot causes the at least one robot to track and follow at least one individual proximate to the access point.

22. An entry management system comprising:
an entry management device including a housing comprising a camera, a microphone, and a speaker;
an access point comprising an electronic lock that is operable to lock and unlock the access point;
wherein the electronic lock is in wireless communication with the entry management device, and wherein the electronic lock is operable to receive commands from the entry management device to lock and unlock the access point;
wherein the electronic lock and/or the entry management device is in wireless communication with at least one network device;
wherein the entry management device is operable to process visual data produced by the camera and/or audio data produced by the microphone to determine if an image and/or a sound displayed to the entry management device corresponds with at least one authorized image and/or at least one authorized sound for the access point;
wherein the entry management device is operable to send a command to the electronic lock to unlock the access point if the image and/or the sound displayed to the entry management device correctly corresponds with the at least one authorized image and/or the at least one authorized sound;
wherein the entry management device automatically activates and/or deactivates one or more of the at least one network device when the entry management device sends a command for the electronic lock to unlock; and
wherein the entry management device is operable to instruct at least one drone or at least one robot to follow a patrol path for the at least one drone or the at least one robot, wherein the at least one robot or the at least one drone utilizes Global Positioning System (GPS) or geofencing to determine the patrol path, wherein the patrol path is created by the entry management device, the software platform, the at least one drone, or the at least one robot, and the at least one robot or the at least one drone is operable to be substituted for at least one other drone or at least one other robot to follow the patrol path or supplemented by the at least one other drone or the at least one other robot when following the patrol path.

23. The entry management system of claim 22, wherein the at least one network device includes at least one secondary camera, and wherein activation of the at least one secondary camera causes the at least one secondary camera to turn on, move position, and/or capture an image or a video.

24. The entry management system of claim 22, wherein, when the electronic lock unlocks, the entry management device automatically sends at least one message to deactivate or activate one or more of the at least one network device, wherein the one or more of the at least one network device includes at least one smart light, at least one thermostat, and/or the at least one robot.

* * * * *